United States Patent
Cai et al.

(10) Patent No.: US 12,501,512 B2
(45) Date of Patent: Dec. 16, 2025

(54) DISCONTINUOUS RECEPTION DRX METHOD AND APPARATUS

(71) Applicant: Huawei Technologies Co., Ltd., Shenzhen (CN)

(72) Inventors: Yu Cai, Shenzhen (CN); Haibo Xu, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 18/043,235

(22) PCT Filed: Aug. 27, 2021

(86) PCT No.: PCT/CN2021/115124
§ 371 (c)(1),
(2) Date: Feb. 27, 2023

(87) PCT Pub. No.: WO2022/042705
PCT Pub. Date: Mar. 3, 2022

(65) Prior Publication Data
US 2023/0319951 A1    Oct. 5, 2023

(30) Foreign Application Priority Data

Aug. 29, 2020 (CN) .......................... 202010890908.X
Oct. 16, 2020 (CN) .......................... 202011112258.2
Apr. 1, 2021 (CN) .......................... 202110358455.0

(51) Int. Cl.
*H04W 76/28* (2018.01)
*H04L 1/1867* (2023.01)
(Continued)

(52) U.S. Cl.
CPC ........... *H04W 76/28* (2018.02); *H04L 1/1887* (2013.01); *H04W 72/0446* (2013.01);
(Continued)

(58) Field of Classification Search
CPC ..... H04W 72/25; H04W 76/28; H04W 72/40; H04W 72/0446; H04W 72/542;
(Continued)

(56) References Cited

U.S. PATENT DOCUMENTS

2023/0098631 A1*  3/2023  Lee ........................ H04W 72/56
                                                          370/329
2023/0111565 A1*  4/2023  Lee ........................ H04L 5/0094
                                                          370/329
(Continued)

FOREIGN PATENT DOCUMENTS

WO        2019028694 A1    2/2019

OTHER PUBLICATIONS

3GPP TS 23.287 V16.3.0 (Jul. 2020), 3rd Generation Partnership Project; Technical Specification Group Services and System Aspects; Architecture enhancements for 5G System (5GS) to support Vehicle-to-Everything (V2X) services (Release 16), total 56 pages.
(Continued)

*Primary Examiner* — Brian D Nguyen
(74) *Attorney, Agent, or Firm* — Conley Rose, P.C.

(57) ABSTRACT

A method includes that a first terminal device sends a sidelink discontinuous reception (DRX) parameter of a second terminal device or indication information to a network device such that the network device determines a first time period based on the sidelink DRX parameter or the indication information, where the first time period belongs to sidelink DRX active time of the second terminal device. The first terminal device receives a sidelink grant sent by the network device, where the sidelink grant is used to indicate the first terminal device to send a resource of a physical sidelink control channel (PSCCH) and/or a physical sidelink shared channel (PSSCH), and a time domain position of the
(Continued)

resource is in the first time period. The first terminal device sends a PSCCH and/or a PSSCH based on the sidelink grant.

20 Claims, 9 Drawing Sheets

(51) Int. Cl.
  *H04W 72/0446* (2023.01)
  *H04W 72/25* (2023.01)
  *H04W 72/40* (2023.01)
  *H04W 72/542* (2023.01)
(52) U.S. Cl.
  CPC ........... *H04W 72/25* (2023.01); *H04W 72/40* (2023.01); *H04W 72/542* (2023.01)
(58) Field of Classification Search
  CPC .... H04W 72/23; H04W 92/18; H04L 5/0094; H04L 1/1887; H04L 5/0053; H04L 5/0044; Y02D 30/70
  See application file for complete search history.

(56) References Cited

U.S. PATENT DOCUMENTS

| 2023/0115633 | A1* | 4/2023 | Park | H04W 72/0446 |
| | | | | 370/311 |
| 2023/0164768 | A1* | 5/2023 | Park | H04L 1/1896 |
| | | | | 370/329 |
| 2024/0276596 | A1* | 8/2024 | Zhang | H04W 76/19 |

OTHER PUBLICATIONS

3GPP TS 36.321 V15.9.0 (Jul. 2020), 3rd Generation Partnership Project; Technical Specification Group Radio Access Network; Evolved Universal Terrestrial Radio Access (E-UTRA); Medium Access Control (MAC) protocol specification (Release 15), total 134 pages.

* cited by examiner

DISCONTINUOUS RECEPTION DRX METHOD AND APPARATUS

CROSS-REFERENCE TO RELATED APPLICATIONS

This is a National Stage of International Patent Application No. PCT/CN2021/115124 filed on Aug. 27, 2021, which claims priority to Chinese Patent Application No. 202010890908.X filed on Aug. 29, 2020, Chinese Patent Application No. 202011112258.2 filed on Oct. 16, 2020 and Chinese Patent Application No. 202110358455.0 filed on Apr. 1, 2021, all of which are hereby incorporated by reference in their entireties.

TECHNICAL FIELD

This application relates to the field of communications technologies, and in particular, to a discontinuous reception DRX method and apparatus.

BACKGROUND

In a new radio (new radio, NR) system specified in the 3rd Generation Partnership Project (3rd generation partnership project, 3GPP) protocol, when a terminal device communicates with a network device through a Uu interface, to reduce power consumption of the terminal device, a discontinuous reception (connected-discontinuous reception, C-DRX, or discontinuous reception, DRX) mechanism is introduced. The DRX mechanism is to configure a DRX cycle or DRX for the terminal device in a radio resource control (radio resource control, RRC) connected state. The DRX mechanism can control the terminal device to monitor a physical downlink control channel (physical downlink control channel, PDCCH) in DRX active time, and not to monitor the PDCCH in DRX non-active time, to reduce power consumption of the terminal device. The DRX mechanism may be used to reduce power consumption of the terminal device in sidelink communication. The DRX mechanism in sidelink communication is similar to the DRX mechanism in Uu interface communication. In sidelink communication, if the DRX mechanism is introduced, a receiving terminal device receives at least one of a physical sidelink control channel (physical sidelink control channel, PSCCH), a physical sidelink shared channel (physical sidelink shared channel, PSSCH), and sidelink control information (sidelink control information, SCI) from a transmitting terminal device only in DRX active time.

SUMMARY

Embodiments of this application provide a discontinuous reception DRX method and apparatus, to resolve a problem that when a DRX mechanism is used in sidelink communication, if a network device allocates a sidelink resource to a transmitting terminal device, the DRX mechanism cannot work in sidelink communication or a sidelink resource is wasted because a time domain position of the sidelink resource may not be in sidelink DRX active time of a receiving terminal device.

According to a first aspect, this application provides a DRX method, including: A first terminal device sends a sidelink discontinuous reception DRX parameter of a second terminal device or indication information to a network device, so that the network device determines a first time period based on the sidelink DRX parameter or the indication information, where the indication information indicates a start and/or an end of the first time period, the first time period belongs to sidelink DRX active time of the second terminal device, and the second terminal device is a device that performs sidelink communication with the first terminal device. The first terminal device receives a sidelink grant sent by the network device, where the sidelink grant is used to indicate a resource for sending a physical sidelink control channel PSCCH and/or a physical sidelink shared channel PSSCH by the first terminal device, and a time domain position of the resource is in the first time period. The first terminal device sends the PSCCH and/or the PSSCH based on the sidelink grant.

Based on the foregoing technical solution, the first terminal device sends the related information of the sidelink DRX active time of the second terminal device to the network device, so that the network device can learn of the sidelink DRX active time of the second terminal device. Further, the time domain position of the resource indicated by the sidelink grant allocated by the network device to the first terminal device may be in the sidelink DRX active time of the second terminal device, so that the second terminal device can receive a PSCCH, a PSSCH, or SCI in the sidelink DRX active time, to avoid a problem that a DRX mechanism between the first terminal device and the second terminal device cannot work or a sidelink resource is wasted because the time domain position of the resource indicated by the sidelink grant is not in the sidelink DRX active time of the second terminal device.

In a possible design, the indication information is included in uplink control information UCI, a media access control control element MAC CE, or a radio resource control RRC message; and the sidelink grant is included in downlink control information DCI, a MAC CE, or an RRC message.

In a possible design, that a first terminal device sends indication information to a network device includes: The first terminal device sends first indication information to the network device at a start moment of the first time period, where the first indication information indicates an end moment of the first time period; or the first terminal device sends second indication information to the network device at a start moment of the first time period, and sends third indication information to the network device at an end moment of the first time period, where the second indication information indicates the start of the first time period, and the third indication information indicates the end of the first time period.

In a possible design, that the first time period belongs to sidelink DRX active time of the second terminal device includes: The first time period includes sidelink DRX active time of each second terminal device; or the first time period includes an intersection set or a union set of sidelink DRX active time of at least two second terminal devices.

In a possible design, that the first time period includes an intersection set or a union set of sidelink DRX active time of at least two second terminal devices includes: The first time period includes any one or a combination of the following: an earliest start moment to an earliest end moment of the sidelink DRX active time of each second terminal device, an earliest start moment to a latest end moment of the sidelink DRX active time of each second terminal device; a latest start moment to an earliest end moment of the sidelink DRX active time of each second terminal device; a latest start moment to a latest end moment of the sidelink DRX active time of each second terminal device; and a start moment or an end moment of sidelink DRX active time of any second terminal device to a start moment or an end moment of sidelink DRX active time of any second terminal device.

In a possible design, if the first time period includes the sidelink DRX active time of each second terminal device, that the first terminal device receives a sidelink grant sent by the network device includes: The first terminal device receives the sidelink grant and device identification information that are sent by the network device, and determines the second terminal device corresponding to the sidelink grant based on the device identification information.

In a possible design, the sidelink DRX active time includes running time of a DRX on duration timer and running time of a DRX inactivity timer, and the DRX inactivity timer is started or restarted when the first terminal device sends the PSCCH and/or the PSSCH; or the DRX inactivity timer is started or restarted when the first terminal device receives, from the second terminal device, hybrid automatic repeat request HARQ feedback information that is based on the PSCCH and/or the PSSCH; or the DRX inactivity timer is started or restarted when the first terminal device sends fourth indication information to the network device and the second terminal device, where the fourth indication information indicates to start or restart the DRX inactivity timer.

In a possible design, the method further includes: The DRX inactivity timer is started or restarted when the first terminal device receives sidelink control information SCI and information included in the SCI meets a preset condition, where the SCI includes any one or more of a source address layer-1 identifier source layer-1 ID, a destination address layer-1 identifier destination layer-1 ID, or a cast type cast type, and the cast type is used to indicate broadcast communication, groupcast communication, or unicast communication.

In a possible design, the SCI includes a source layer-1 ID and a destination layer-1 ID, and when the destination layer-1 ID is the same as a layer-1 ID of the first terminal device, and the source layer-1 ID is the same as a layer-1 ID of the second terminal device, the first terminal device starts or restarts the DRX inactivity timer corresponding to sidelink DRX between the first terminal device and the second terminal device; or the SCI includes a source layer-1 ID, a destination layer-1 ID, and a cast type, and when the cast type indicates unicast communication, the destination layer-1 ID is the same as a layer-1 ID of the first terminal device, and the source layer-1 ID is the same as a layer-1 ID of the second terminal device, the first terminal device starts or restarts the DRX inactivity timer corresponding to sidelink DRX between the first terminal device and the second terminal device, or the SC includes a destination layer-1 ID and a cast type, and when the cast type indicates groupcast communication, and the destination layer-1 ID is the same as a destination layer-1 ID of the groupcast communication, the first terminal device starts or restarts the DRX inactivity timer corresponding to sidelink DRX of the groupcast communication.

In a possible design, the destination layer-1 ID included in the SCI is the same as a layer-1 ID of the first terminal device in any one sidelink unicast communication, the source layer-1 ID included in the SCI is the same as a layer-1 ID of a second terminal device corresponding to the first terminal device in the sidelink unicast communication, and the method further includes: The first terminal device cancels starting or restarting the DRX inactivity timer corresponding to the sidelink DRX between the first terminal device and the second terminal device, where the first terminal device determines that a source address layer-2 identifier source layer-2 ID of a media access control protocol data unit MAC PDU corresponding to the SCI is different from a layer-2 ID of the second terminal device corresponding to the first terminal device in the sidelink unicast communication, or a destination address layer-2 identifier destination layer-2 ID of a MAC PDU corresponding to the SCI is different from a layer-2 ID of the first terminal device in the sidelink unicast communication; or the first terminal device configures a layer-2 ID in sidelink unicast communication between the first terminal device and the second terminal device, where a layer-1 ID corresponding to the layer-2 ID is different from a layer-1 ID corresponding to a layer-2 ID configured by the first terminal device during sidelink unicast communication with another second terminal device; or the first terminal device configures a layer-2 ID in sidelink unicast communication between the first terminal device and the second terminal device, where a layer-1 ID corresponding to the layer-2 ID is different from a layer-1 ID corresponding to a layer-2 ID in another sidelink unicast communication, and the another sidelink unicast communication is sidelink unicast communication of terminal devices that do not include the first terminal device.

In a possible design, the first terminal device receives the SCI or the fourth indication information, and a MAC PDU corresponding to the SCI or the fourth indication information includes only non-data information, and the method further includes: The first terminal device determines that the MAC PDU corresponding to the SCI includes first information but does not include second information, and canceling starting or restarting the DRX inactivity timer corresponding to the sidelink DRX between the first terminal device and the second terminal device, where the first information includes any one or a combination of the following: a sidelink channel state information report and sidelink resource information in inter-terminal device coordination, and the second information includes any one or a combination of the following: data on a sidelink control channel SCCH, data on a sidelink traffic channel STCH, and a media access control control element MAC CE other than the first information; or the first information includes any one or a combination of the following: a sidelink channel state information report, sidelink resource information in inter-terminal device coordination, data on an SCCH, and information other than data on an STCH, and the second information includes the data on the STCH.

In a possible design, the first terminal device receives a PSCCH, a PSSCH, or a MAC PDU sent by the second terminal device, and SCI corresponding to the PSCCH, the PSSCH, or the MAC PDU indicates at least two resources, or the first terminal device receives SCI sent by the second terminal device, and the SCI indicates at least two resources. The method further includes: The first terminal device starts a HARQ round trip time RTT timer or a DRX retransmission timer corresponding to the sidelink DRX between the first terminal device and the second terminal device, where a priority indicated by the SCI is greater than a smallest value of a priority value range; or the first terminal device does not start a HARQ RTT timer or a DRX retransmission timer corresponding to the sidelink DRX between the first terminal device and the second terminal device, where a priority indicated by the SCI is a smallest value of a priority value range.

In a possible design, the first terminal device receives a PSCCH, a PSSCH, or a MAC PDU sent by the second terminal device, and SCI corresponding to the PSCCH, the PSSCH, or the MAC PDU indicates at least two resources, or the first terminal device receives the SCI sent by the second terminal device, and the SCI indicates at least two resources. The method further includes: The first terminal device determines, based on each of the at least two resources indicated by the SCI, start time of the HARQ RTT timer or the DRX retransmission timer corresponding to the sidelink DRX between the first terminal device and the second terminal device, where the resource includes or indicates an SCI transmission occasion.

In a possible design, after the first terminal device receives the sidelink grant sent by the network device, the method further includes: If the first terminal device determines to discard the sidelink grant, the first terminal device sends fifth indication information to the network device at an end moment of the first time period or a moment preceding the end moment by a gap, where the fifth indication information indicates that the first terminal device determines to discard the sidelink grant and indicates the end of the first time period; or if the first terminal device determines to discard the sidelink grant, the first terminal device sends sixth indication information to the network device, where the sixth indication information indicates that the first terminal device determines to discard the sidelink grant, and indicates an end moment of the first time period, a time domain position of the to-be-discarded sidelink grant, or a time domain position of a previous sidelink grant of the to-be-discarded sidelink grant.

Based on the foregoing technical solution, after determining to discard the sidelink grant, the first terminal device sends related information of the to-be-discarded sidelink grant to the network device, so that the network device can learn of whether the first terminal device and the second terminal device start or restart a DRX inactivity timer. Further, a status of the DRX inactivity timer maintained by the first terminal device and the second terminal device is consistent with a status of a DRX inactivity timer maintained by the network device. This avoids a problem that a DRX mechanism between the first terminal device and the second terminal device cannot work or a sidelink resource is wasted because a time domain position of a resource indicated by a sidelink grant subsequently sent by the network device to the first terminal device may be not in the sidelink DRX active time of the second terminal device.

According to a second aspect, this application further provides a DRX method, including: A network device determines a first time period, where the first time period belongs to sidelink DRX active time of a second terminal device, and the second terminal device is a device that performs sidelink communication with a first terminal device. The network device sends a sidelink grant to the first terminal device, so that the first terminal device sends a physical sidelink control channel PSCCH and/or a physical sidelink shared channel PSSCH based on the sidelink grant, where the sidelink grant is used to indicate a resource for sending the PSCCH and/or the PSSCH by the first terminal device, and a time domain position of the resource is in the first time period.

Based on the foregoing technical solution, the network device obtains the related information of the sidelink DRX active time of the second terminal device, so that the network device can learn of the sidelink DRX active time of the second terminal device. Further, the time domain position of the resource indicated by the sidelink grant allocated by the network device to the first terminal device may be in the sidelink DRX active time of the second terminal device, so that the second terminal device can receive a PSCCH, a PSSCH, or SCI in the sidelink DRX active time, to avoid a problem that a DRX mechanism between the first terminal device and the second terminal device cannot work or a sidelink resource is wasted because the time domain position of the resource indicated by the sidelink grant is not in the sidelink DRX active time of the second terminal device.

In a possible design, that a network device determines a first time period includes: The network device receives a sidelink DRX parameter of the second terminal device sent by the first terminal device or any second terminal device, and determines the first time period based on the sidelink DRX parameter; or the network device determines the first time period based on a sidelink DRX parameter of the second terminal device configured by the network device; or the network device receives indication information sent by the first terminal device, and determines the first time period based on the indication information, where the indication information indicates a start and/or an end of the first time period.

In a possible design, the indication information is included in uplink control information UCI, a media access control control element MAC CE, or a radio resource control RRC message; and the sidelink grant is included in downlink control information DCI, a MAC CE, or an RRC message.

In a possible design, that the network device receives indication information sent by the first terminal device includes: The network device receives first indication information sent by the first terminal device at a start moment of the first time period, where the first indication information indicates an end moment of the first time period; or the network device receives second indication information sent by the first terminal device at a start moment of the first time period, and third indication information sent at an end moment of the first time period, where the second indication information indicates the start of the first time period, and the third indication information indicates the end of the first time period.

In a possible design, that the first time period belongs to sidelink DRX active time of a second terminal device includes: The first time period includes sidelink DRX active time of each second terminal device; or the first time period includes an intersection set or a union set of sidelink DRX active time of at least two second terminal devices.

In a possible design, that the first time period includes an intersection set or a union set of sidelink DRX active time of at least two second terminal devices includes: The first time period includes any one or a combination of the following: an earliest start moment to an earliest end moment of the sidelink DRX active time of each second terminal device; an earliest start moment to a latest end moment of the sidelink DRX active time of each second terminal device; a latest start moment to an earliest end moment of the sidelink DRX active time of each second terminal device; a latest start moment to a latest end moment of the sidelink DRX active time of each second terminal device; and a start moment or an end moment of sidelink DRX active time of any second terminal device to a start moment or an end moment of sidelink DRX active time of any second terminal device.

In a possible design, if the first time period includes the sidelink DRX active time of each second terminal device, that the network device sends a sidelink grant to the first terminal device includes: The network device sends the sidelink grant and device identification information to the first terminal device, so that the first terminal device determines the second terminal device corresponding to the sidelink grant based on the device identification information.

In a possible design, the sidelink DRX active time includes running time of a DRX on duration timer and running time of a DRX inactivity timer, and the DRX inactivity timer is started or restarted when the network device sends the sidelink grant to the first terminal device; or the DRX inactivity timer is started or restarted when the network device receives, from the first terminal device, hybrid automatic repeat request HARQ feedback information that is based on the sidelink grant; or the DRX inactivity timer is started or restarted when the network device receives fourth indication information sent by the first terminal device, where the fourth indication information indicates to start or restart the DRX inactivity timer.

In a possible design, after the network device sends the sidelink grant to the first terminal device, the method further includes: The network device receives fifth indication information sent by the first terminal device at an end moment of the first time period or a moment preceding the end moment by a gap, where the fifth indication information indicates that the first terminal device determines to discard the sidelink grant and indicates the end moment of the first time period; or the network device receives sixth indication information sent by the first terminal device, where the sixth indication information indicates that the first terminal device determines to discard the sidelink grant, and indicates an end moment of the first time period, a time domain position of the to-be-discarded sidelink grant, or a time domain position of a previous sidelink grant of the to-be-discarded sidelink grant.

Based on the foregoing technical solution, the network device receives related information that is of the to-be-discarded sidelink grant and that is sent by the first terminal device after the first terminal device determines to discard the sidelink grant, and determines whether the first terminal device and the second terminal device start or restart a DRX inactivity timer. Further, a status of the DRX inactivity timer maintained by the first terminal device and the second terminal device is consistent with a status of a DRX inactivity timer maintained by the network device. This avoids a problem that a DRX mechanism between the first terminal device and the second terminal device cannot work or a sidelink resource is wasted because a time domain position of a resource indicated by a sidelink grant subsequently sent by the network device to the first terminal device may be not in the sidelink DRX active time of the second terminal device.

According to a third aspect, this application further provides a DRX method, including. A first terminal device receives first sidelink control information SCI sent by a second terminal device, where the second terminal device is a device that performs sidelink communication with the first terminal device. If the first SCI indicates at least two resources, the first terminal device determines that duration of a hybrid automatic repeat request HARQ round trip time RTT timer of a sidelink process corresponding to the first SCI is first duration, where the first duration is determined based on time domain positions of the resources indicated by the first SCI. If the first SCI indicates one resource, the first terminal device determines that the duration of the HARQ RT timer is second duration, where the second duration is configured by the second terminal device or a network device.

In a possible design, the first symbol or slot after the HARQ RTT timer is started and runs for the first duration is a time domain position of the second resource indicated by the first SCI; or the first duration is equal to an offset of a time domain position of the second resource indicated by the first SCI relative to a first time domain position, and the first time domain position is a time domain position for starting the HARQ RTT timer.

In a possible design, the first time domain position is the first symbol or slot after transmission that carries a sidelink HARQ feedback ends, and the sidelink HARQ feedback is a feedback for transmission of the first SCI or transmission of a physical sidelink control channel PSCCH, a physical sidelink shared channel PSSCH, or a media access control protocol data unit MAC PDU that corresponds to the first SCI; or the first time domain position is the first symbol or slot after transmission of the first SCI or transmission of a physical sidelink control channel PSCCH, a physical sidelink shared channel PSSCH, or a media access control protocol data unit MAC PDU that corresponds to the first SCI ends.

In a possible design, the method further includes: If the first SCI indicates at least three resources, the first terminal device starts the HARQ RTT timer in a second time domain position when the first terminal device does not receive, in the time domain position of the second resource indicated by the first SCI, a second SCI sent by the second terminal device. The second SCI and the first SCI correspond to a same sidelink process or schedule same data. The second time domain position is the first symbol or slot after a sidelink HARQ feedback resource ends, and the sidelink HARQ feedback resource is a resource in which a sidelink HARQ feedback for the second resource indicated by the first SCI is located, or the second time domain position is the first symbol or slot after the time domain position of the second resource indicated by the first SCI ends.

In a possible design, before the first terminal device starts the HARQ RTT timer in the second time domain position, the method further includes: The first terminal device determines that the duration of the HARQ RTT timer is third duration, where the first symbol or slot after the HARQ RTT timer is started in the second time domain position and runs for the third duration is a time domain position of the third resource indicated by the first SCI; or the third duration is equal to an offset of a time domain position of the third resource indicated by the first SCI relative to the second time domain position.

In a possible design, the method further includes: If the first SCI indicates at least two resources, and the first terminal device fails to decode data of the sidelink process before a time domain position of any resource after the first resource indicated by the first SCI, the first terminal device starts or restarts a DRX retransmission timer of the sidelink process in the time domain position of the resource after the first resource indicated by the first SCI.

In a possible design, the method further includes: If the first terminal device fails to decode the data of the sidelink process before the third resource indicated by the first SCI, the first terminal device starts or restarts the DRX retransmission timer of the sidelink process in a time domain position of the third resource indicated by the first SCI.

In a possible design, the method further includes: If the first SCI indicates at least two resources, and the DRX retransmission timer of the sidelink process expires before the time domain position of the resource after the first resource indicated by the first SCI, the first terminal device starts the DRX retransmission timer in the time domain position of the resource after the first resource indicated by the first SCI.

In a possible design, the method further includes: If the DRX retransmission timer of the sidelink process expires before the third resource indicated by the first SCI, the first terminal device starts the DRX retransmission timer in a time domain position of the third resource indicated by the first SCI.

In a possible design, the method further includes: If the first SCI indicates at least two resources, and the DRX retransmission timer of the sidelink process is running before the time domain position of the resource after the first resource indicated by the first SCI, the first terminal device restarts the DRX retransmission timer in the time domain position of the resource after the first resource indicated by the first SCI.

In a possible design, the method further includes: If the DRX retransmission timer of the sidelink process is running before the third resource indicated by the first SCI, the first terminal device restarts the DRX retransmission timer in a time domain position of the third resource indicated by the first SCI.

In a possible design, the method further includes: If the first terminal device fails to decode the data of the sidelink process, the first terminal device starts the HARQ RTT timer, and starts or restarts the DRX retransmission timer of the sidelink process in the first symbol or slot after the HARQ RTT timer expires.

In a possible design, the method further includes: If the HARQ RTT timer expires and the first terminal device fails to decode the data of the sidelink process, the first terminal device starts or restarts the DRX retransmission timer of the sidelink process in the first symbol or slot after the HARQ RTT timer expires.

In a possible design, that the first terminal device determines that duration of a hybrid automatic repeat request round trip time HARQ RTT timer of a sidelink process corresponding to the first SCI is first duration includes: If any resource indicated by the first SCI is not preempted by another terminal device, the first terminal device determines that the duration of the HARQ RTT timer is the first duration.

According to a fourth aspect, this application further provides a DRX method, including: A first terminal device receives first sidelink control information SCI sent by a second terminal device, where the second terminal device is a device that performs sidelink communication with the first terminal device. If the first SCI indicates at least two resources, and the first terminal device fails to decode data of a sidelink process corresponding to the first SCI before a time domain position of any resource after the first resource indicated by the first SCI, the first terminal device starts or restarts a DRX retransmission timer of the sidelink process in the time domain position of the resource after the first resource indicated by the first SCI.

According to a fifth aspect, this application further provides a DRX method, including: A first terminal device receives first sidelink control information SCI sent by a second terminal device, where the second terminal device is a device that performs sidelink communication with the first terminal device. If the first terminal device fails to decode data of a sidelink process corresponding to the first SCI before the third resource indicated by the first SCI, the first terminal device starts or restarts a DRX retransmission timer of the sidelink process in a time domain position of the third resource indicated by the first SCI.

According to a sixth aspect, this application further provides a DRX method, including: A first terminal device receives first sidelink control information SCI sent by a second terminal device, where the second terminal device is a device that performs sidelink communication with the first terminal device. If the first terminal device fails to decode data of a sidelink process corresponding to the first SCI before a time domain position of the first resource indicated by the first SCI, the first terminal device starts or restarts a DRX retransmission timer of the sidelink process in the time domain position of the first resource. A time domain position of the first SCI is earlier than the time domain position of the first resource.

According to a seventh aspect, this application further provides a DRX method, including: A first terminal device receives first sidelink control information SCI sent by a second terminal device, where the second terminal device is a device that performs sidelink communication with the first terminal device. If the first SCI indicates at least two resources, and a DRX retransmission timer of a sidelink process corresponding to the first SCI expires before a time domain position of any resource after the first resource indicated by the first SCI, the first terminal device starts the DRX retransmission timer in a time domain position of the first resource. A time domain position of the first SCI is earlier than the time domain position of the first resource.

According to an eighth aspect, this application further provides a DRX method, including: A first terminal device receives first sidelink control information SCI sent by a second terminal device, where the second terminal device is a device that performs sidelink communication with the first terminal device. If a DRX retransmission timer of a sidelink process corresponding to the first SCI expires before the third resource indicated by the first SCI, the first terminal device starts the DRX retransmission timer in a time domain position of the third resource indicated by the first SCI.

According to a ninth aspect, this application further provides a DRX method, including: A first terminal device receives first sidelink control information SCI sent by a second terminal device, where the second terminal device is a device that performs sidelink communication with the first terminal device. If a DRX retransmission timer of a sidelink process corresponding to the first SCI expires before a time domain position of the first resource indicated by the first SCI, the first terminal device starts the DRX retransmission timer in the time domain position of the first resource. A time domain position of the first SCI is earlier than the time domain position of the first resource.

According to a tenth aspect, this application further provides a DRX method, including: A first terminal device receives first sidelink control information SCI sent by a second terminal device, where the second terminal device is a device that performs sidelink communication with the first terminal device. If the first SCI indicates at least two resources, and a DRX retransmission timer of a sidelink process corresponding to the first SCI is running before a time domain position of any resource after the first resource indicated by the first SCI, the first terminal device restarts the DRX retransmission timer in a time domain position of the first resource. A time domain position of the first SCI is earlier than the time domain position of the first resource.

According to an eleventh aspect, this application further provides a DRX method, including: A first terminal device receives first sidelink control information SCI sent by a second terminal device, where the second terminal device is a device that performs sidelink communication with the first terminal device. If a DRX retransmission timer of a sidelink process corresponding to the first SCI is running before the third resource indicated by the first SCI, the first terminal device restarts the DRX retransmission timer in a time domain position of the third resource indicated by the first SCI.

According to a twelfth aspect, this application further provides a DRX method, including: A first terminal device receives first sidelink control information SCI sent by a second terminal device, where the second terminal device is a device that performs sidelink communication with the first terminal device. If a DRX retransmission timer of a sidelink process corresponding to the first SCI is running before a time domain position of the first resource indicated by the first SCI, the first terminal device restarts the DRX retransmission timer in the time domain position of the first resource. A time domain position of the first SCI is earlier than the time domain position of the first resource.

According to a thirteenth aspect, this application further provides a DRX apparatus. The DRX apparatus has a function of implementing the method according to any one of the first aspect or the possible designs of the first aspect. The function may be implemented by hardware, or may be implemented by hardware executing corresponding software. The hardware or software includes one or more modules corresponding to the foregoing function, for example, includes a first sending module, a receiving module, and a second sending module.

In a possible design, the first sending module is configured to send a sidelink discontinuous reception DRX parameter of a second terminal device or indication information to a network device, so that the network device determines a first time period based on the sidelink DRX parameter or the indication information, where the indication information indicates a start and/or an end of the first time period, the first time period belongs to sidelink DRX active time of the second terminal device, and the second terminal device is a device that performs sidelink communication with a first terminal device.

In a possible design, the receiving module is configured to receive a sidelink grant sent by the network device, where the sidelink grant is used to indicate a resource for sending a physical sidelink control channel PSCCH and/or a physical sidelink shared channel PSSCH by the first terminal device, and a time domain position of the resource is in the first time period.

In a possible design, the second sending module is configured to send a PSCCH and/or a PSSCH based on the sidelink grant.

According to a fourteenth aspect, this application further provides a DRX apparatus. The DRX apparatus has a function of implementing the method according to any one of the second aspect or the possible designs of the second aspect. The function may be implemented by hardware, or may be implemented by hardware executing corresponding software. The hardware or software includes one or more modules corresponding to the foregoing function, for example, includes a determining module and a sending module.

In a possible design, the determining module is configured to determine a first time period, where the first time period belongs to sidelink DRX active time of a second terminal device, and the second terminal device is a device that performs sidelink communication with a first terminal device.

In a possible design, the sending module is configured to send a sidelink grant to the first terminal device, so that the first terminal device sends a physical sidelink control channel PSCCH and/or a physical sidelink shared channel PSSCH based on the sidelink grant, where the sidelink grant is used to indicate a resource for sending the PSCCH and/or the PSSCH by the first terminal device, and a time domain position of the resource is in the first time period.

According to a fifteenth aspect, this application further provides a DRX apparatus. The DRX apparatus has a function of implementing the method according to any one of the third aspect or the possible designs of the third aspect. The function may be implemented by hardware, or may be implemented by hardware executing corresponding software. The hardware or software includes one or more modules corresponding to the foregoing function, for example, includes a receiving module, a first determining module, and a second determining module.

In a possible design, the receiving module is configured to receive first sidelink control information SCI sent by a second terminal device, where the second terminal device is a device that performs sidelink communication with a first terminal device.

In a possible design, the first determining module is configured to: if the first SCI indicates at least two resources, determine, by the first terminal device, that duration of a hybrid automatic repeat request HARQ round trip time RTT timer of a sidelink process corresponding to the first SCI is first duration, where the first duration is determined based on time domain positions of the resources indicated by the first SCI.

In a possible design, the second determining module is configured to: if the first SCI indicates one resource, determine, by the first terminal device, that the duration of the HARQ RTT timer is second duration, where the second duration is configured by the second terminal device or a network device.

According to a sixteenth aspect, this application further provides a DRX apparatus. The DRX apparatus has a function of implementing the method according to any one of the fourth aspect or the possible designs of the fourth aspect. The function may be implemented by hardware, or may be implemented by hardware executing corresponding software. The hardware or software includes one or more modules corresponding to the foregoing function, for example, includes a receiving module and a processing determining module.

In a possible design, the receiving module is configured to receive first sidelink control information SCI sent by a second terminal device, where the second terminal device is a device that performs sidelink communication with a first terminal device.

In a possible design, the processing module is configured to: if the first SCI indicates at least two resources, and the first terminal device fails to decode data of a sidelink process corresponding to the first SCI before a time domain position of any resource after the first resource indicated by the first SCI, start or restart a DRX retransmission timer of the sidelink process in the time domain position of the resource after the first resource indicated by the first SCI.

According to a seventeenth aspect, this application further provides a DRX apparatus. The DRX apparatus has a function of implementing the method according to any one of the fifth aspect or the possible designs of the fifth aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if data of a sidelink process corresponding to the first SC fails to be decoded before the third resource indicated by the first SCI, start or restart a DRX retransmission timer of the sidelink process in a time domain position of the third resource indicated by the first SCI.

According to an eighteenth aspect, this application further provides a DRX apparatus. The DRX apparatus has a function of implementing the method according to any one of the sixth aspect or the possible designs of the sixth aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if data of a sidelink process corresponding to the first SCI fails to be decoded before a time domain position of the first resource indicated by the first SCI, start or restart a DRX retransmission timer of the sidelink process in a time domain position of the first resource. A time domain position of the first SCI is earlier than the time domain position of the first resource.

According to a nineteenth aspect, this application further provides a DRX apparatus. The DRX apparatus has a function of implementing the method according to any one of the seventh aspect or the possible designs of the seventh aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if the first SCI indicates at least two resources, and a DRX retransmission timer of a sidelink process corresponding to the first SCI expires before a time domain position of any resource after the first resource indicated by the first SCI, start the DRX retransmission timer in a time domain position of the first resource, where a time domain position of the first SCI is earlier than the time domain position of the first resource.

According to a twentieth aspect, this application further provides a DRX apparatus. The DRX apparatus has a function of implementing the method according to any one of the eighth aspect or the possible designs of the eighth aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if a DRX retransmission timer of a sidelink process corresponding to the first SCI expires before the third resource indicated by the first SCI, start the DRX retransmission timer in a time domain position of the third resource indicated by the first SCI.

According to a twenty-first aspect, this application further provides a DRX apparatus. The DRX apparatus has a function of implementing the method according to any one of the ninth aspect or the possible designs of the ninth aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if a DRX retransmission timer of a sidelink process corresponding to the first SCI expires before a time domain position of the first resource indicated by the first SCI, start the DRX retransmission timer in a time domain position of the first resource, where a time domain position of the first SCI is earlier than the time domain position of the first resource.

According to a twenty-second aspect, this application further provides a DRX apparatus. The DRX apparatus has a function of implementing the method according to any one of the tenth aspect or the possible designs of the tenth aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if the first SCI indicates at least two resources, and a DRX retransmission timer of a sidelink process corresponding to the first SCI is running before a time domain position of any resource after the first resource indicated by the first SCI, restart the DRX retransmission timer in a time domain position of the first resource, where a time domain position of the first SCI is earlier than the time domain position of the first resource.

According to a twenty-third aspect, this application further provides a DRX apparatus. The DRX apparatus has a function of implementing the method according to any one of the eleventh aspect or the possible designs of the eleventh aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if a DRX retransmission timer of a sidelink process corresponding to the first SCI is running before the third resource indicated by the first SCI, restart the DRX retransmission timer in a time domain position of the third resource indicated by the first SCI.

According to a twenty-fourth aspect, this application further provides a DRX apparatus. The DRX apparatus has a function of implementing the method according to any one of the twelfth aspect or the possible designs of the twelfth aspect. The function may be implemented by hardware, or may be implemented by hardware executing corresponding software. The hardware or software includes one or more modules corresponding to the foregoing function, for example, includes a receiving module and a processing module.

In a possible design, the receiving module is configured to receive first sidelink control information SCI sent by a second terminal device, where the second terminal device is a device that performs sidelink communication with a first terminal device.

In a possible design, the processing module is configured to: if a DRX retransmission timer of a sidelink process corresponding to the first SCI is running before a time domain position of the first resource indicated by the first SCI, restart the DRX retransmission timer in a time domain position of the first resource, where a time domain position of the first SCI is earlier than the time domain position of the first resource.

According to a twenty-fifth aspect, this application further provides a DRX apparatus. The DRX apparatus may include at least one processor, and a memory and a communications interface that are communicatively connected to the at least one processor. The memory stores instructions that can be executed by the at least one processor, and the at least one processor executes the instructions stored in the memory to perform the function in the method according to any one of the first aspect or the possible designs of the first aspect, the method according to any one of the second aspect or the possible designs of the second aspect, the method according to any one of the third aspect or the possible designs of the third aspect, the method according to any one of the fourth aspect or the possible designs of the fourth aspect, the method according to any one of the fifth aspect or the possible designs of the fifth aspect, the method according to any one of the sixth aspect or the possible designs of the sixth aspect, the method according to any one of the seventh aspect or the possible designs of the seventh aspect, the method according to any one of the eighth aspect or the possible designs of the eighth aspect, the method according to any one of the ninth aspect or the possible designs of the ninth aspect, the method according to any one of the tenth aspect or the possible designs of the tenth aspect, the method according to any one of the eleventh aspect or the possible designs of the eleventh aspect, or the method according to any one of the twelfth aspect or the possible designs of the twelfth aspect.

According to a twenty-sixth aspect, this application further provides a computer-readable storage medium. The computer-readable storage medium includes a computer program, and when the computer program is run on a computer, the computer is enabled to perform the method according to any one of the first aspect or the possible designs of the first aspect, the method according to any one of the second aspect or the possible designs of the second aspect, the method according to any one of the third aspect or the possible designs of the third aspect, the method according to any one of the fourth aspect or the possible designs of the fourth aspect, the method according to any one of the fifth aspect or the possible designs of the fifth aspect, the method according to any one of the sixth aspect or the possible designs of the sixth aspect, the method according to any one of the seventh aspect or the possible designs of the seventh aspect, or the method according to any one of the eighth aspect or the possible designs of the eighth aspect.

According to a twenty-seventh aspect, this application further provides a program product. When the program product runs on a computer, the computer is enabled to perform the method according to any one of the first aspect or the possible designs of the first aspect, the method according to any one of the second aspect or the possible designs of the second aspect, the method according to any one of the third aspect or the possible designs of the third aspect, the method according to any one of the fourth aspect or the possible designs of the fourth aspect, the method according to any one of the fifth aspect or the possible designs of the fifth aspect, the method according to any one of the sixth aspect or the possible designs of the sixth aspect, the method according to any one of the seventh aspect or the possible designs of the seventh aspect, the method according to any one of the eighth aspect or the possible designs of the eighth aspect, the method according to any one of the ninth aspect or the possible designs of the ninth aspect, the method according to any one of the tenth aspect or the possible designs of the tenth aspect, the method according to any one of the eleventh aspect or the possible designs of the eleventh aspect, or the method according to any one of the twelfth aspect or the possible designs of the twelfth aspect.

According to a twenty-eighth aspect, this application further provides a chip. The chip may be coupled to a memory of a DRX apparatus, and is configured to invoke a computer program stored in the memory and perform the method according to any one of the first aspect or the possible designs of the first aspect, the method according to any one of the second aspect or the possible designs of the second aspect, the method according to any one of the third aspect or the possible designs of the third aspect, the method according to any one of the fourth aspect or the possible designs of the fourth aspect, the method according to any one of the fifth aspect or the possible designs of the fifth aspect, the method according to any one of the sixth aspect or the possible designs of the sixth aspect, the method according to any one of the seventh aspect or the possible designs of the seventh aspect, the method according to any one of the eighth aspect or the possible designs of the eighth aspect, the method according to any one of the ninth aspect or the possible designs of the ninth aspect, the method according to any one of the tenth aspect or the possible designs of the tenth aspect, the method according to any one of the eleventh aspect or the possible designs of the eleventh aspect, or the method according to any one of the twelfth aspect or the possible designs of the twelfth aspect.

DESCRIPTION OF EMBODIMENTS

Figure 1:
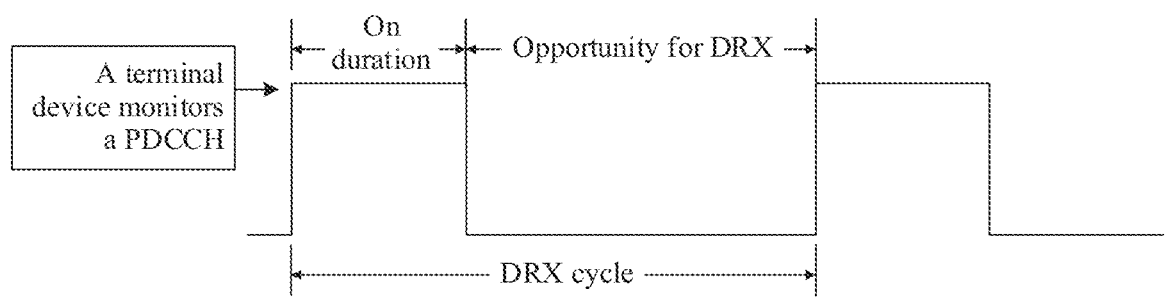
FIG. 1 is a schematic diagram of a DRX cycle to which an embodiment of this application is applicable.

The following clearly and completely describes the technical solutions in the embodiments of this application with reference to the accompanying drawings in the embodiments of this application.

To facilitate understanding of embodiments of this application, the following first explains and describes technical terms in embodiments of this application.

1. Sidelink (Sidelink, SL) Communication

In embodiments of this application, a sidelink may also be referred to as a side link, a PC5 interface link, or a link between terminal devices. Sidelink communication is wireless communication directly performed between two or more terminal devices. In such communication, two or more terminal devices that are geographically close to each other can communicate directly without using any network device. Data transmission in sidelink communication is different from that in typical cellular network communication. In typical cellular network communication, data is sent to a network device, that is, uplink (uplink, UL) transmission, or data is received from a network device, that is, downlink (downlink, DL) transmission. However, in sidelink communication, data is directly sent from a transmitting terminal device to a receiving terminal device through an air interface such as a PC5 interface, and is not sent through any network device. For example, sidelink communication is performed between a source address (source) and a destination address (destination). The transmitting terminal device may be a terminal device that sends a signal, data, signaling, or information. Correspondingly, the receiving terminal device is a terminal device that receives the signal, data, signaling, or information. Alternatively, the transmitting terminal device may be a terminal device that receives a signal, data, signaling, or information sent by a terminal device (including the receiving terminal device). In this case, the transmitting terminal device may also be a receiving terminal device. Correspondingly, the receiving terminal device may alternatively be a terminal device that sends a signal, data, signaling, or information to a terminal device (including the transmitting terminal device). In this case, the receiving terminal device is also a transmitting terminal device. The source is a terminal device that is identified by a source layer-2 ID at a transmitting end of data in sidelink communication, and the destination is a terminal device that is identified by a destination layer-2 ID at a receiving end of data in sidelink communication. In other words, the transmitting terminal device is a source of sidelink communication (or a medium access control (medium access control, MAC) protocol data unit (protocol data unit, PDU)), and the receiving terminal device is a destination of sidelink communication (or a MAC PDU). For sidelink unicast communication, a PC5-radio resource control (radio resource control, RRC) connection is a logical connection between a source and a destination. Because PC5-RRC connections one-to-one correspond to PC5 unicast links, after a PC5 unicast link (unicast link) is established, a PC5-RRC connection corresponding to the PC5 unicast link is established.

In embodiments of this application, a MAC PDU of sidelink communication may include one or more of a MAC control element (control element, CE), data of a sidelink control channel (sidelink control channel, SCCH), and data of a sidelink traffic channel (sidelink control channel, STCH). The MAC CE includes a sidelink channel state information (sidelink channel state information, SL-CSI) report MAC CE. "SL-CSI report" means that a terminal device provides sidelink channel state information for a peer terminal device. The SL-CSI report MAC CE includes a channel quality indicator (channel quality indicator, CQI) and a rank indicator (rank indicator, RI). The SL-CSI report MAC CE may be included in a MAC PDU of sidelink communication. The SCCH is a sidelink channel used to transmit control information, including a PC5-RRC message and a PC5-S message. The STCH is a sidelink channel used to transmit user information or service information.

In embodiments of this application, a resource used for sidelink communication between terminal devices is referred to as a sidelink resource, or may be referred to as a resource or a transmission resource for short. The sidelink resource may include a sidelink resource in frequency domain and a sidelink resource in time domain. From a perspective of a transmission type, the sidelink resource may include a sidelink sending resource and a sidelink receiving resource. The sidelink sending resource is used to send information, for example, send control information and/or data, and the sidelink receiving resource is used to receive information, for example, receive control information and/or data.

Currently, there are two methods for selecting a sidelink resource. In the first method, a network device allocates a sidelink resource to the transmitting terminal device. To be specific, the network device sends a sidelink grant (sidelink grant, SL grant) to the transmitting terminal device. The SL grant is used to indicate a transmission resource used by the transmitting terminal device to transmit a physical sidelink control channel (physical sidelink control channel, PSCCH) and/or a physical sidelink shared channel (physical sidelink shared channel, PSSCH). In the second method, the transmitting terminal device autonomously selects a sidelink resource. To be specific, the transmitting terminal device autonomously selects an SL grant. When the transmitting terminal device reserves a sidelink resource, the transmitting terminal device may further send sidelink control information (sidelink control information, SCI) to the receiving terminal device. The SCI carries information used to indicate the reserved sidelink resource.

2. Discontinuous Reception (Connected-Discontinuous Reception, C-DRX, or DRX) Mechanism In Uu interface communication between a terminal device and a network device, a DRX mechanism is introduced to reduce power consumption of the terminal device. The DRX mechanism is to configure a DRX cycle or DRX for a terminal device in an RRC connected state. FIG. 1 is a schematic diagram of a DRX cycle to which an embodiment of this application is applicable. It can be seen from the figure that time is divided into consecutive DRX cycles in time domain. The DRX cycle includes "On Duration (a wake-up period or a wake-up time or an active period or duration)" and "Opportunity for DRX (a sleep period or a sleep time)". During the "On Duration", the terminal device monitors and receives a physical downlink control channel (Physical Downlink Control Channel, PDCCH). During the "Opportunity for DRX", the terminal device does not receive the PDCCH, to reduce power consumption.

When one DRX cycle or one DRX is configured for the terminal device, states of the terminal device may be classified into a DRX active (active) state and a DRX non-active (non-active) state (or referred to as a sleep state). The terminal device is in the DRX active state in active time (active time), and the terminal device is in the DRX non-active state in non-active time (non-active time). When the terminal device is in the DRX active time, the terminal device monitors and receives the PDCCH. If the terminal device is in the DRX non-active time, the terminal device does not monitor or receive the PDCCH, to reduce power consumption.

When any one of the following timers is running, the terminal device is in the DRX active time:

a DRX on duration timer (drx-onDurationTimer);
a DRX inactivity timer (drx-InactivityTimer);
a DRX downlink retransmission timer (drx-RetransmissionTimerDL);
a DRX uplink retransmission timer (drx-RetransmissionTimerUL); and
a random access contention resolution timer (ra-ContentionResolutionTimer).

In addition, the DRX active time further includes other cases, for example, a waiting period after the terminal device sends a scheduling request (scheduling request, SR) on a physical uplink control channel (physical uplink control channel, PUCCH), or a period during which the terminal device does not receive a PDCCH indicating new transmission after successfully receiving a random access response (random access response, RAR) based on non-contention based (non-contention based) random access.

At a start moment of the DRX cycle, the terminal device starts the timer drx-onDurationTimer, that is, enters "On Duration". The timer starts to run, that is, the terminal device enters the DRX active time. If the terminal device receives a PDCCH indicating new downlink or uplink data transmission during running of the drx-onDurationTimer, the terminal device starts or restarts the timer drx-InactivityTimer, so that the terminal device is always in the DRX active time. This may be understood as: A time length in which the terminal device is in the active state is originally a time length of "On Duration", running the drx-InactivityTimer may prolong the time length in which the terminal device is in the active state. The terminal device ends the active time and enters the non-active time, that is, the terminal device enters the non-active state from the active state until the timer drx-InactivityTimer expires, or until the terminal device receives related media access control (medium access control. MAC) control element (control element, CE) signaling to stop the drx-onDurationTimer and the drx-InactivityTimer, for example, a DRX Command MAC CE. It is easy to understand that "On Duration" described herein represents a time period that is determined by the timer drx-onDurationTimer, and a length is equal to duration of the timer drx-onDurationTimer configured by the network device.

Figure 2:
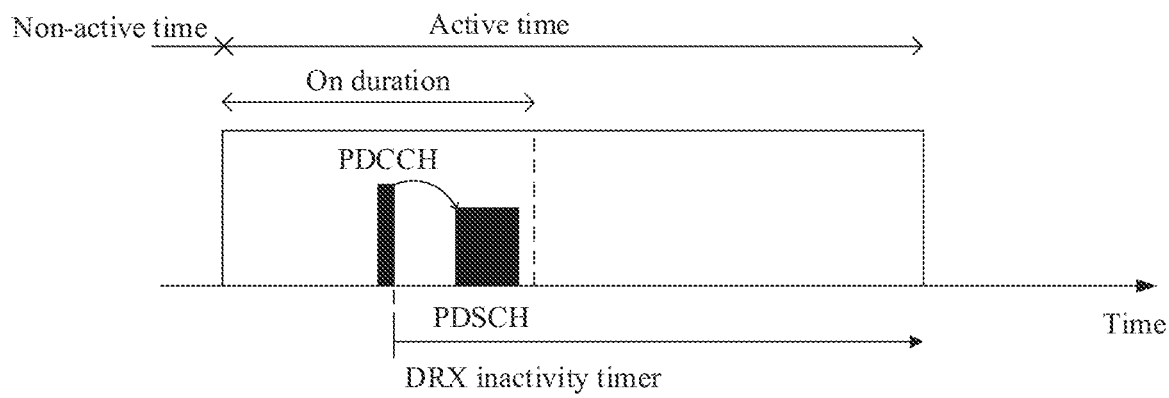
FIG. 2 is a schematic diagram of a state of a DRX inactivity timer to which an embodiment of this application is applicable.

The drx-InactivityTimer is usually started or restarted at the first symbol after a PDCCH indicating new data transmission. FIG. 2 is a schematic diagram of a state of a DRX inactivity timer to which an embodiment of this application is applicable. In FIG. 2, a PDCCH is used to schedule transmission of a new physical downlink shared channel (physical downlink shared channel, PDSCH).

As described above, the terminal device in the DRX active state continuously monitors a PDCCH. If the terminal device exits the DRX active state and enters the DRX non-active state, the terminal does not monitor the PDCCH. Therefore, the terminal device may stay in the DRX active state for a longer period through running the drx-InactivityTimer during "On Duration", and continuously monitor the PDCCH until the drx-InactivityTimer stops running.

3. Hybrid Automatic Repeat Request (Hybrid Automatic Repeat Request, HARQ)

For downlink transmission, after performing HARQ feedback on downlink data, a terminal device may start a HARQ round trip time (round-trip time, RTT) downlink timer (drx-HARQ-RTT-TimerDL) corresponding to a downlink HARQ process. The timer is used to indicate minimum duration before downlink HARQ retransmission is expected to be performed or SCI for scheduling downlink HARQ retransmission. After the timer expires, if data in the downlink HARQ process fails to be decoded, the terminal device may start drx-RetransmissionTimerDL.

For example, if the terminal device receives a MAC PDU in a configured downlink assignment, the terminal device may start drx-HARQ-RTT-TimerDL for a corresponding downlink HARQ process in the first symbol after transmission carrying a downlink HARQ feedback ends, and stop drx-RetransmissionTimerDL for the corresponding downlink HARQ process. Alternatively, if the terminal device receives a PDCCH indicating downlink transmission, the terminal device may start drx-HARQ-RTT-TimerDL for a corresponding downlink HARQ process in the first symbol after transmission carrying a downlink HARQ feedback ends, and stop drx-RetransmissionTimerDL for the corresponding downlink HARQ process. Alternatively, if the drx-HARQ-RTT-TimerDL expires and data of the corresponding downlink HARQ process fails to be decoded, the terminal device may start drx-RetransmissionTimerDL for a corresponding downlink HARQ process in the first symbol after the drx-HARQ-RTT-TimerDL expires.

4. DRX Mechanism in Sidelink Communication

To resolve a power consumption problem of a terminal device in sidelink communication, a DRX mechanism may be used in sidelink communication. The DRX mechanism in sidelink communication is similar to a DRX mechanism in Uu interface communication. In sidelink communication, if the DRX mechanism is introduced between a transmitting terminal device and a receiving terminal device, the receiving terminal device receives, only in DRX active time, at least one of a PSCCH, a PSSCH, and SCI that are sent by the transmitting terminal device.

When the DRX mechanism is used in sidelink communication, if a network device allocates a sidelink resource to the transmitting terminal device, because the network device does not know sidelink DRX active time between the transmitting terminal device and the receiving terminal device, a time domain position of the sidelink resource may not be in the sidelink DRX active time between the transmitting terminal device and the receiving terminal device. If the transmitting terminal device sends at least one of the PSCCH, the PSSCH, and the SCI by using the sidelink resource, the receiving terminal device does not receive at least one of the PSCCH, the PSSCH, and the SCI in sidelink DRX non-active time. The sidelink DRX inactive time is time other than the sidelink DRX active time. The SCI includes first-level SCI, second-level SCI, or the first-level SCI and the second-level SCI. The first-level SCI may be carried on the PSCCH. The second-level SCI may be carried on the PSSCH. Therefore, the receiving terminal device cannot receive at least one of the PSCCH, the PSSCH, and the SCI. To enable the receiving terminal device to receive at least one of the PSCCH, the PSSCH, and the SCI, the receiving terminal device also needs to receive at least one of the PSCCH, the PSSCH, and the SCI in the sidelink DRX non-active time. Consequently, the DRX mechanism cannot work in sidelink communication. If the transmitting terminal device does not send at least one of the PSCCH, the PSSCH, and the SCI by using the sidelink resource, the sidelink resource is wasted.

5. HARQ in Sidelink Communication

When the DRX mechanism is used in sidelink communication, the sidelink DRX active time of the terminal device may include running time of a sidelink DRX duration timer drx-onDurationTimerPC5, a sidelink DRX inactivity timer drx-InactivityTimerPC5, or a sidelink DRX retransmission timer drx-RetransmissionTimerPC5, and the terminal device may monitor the PSCCH, the PSSCH, or the SC in the sidelink DRX active time. Sidelink DRX may be sidelink DRX of the receiving terminal device, or sidelink DRX between the transmitting terminal device and the receiving terminal device, or sidelink DRX between a source and a destination. The source is a transmitting terminal device identified by a source layer-1 ID, the destination is a receiving terminal device identified by a destination layer-1 ID. Alternatively, the source is a transmitting terminal device identified by a source layer-2 ID, and the destination is a receiving terminal device identified by a destination layer-2 ID. A layer-1 ID is 8 LSB (least significant bits) of a layer-2 ID. That is, the layer-1 ID is the 8 least significant bits of the layer-2 ID. That is, the source layer-1 ID is 8 LSB of the source layer-2 ID, and the destination layer-1 ID is 8 LSB of the destination layer-2 ID. The PSCCH, the PSSCH, or the SCI is sent by the transmitting terminal device to the receiving terminal device, or is sent by the source to the destination.

The terminal device may determine a time domain resource and a frequency domain resource of PSSCH transmission based on a time domain resource allocation field and a frequency domain resource allocation field that are included in the SCI, and resources of PSCCH transmission. The time domain resource allocation field indicates N resources and a slot offset of a resource other than the first resource in the N resources. N may be 1, 2, or 3. A slot in which the first resource is located is a slot in which the SCI is located. The slot offset of the resource other than the first resource is a slot offset relative to the first resource. The frequency domain resource allocation field indicates a quantity of consecutive sub-channels of each of the N resources and a start sub-channel index of a resource other than the first resource. However, because running time of the drx-RetransmissionTimerPC5 is related to only a time domain position of the first resource, that is, a time domain position of a resource other than the first resource may not be in the sidelink DRX active time of the terminal device, the terminal device cannot monitor transmission on the N resources. Consequently, the resource other than the first resource is wasted.

6. Inter-Terminal Device Coordination (Inter-UE Coordination)

In sidelink communication, inter-terminal device coordination includes; A terminal device A sends, to a terminal device B, information used to indicate a group of resources. The information used to indicate the group of resources may be referred to as sidelink resource information. The sidelink resource information may be carried on a MAC CE, or the sidelink resource information is included in SCI, for example, included in second-level SCI. The group of resources indicated by the sidelink resource information may be one or more of the following:

(1) a preferred (preferred) resource used by the terminal device B to perform sidelink transmission, where for example, the terminal device A determines, based on a detection result, the preferred (preferred) resource used by the terminal device B to perform sidelink transmission;

(2) a non-preferred (not preferred) resource used by the terminal device B to perform sidelink transmission, where for example, the terminal device A determines, based on a detection result and/or a potential resource conflict, the non-preferred (not preferred) resource used by the terminal device B to perform sidelink transmission; and (3) conflicting resource For example, if the terminal device A detects that sidelink transmission resources to be used by the terminal device B and a terminal device C overlap, the terminal device A detects a conflicting resource.

When the DRX mechanism is used in sidelink communication, if a network device allocates a sidelink resource to a transmitting terminal device, because the network device does not know sidelink DRX active time of a receiving terminal device, a time domain position of the sidelink resource may not be in the sidelink DRX active time of the receiving terminal device. If the transmitting terminal device sends at least one of a PSCCH, a PSSCH, and SCI by using the sidelink resource, because the receiving terminal device does not receive the at least one of the PSCCH, the PSSCH, and the SCI in the sidelink DRX inactive time, the receiving terminal device cannot receive the at least one of the PSCCH, the PSSCH, and the SCI. To enable the receiving terminal device to receive at least one of the PSCCH, the PSSCH, and the SCI, the receiving terminal device also needs to receive at least one of the PSCCH, the PSSCH, and the SCI in the sidelink DRX non-active time. Consequently, the DRX mechanism cannot work in sidelink communication. If the transmitting terminal device does not send at least one of the PSCCH, the PSSCH, and the SCI by using the sidelink resource, the sidelink resource is wasted.

If the SCI indicates N resources, a time domain position of a resource other than the first resource may not be in the sidelink DRX active time of the receiving terminal device. Consequently, the terminal device cannot monitor transmission on the N resources, and the resource other than the first resource is wasted.

It can be learned that when the DRX mechanism is used in sidelink communication, if the network device allocates a sidelink resource to the transmitting terminal device, the DRX mechanism cannot work in sidelink communication or a sidelink resource is wasted because a time domain position of the sidelink resource may not be in sidelink DRX active time of the receiving terminal device.

In view of this, in embodiments of this application, the terminal device and the network device determine DRX active time through interaction, to avoid a waste of a resource allocated by a base station.

It should be understood that the technical solution in embodiments of this application may be used in various communication systems, for example, a 4th generation (4th Generation, 4G) communication system, a 5th generation (5th Generation, 5G) communication system, a machine type communication (Machine Type Communication, MTC) system, a device to device (device to device, D2D) system, an internet of things (Internet of Things, IoT) system, a vehicle-to-everything (vehicle-to-everything, V2X) system, a narrowband internet of things (Narrow Band Internet of Things, NB-IoT) system, a new communication system that may emerge in future communication development, and the like, provided that a communication entity in the communication system can configure a DRX parameter.

Figure 3:
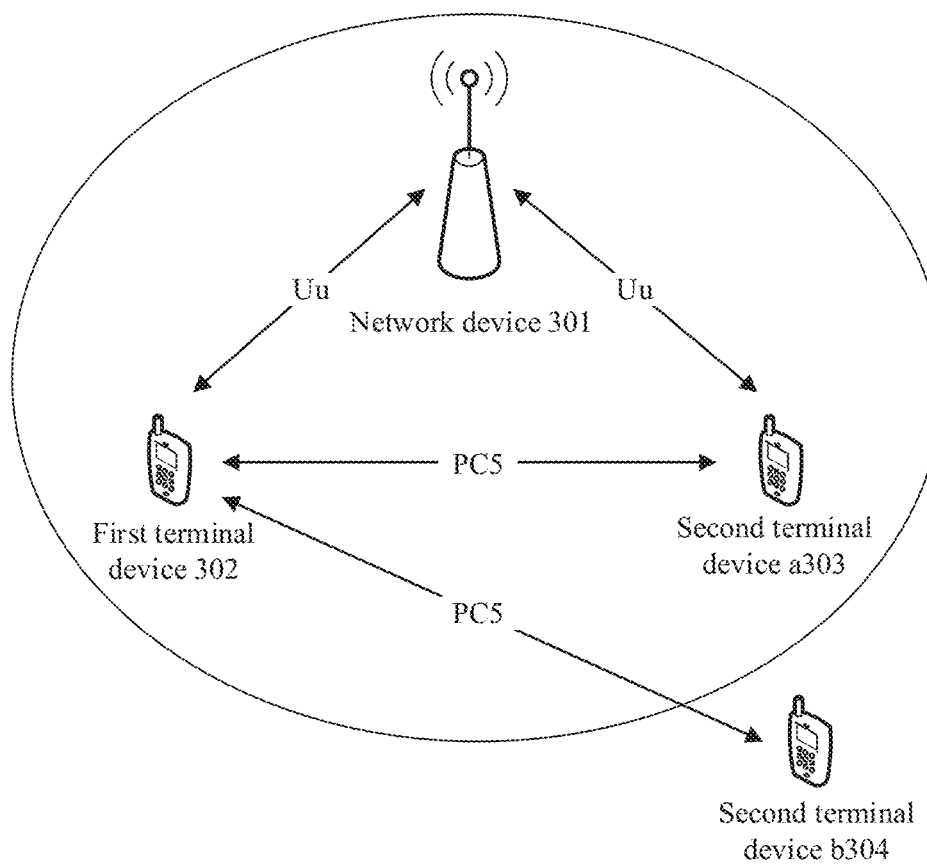
FIG. 3 is a schematic diagram of a network architecture to which an embodiment of this application is applicable.

FIG. 3 is a schematic diagram of a network architecture to which an embodiment of this application is applicable. The communication system includes a network device 301, a first terminal device 302, and a plurality of second terminal devices that perform sidelink communication with the first terminal device 302. The first terminal device 302 is a transmitting terminal device in sidelink communication. The second terminal devices are terminal devices at a receiving end in sidelink communication, and the second terminal devices include a second terminal device a303 and a second terminal device b304. In the communication system, the first terminal device 302 and the second terminal device a303 that are in a coverage area of the network device 301 may communicate with the network device 301 through a Uu interface. The second terminal device b304 that is outside the coverage area of the network device 301 cannot communicate with the network device 301 through a Uu interface. The first terminal device 302 may communicate with the second terminal device a303 and the second terminal device b304 through a PC5 interface.

The network device 301 includes, for example, an access network (access network, AN) device and a radio access network (radio access network, RAN) device. The access network device, for example, a base station (for example, an access point), may be a device, in an access network, that communicates with a wireless terminal device over an air interface through one or more cells. A base station may be configured to mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include an evolved NodeB (NodeB, eNB, or e-NodeB, evolved NodeB) in a long term evolution (long term evolution, LTE) system or a long term evolution-advanced (long term evolution-advanced, LTE-A) system; may include a next generation NodeB (next generation NodeB, gNB), a next generation evolved NodeB (next generation evolved NodeB, ng-eNB), or an enhanced next generation NodeB en-gNB (enhanced next generation NodeB, gNB) in a 5th generation (5th generation, 5G) mobile communication technology new radio (new radio, NR) system; may include a central unit (central unit. CU) and a distributed unit (distributed unit, DU) in a cloud access network (cloud radio access network, Cloud RAN) system; or may further include a relay device. This is not limited in embodiments of this application.

The first terminal device 302, the terminal device a303, the terminal device b304 include a device that provides a user with voice and/or data connectivity, for example, may include a handheld device having a wireless connection function, or a processing device connected to a wireless modem. The terminal device may communicate with a core network through a radio access network (radio access network, RAN), and exchange a voice and/or data with the RAN. The terminal device may be user equipment (user equipment, UE), a wireless terminal device, a mobile terminal device, a D2D communication terminal device, a vehicle-to-everything (vehicle to everything, V2X) communication terminal device, a machine-to-machine/machine-type communications (machine-to-machine/machine-type communications. M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may be a mobile phone (or referred to as a "cellular" phone), a computer with a mobile terminal device, or a portable, pocket-sized, handheld, or computer built-in mobile apparatus. For example, the terminal device may be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with relatively low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (on-board unit. OBU).

The foregoing describes the communication system to which embodiments of this application is applicable. The following describes a DRX method provided in an embodiment of this application with reference to the accompanying drawings.

It should be understood that the terms "system" and "network" may be used interchangeably in embodiments of this application. "At least one" means one or more, and "a plurality of" means two or more. A term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

To resolve the first problem, that is, how to avoid a problem that if a network device allocates a sidelink resource to a transmitting terminal device, a DRX mechanism cannot work or a sidelink resource is wasted because a time domain position of the sidelink resource may not be in sidelink DRX active time of a receiving terminal device. Embodiments of this application provide a solution in Embodiment 1. The following provides specific descriptions.

Embodiment 1

Figure 4:
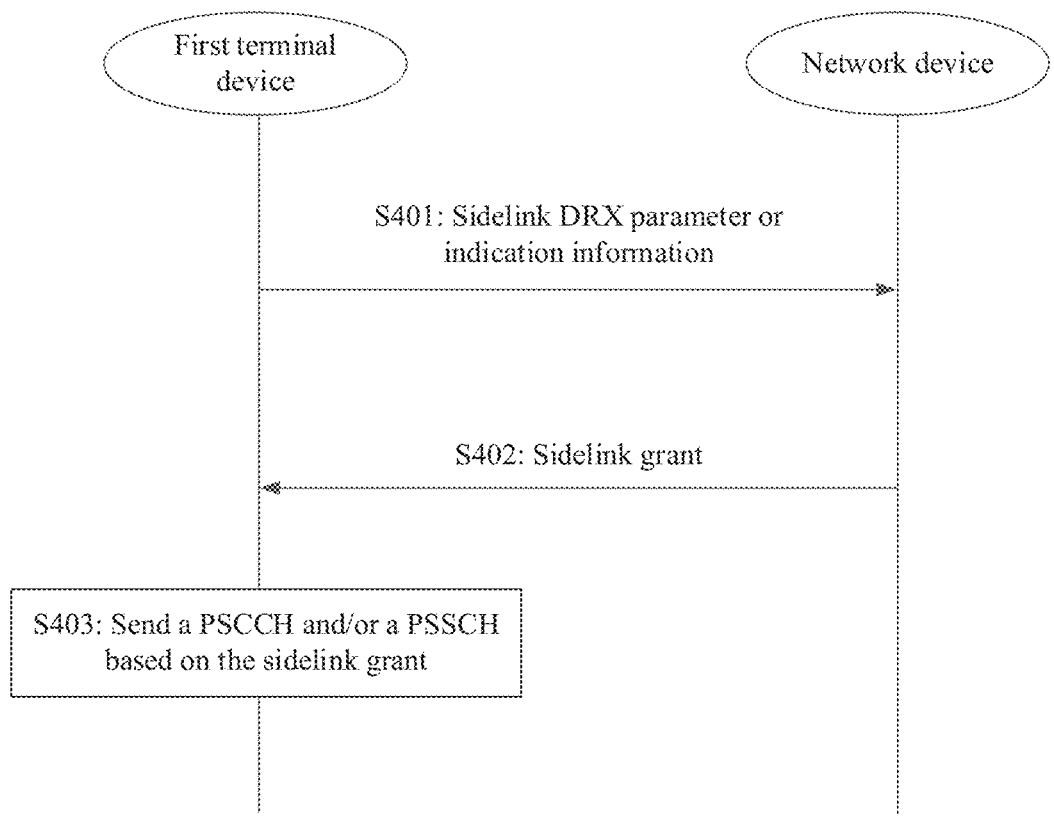
FIG. 4 is a schematic flowchart of a DRX method according to an embodiment of this application.

As shown in FIG. 4, an embodiment of this application provides a DRX method that may be used in the communication system shown in FIG. 3. The method includes the following steps.

S401: A first terminal device sends a sidelink DRX parameter of a second terminal device or indication information to a network device. Correspondingly, the network device receives the sidelink DRX parameter of the second terminal device or the indication information from the first terminal device.

In some embodiments, the indication information indicates a start, an end, or a start and an end of a first time period, and the first time period belongs to sidelink DRX active time of the second terminal device, or the second terminal device is in a sidelink DRX active state in the first time period. Alternatively, the indication information indicates a start, an end, or a start and an end of sidelink DRX active time or a sidelink DRX active state of the second terminal device. The second terminal device is a device that performs sidelink communication with the first terminal device, and there may be one or more second terminal devices. This is not specifically limited in this embodiment of this application.

It should be noted that, in this embodiment of this application, the sidelink DRX active time of the second terminal device may be understood as sidelink DRX active time between the first terminal device and the second terminal device, or may be understood as sidelink DRX active time between a source and a destination. The source is the first terminal device identified by a source layer-1 ID, and the destination is the second terminal device identified by a destination layer-1 ID. Alternatively, the source is the first terminal device identified by a source layer-2 ID, and the destination is the second terminal device identified by a destination layer-2 ID. One first terminal device may correspond to at least one source, and one second terminal device may correspond to at least one destination.

It should be noted that, in this embodiment of this application, a terminal device is in a sidelink DRX active state in sidelink DRX active time, and a terminal device is in a sidelink DRX non-active state outside a sidelink DRX active time, or a terminal device is in a sidelink DRX non-active state in sidelink DRX non-active time.

In step 401, the first terminal device may notify the network device of a status of the first time period or the sidelink DRX active time of the second terminal device in two manners. The following separately describes in detail specific implementations of the two manners with reference to specific instances.

Manner 1: The first terminal device may send the sidelink DRX parameter of the second terminal device to the network device. Correspondingly, the network device receives the sidelink DRX parameter of the second terminal device from the first terminal device. The network device may determine the first time period based on the sidelink DRX parameter. The first time period belongs to the sidelink DRX active time of the second terminal device, or the second terminal device is in an active state in the first time period. The second terminal is a device that performs sidelink communication with the first terminal device. There may be one or more second terminal devices. This is not specifically limited in this embodiment of this application.

Alternatively, the first terminal device may send the sidelink DRX parameter of the second terminal device to the network device. Correspondingly, the network device receives the sidelink DRX parameter of the second terminal device from the first terminal device. The network device may determine the sidelink DRX active time of the second terminal device based on the sidelink DRX parameter. The second terminal is a device that performs sidelink communication with the first terminal device. There may be one or more second terminal devices. This is not specifically limited in this embodiment of this application.

It should be noted that, in this embodiment of this application, the sidelink DRX parameter may include any one or a combination of the following:

drx-StartOffsetPC5, used to indicate a start position of a sidelink DRX cycle (cycle), where the start position of the sidelink DRX cycle includes one or a combination of the following: a start subframe, slot, and symbol;

drx-SlotOffsetPC5, used to indicate a delay before drx-onDurationTimerPC5 is started at the start position of the sidelink DRX cycle, that is, the terminal device starts the drx-onDurationTimerPC5 after the drx-SlotOffsetPC5 after the start position of the sidelink DRX cycle;

drx-onDurationTimerPC5, used to indicate duration at the beginning of the sidelink DRX cycle, that is, "On Duration" of the DRX cycle, where "On Duration" represents a time period, and is determined by the drx-onDurationTimerPC5, a length is equal to duration of the drx-onDurationTimerPC5, the terminal device starts the drx-onDurationTimerPC5 at a start moment of the sidelink DRX cycle, that is, enters "On Duration", and the drx-onDurationTimerPC5 starts to run, that is, enters sidelink DRX active time;

drx-InactivityTimerPC5, used to indicate duration after transmission of a PSCCH, a PSSCH, SCI, or a MAC PDU, where the SCI includes first-level SCI, second-level SCI, or first-level SCI and second-level SCI, the first-level SCI may be carried on the PSCCH, and the second-level SCI may be carried on the PSSCH; PSSCH transmission may be new transmission, and correspondingly, the PSCCH or the SCI is used to schedule new transmission, or PSSCH transmission may be new transmission, and the PSCCH or SCI is used to schedule new transmission or retransmission; for example, if a terminal device receives a PSCCH or SCI indicating new sidelink data transmission in sidelink DRX active time, the terminal device starts or restarts drx-InactivityTimerPC5, so that the terminal device is always in the sidelink DRX active time; it may be understood that a time length in which the terminal device is in a sidelink DRX active state is originally a time length of "On Duration", and running the drx-InactivityTimerPC5 may prolong the time in which the terminal device is in the sidelink DRX active state; and the terminal device exits the sidelink DRX active time and enters sidelink DRX non-active time, that is, the terminal device enters a sidelink DRX non-active state from the sidelink DRX active state until the drx-InactivityTimerPC5 expires, or the terminal device receives related MAC CE signaling, for example, DRX Command PC5 MAC CE, to stop the drx-onDurationTimerPC5 and the drx-InactivityTimerPC5;

drx-RetransmissionTimerPC5, used to indicate maximum duration before sidelink HARQ retransmission or SCI for scheduling sidelink HARQ retransmission is received, where different sidelink processes may correspond to different drx-RetransmissionTimerPC5; and drx-HARQ-RTT-TimerPC5, used to indicate minimum duration before sidelink HARQ retransmission is expected or SCI for scheduling sidelink HARQ retransmission, where different sidelink processes may correspond to different drx-HARQ-RTT-TimerPC5.

For example, if a terminal device receives a PSCCH, a PSSCH. SCI, or a MAC PDU, the terminal device may start drx-HARQ-RTT-TimerPC5 of a corresponding sidelink process in the first symbol, slot, subframe, or mini-slot after transmission of a sidelink HARQ feedback ends, or the terminal device may start drx-HARQ-RTT-TimerPC5 of a corresponding sidelink process in the first symbol, slot, subframe, or mini-slot after transmission of the PSCCH, the PSSCH, the SCI, or the MAC PDU ends. In this case, drx-RetransmissionTimerPC5 of the corresponding sidelink process may be stopped, or drx-RetransmissionTimerPC5 of the corresponding sidelink process may not be stopped. This is not specifically limited in this embodiment of this application. If the drx-HARQ-RTT-TimerPC5 expires, and data of the corresponding sidelink process fails to be decoded, the terminal device may start the drx-RetransmissionTimerPC5 of the corresponding sidelink process in the first symbol, slot, subframe, or mini-slot after the drx-HARQ-RTT-TimerPC5 expires. In other words, if the data of the corresponding sidelink process is successfully decoded, the terminal device does not start the drx-RetransmissionTimerPC5.

Alternatively, if the terminal device receives a PSCCH, a PSSCH, SCI, or a MAC PDU, and data of a corresponding sidelink process fails to be decoded, the terminal device may start drx-HARQ-RTT-TimerPC5 of the corresponding sidelink process in the first symbol, slot, subframe, or mini-slot after transmission of a sidelink HARQ feedback ends. In this case, drx-RetransmissionTimerPC5 of the corresponding sidelink process may be stopped, or drx-RetransmissionTimerPC5 of the corresponding sidelink process may not be stopped. This is not specifically limited in this embodiment of this application. In other words, if the data of the corresponding sidelink process is successfully decoded, the drx-HARQ-RTT-TimerPC5 is not started. If the drx-HARQ-RTT-TimerPC5 expires, the terminal device may start the drx-RetransmissionTimerPC5 of the corresponding sidelink process in the first symbol, slot, subframe, or mini-slot after the drx-HARQ-RTT-TimerPC5 expires.

Alternatively, if the terminal device receives a PSCCH, a PSSCH, SCI, or a MAC PDU, and a sidelink HARQ feedback of the corresponding PSCCH, PSSCH, SCI, or MAC PDU is a NACK, the terminal device may start drx-HARQ-RTT-TimerPC5 of a corresponding sidelink process in the first symbol, slot, subframe, or mini-slot after transmission of the sidelink HARQ feedback ends. In this case, drx-RetransmissionTimerPC5 of the corresponding sidelink process may be stopped, or drx-RetransmissionTimerPC5 of the corresponding sidelink process may not be stopped. This is not specifically limited in this embodiment of this application. In other words, if the sidelink HARQ feedback of the corresponding PSCCH, PSSCH, SCI, or MAC PDU is an ACK, the drx-HARQ-RTT-TimerPC5 is not started. If the drx-HARQ-RTT-TimerPC5 expires, the terminal device may start the drx-RetransmissionTimerPC5 of the corresponding sidelink process in the first symbol, slot, subframe, or mini-slot after the drx-HARQ-RTT-TimerPC5 expires.

Alternatively, if the terminal device receives a PSCCH, a PSSCH, SCI, or a MAC PDU, and data of a corresponding sidelink process fails to be decoded, the terminal device may start drx-RetransmissionTimerPC5 of the corresponding sidelink process in the first symbol, slot, subframe, or mini-slot after transmission carrying a sidelink HARQ feedback ends. Alternatively, if the terminal device receives a PSCCH, a PSSCH, SCI, or a MAC PDU, the terminal device may start drx-RetransmissionTimerPC5 of a corresponding sidelink process in the first symbol, slot, subframe, or mini-slot after transmission of the PSCCH, the PSSCH, the SCI, or the MAC PDU ends, and stop the drx-RetransmissionTimerPC5 if data of the corresponding sidelink process is successfully decoded.

Alternatively, if the terminal device receives a PSCCH, a PSSCH, SCI, or a MAC PDU, and a sidelink HARQ feedback of the corresponding PSCCH, PSSCH, SCI, or MAC PDU is a NACK, the terminal device may start drx-RetransmissionTimerPC5 of the corresponding sidelink process in the first symbol, slot, subframe, or mini-slot after transmission carrying a sidelink HARQ feedback ends. Alternatively, if the terminal device receives a PSCCH, a PSSCH, SCI, or a MAC PDU, the terminal device may start drx-RetransmissionTimerPC5 of a corresponding sidelink process in the first symbol, slot, subframe, or mini-slot after transmission of the PSCCH, the PSSCH, the SCI, or the MAC PDU ends, and stop the drx-RetransmissionTimerPC5 if a sidelink HARQ feedback of the corresponding PSCCH, PSSCH, SCI, or MAC PDU is an ACK.

It should be noted that in this embodiment of this application, the drx-StartOffsetPC5, the drx-SlotOffsetPC5, the drx-onDurationTimerPC5, the drx-InactivityTimerPC5, the drx-RetransmissionTimerPC5, and the drx-HARQ-RTT-TimerPC5 are merely examples of names of different sidelink DRX parameters, but are not intended to limit names of different sidelink DRX parameters.

It should be noted that, in this embodiment of this application, the foregoing timers such as the drx-onDurationTimerPC5, the drx-InactivityTimerPC5, the drx-RetransmissionTimerPC5, and the drx-HARQ-RTT-TimerPC5 are in a running state once started, until the timers are stopped or expire; otherwise, the timers are not in a running state. If a timer is not in a running state, the timer may be started. After the timer is stopped or expires, the timer is not in a running state until the timer is started. If the timer is in a running state, the timer may be restarted. A time length of the timer may be understood as a time length in which the timer continuously runs from starting or restarting to expiration. A value of the timer is an initial value of the timer when the timer is started or restarted. The initial value of the timer may be the time length of the timer. A value of the timer is the time length of the timer when the timer is started or restarted. It should be noted that, in this embodiment of this application, the sidelink DRX parameter may be configured by the first terminal device, that is, configured by a transmitting terminal device in sidelink communication, or may be configured by the second terminal device, that is, configured by a receiving terminal device in sidelink communication. One party that configures the sidelink DRX parameter sends the sidelink DRX parameter to the other party in sidelink communication. Alternatively, the sidelink DRX parameter may be configured by the network device, and the network device sends the sidelink DRX parameter to a device that performs sidelink communication. This is not specifically limited in this embodiment of this application.

It should be noted that, in this embodiment of this application, if a plurality of second terminal devices perform sidelink communication with the first terminal device, or a plurality of destinations perform sidelink communication with the source, where the source is the first terminal device identified by the source layer-1 ID or the source layer-2 ID, and the destination is the second terminal device identified by the destination layer-1 ID or the destination layer-2 ID, at least one second terminal device, a second terminal device having to-be-transmitted data, a destination, or a destination having to-be-transmitted data is in sidelink DRX active time in the first time period or the sidelink DRX active time of the second terminal device. The first time period or the sidelink DRX active time of the second terminal device may be a continuous time period, or may not be a continuous time period. This is not specifically limited in this embodiment of this application.

The first time period or the sidelink DRX active time of the second terminal device may include specific sidelink DRX active time of each second terminal device. For example, if three second terminal devices perform sidelink communication with the first terminal device, and sidelink DRX active time of the three second terminal devices is first sidelink DRX active time, second sidelink DRX active time, and third sidelink DRX active time, the first time period or the sidelink DRX active time of the second terminal device may include the first sidelink DRX active time, the second sidelink DRX active time, and the third sidelink DRX active time.

The first time period or the sidelink DRX active time of the second terminal device may also include an intersection set or a union set of sidelink DRX active time of at least two second terminal devices, for example, any one or a combination of the following: an earliest start moment of the sidelink DRX active time of each second terminal device to an earliest end moment of the sidelink DRX active time of each second terminal device; an earliest start moment of the sidelink DRX active time of each second terminal device to a latest end moment of the sidelink DRX active time of each second terminal device; a latest start moment of the sidelink DRX active time of each second terminal device to an earliest end moment of the sidelink DRX active time of each second terminal device; a latest start moment of the sidelink DRX active time of each second terminal device to a latest end moment of the sidelink DRX active time of each second terminal device; and a start moment or an end moment of sidelink DRX active time of any second terminal device to a start moment or an end moment of sidelink DRX active time of any second terminal device.

For example, if three second terminal devices perform sidelink communication with the first terminal device, sidelink DRX active time of the $1^{st}$ second terminal device is 11:25 to 11:30, sidelink DRX active time of the $2^{nd}$ second terminal device is 11:28 to 11:32, and sidelink DRX active time of the $3^{rd}$ second terminal device is 11:31 to 11:35, an intersection set or a union set of sidelink DRX active time of at least two second terminal devices may be 11:25 to 11:30, 11:25 to 11:35, 11:30 to 11:31, 11:31 to 11:35, 11:28 to 11:35, 11:25 to 11:28, 11:28 to 11:30, 11:31 to 11:32, or 11:32 to 11:35.

The foregoing is merely an example of the intersection set or the union set of the sidelink DRX active time of the at least two second terminal devices, provided that the intersection set or the union set overlaps with sidelink DRX active time of any second terminal device. A manner of determining the intersection set or the union set is not specifically limited in this embodiment of this application.

The first time period or the sidelink DRX active time of the second terminal device may also include an intersection set or a union set of sidelink DRX active time of at least two second terminal devices having to-be-transmitted data, for example, any one or a combination of the following: an earliest start moment of the sidelink DRX active time of each second terminal device having to-be-transmitted data to an earliest end moment of the sidelink DRX active time of each second terminal device having to-be-transmitted data; an earliest start moment of the sidelink DRX active time of each second terminal device having to-be-transmitted data to a latest end moment of the sidelink DRX active time of each second terminal device having to-be-transmitted data; a latest start moment of the sidelink DRX active time of each second terminal device having to-be-transmitted data to an earliest end moment of the sidelink DRX active time of each second terminal device having to-be-transmitted data; a latest start moment of the sidelink DRX active time of each second terminal device having to-be-transmitted data to a latest end moment of the sidelink DRX active time of each second terminal device having to-be-transmitted data; and a start moment or an end moment of sidelink DRX active time of any second terminal device having to-be-transmitted data to a start moment or an end moment of sidelink DRX active time of any second terminal device having to-be-transmitted data.

It should be noted that, in this embodiment of this application, the first time period or the sidelink DRX active time of the second terminal device may be understood as sidelink DRX active time of a destination having to-be-transmitted data, and sidelink DRX active time of any destination does not change in the time period.

It should be noted that, in this embodiment of this application, the second terminal device having to-be-transmitted data may be understood as the first terminal device having data to be sent to the second terminal device or any destination corresponding to the second terminal device. Specifically, the first terminal device or a MAC entity of the first terminal device has available sidelink data of a logical channel of the second terminal device, or sidelink data of a logical channel of the second terminal device may be provided to the first terminal device or a MAC entity of the first terminal device, or sidelink data of a logical channel of the second terminal device may be used by the first terminal device or a MAC entity of the first terminal device, or sidelink data of a logical channel of the second terminal device appears or exists in the first terminal device or a MAC entity of the first terminal device.

Optionally, when a status of the to-be-transmitted data of the second terminal device changes, for example, when the first terminal device sends the to-be-transmitted data to the second terminal device by using a resource indicated by a sidelink grant sent by the network device, or a second terminal device that previously has no to-be-transmitted data has to-be-transmitted data, the first time period or the sidelink DRX active time of the second terminal device may change, and the network device needs to redetermine the first time period or redetermine the sidelink DRX active time of the second terminal device.

It should be noted that, in this embodiment of this application, the sidelink DRX active time of the second terminal device may include running time of drx-onDurationTimerPC5 and drx-InactivityTimerPC5. For example, at a start moment of a sidelink DRX cycle, the second terminal device starts the drx-onDurationTimerPC5, that is, enters "On Duration", and the drx-onDurationTimerPC5 starts to run, that is, enters the sidelink DRX active time. During running of the drx-onDurationTimerPC5, the second terminal device starts or restarts the drx-InactivityTimerPC5, to prolong the sidelink DRX active time. Because the drx-InactivityTimerPC5 maintained by the second terminal device needs to be consistent with drx-InactivityTimerPC5 maintained by the first terminal device and the network device, the first terminal device and the network device also need to start or restart the drx-InactivityTimerPC5 during running of the drx-onDurationTimerPC5. The first terminal device, the second terminal device, and the network device may implicitly start or restart the drx-InactivityTimerPC5, or may explicitly start or restart the drx-InactivityTimerPC5. This is not specifically limited in this embodiment of this application.

Manner 2: The first terminal device may send the indication information to the network device, and correspondingly, the network device receives the indication information sent by the first terminal device. The network device may determine the first time period based on the indication information. The indication information indicates the start, the end, or the start and the end of the first time period. The first time period belongs to the sidelink DRX active time of the second terminal device, or the second terminal device is in a sidelink DRX active state in the first time period. The second terminal is a device that performs sidelink communication with the first terminal device. There may be one or more second terminal devices. This is not specifically limited in this embodiment of this application.

Alternatively, the first terminal device may send the indication information to the network device, and correspondingly, the network device receives the indication information sent by the first terminal device. The network device may determine, based on the indication information, the sidelink DRX active time of the second terminal device, or determine whether the second terminal device is in the sidelink DRX active time, or determine whether the second terminal device is in sidelink DRX non-active time, or determine a sidelink DRX state of the second terminal device, for example, determine whether the second terminal device is in a sidelink DRX active state or a sidelink DRX non-active state. The indication information indicates a start, an end, or a start and an end of the sidelink DRX active time or the sidelink DRX active state of the second terminal device. Alternatively, the indication information indicates that the second terminal device is in the sidelink DRX active time or the second terminal device is in the sidelink DRX non-active time, or indicates the sidelink DRX state of the second terminal device, for example, indicates whether the second terminal device is in the sidelink DRX active state or the sidelink DRX non-active state. The second terminal is a device that performs sidelink communication with the first terminal device. There may be one or more second terminal devices. This is not specifically limited in this embodiment of this application.

It should be noted that, in this embodiment of this application, the indication information may be included in UCI, a PUCCH, a MAC CE, or a radio resource control (radio resource control, RRC) message.

It should be noted that in this embodiment of this application, before the first terminal device sends the indication information to the network device, the first terminal device needs to determine the first time period or the sidelink DRX active time of the second terminal device. If a plurality of second terminal devices perform sidelink communication with the first terminal device, or a plurality of destinations perform sidelink communication with the source, at least one second terminal device, a second terminal device having to-be-transmitted data, a destination, or a destination having to-be-transmitted data is in sidelink DRX active time in the first time period or the sidelink DRX active time of the second terminal device determined by the first terminal device. The first time period or the sidelink DRX active time of the second terminal device determined by the first terminal device may be a continuous time period, or may not be a continuous time period. This is not specifically limited in this embodiment of this application.

The sidelink DRX active time of the second terminal device or the first time period determined by the first terminal device may include specific sidelink DRX active time of each second terminal device. For example, if three second terminal devices perform sidelink communication with the first terminal device, and sidelink DRX active time of the three second terminal devices is first sidelink DRX active time, second sidelink DRX active time, and third sidelink DRX active time, the sidelink DRX active time of the second terminal device or the first time period determined by the first terminal device may include the first sidelink DRX active time, the second sidelink DRX active time, and the third sidelink DRX active time.

The sidelink DRX active time of the second terminal device or the first time period determined by the first terminal device may also include an intersection set or a union set of sidelink DRX active time of at least two second terminal devices, for example, any one or a combination of the following: an earliest start moment of the sidelink DRX active time of each second terminal device to an earliest end moment of the sidelink DRX active time of each second terminal device; an earliest start moment of the sidelink DRX active time of each second terminal device to a latest end moment of the sidelink DRX active time of each second terminal device; a latest start moment of the sidelink DRX active time of each second terminal device to an earliest end moment of the sidelink DRX active time of each second terminal device; a latest start moment of the sidelink DRX active time of each second terminal device to a latest end moment of the sidelink DRX active time of each second terminal device; and a start moment or an end moment of sidelink DRX active time of any second terminal device to a start moment or an end moment of sidelink DRX active time of any second terminal device.

For example, if three second terminal devices perform sidelink communication with the first terminal device, sidelink DRX active time of the $1^{st}$ second terminal device is 11:25 to 11:30, sidelink DRX active time of the $2^{nd}$ second terminal device is 11:28 to 11:32, and sidelink DRX active time of the $3^{rd}$ second terminal device is 11:31 to 11:35, an intersection set or a union set of sidelink DRX active time of at least two second terminal devices may be 11:25 to 11:30, 11:25 to 11:35, 11:30 to 11:31, 11:31 to 11:35, 11:28 to 11:35, 11:25 to 11:28, 11:28 to 11:30.11:31 to 11:32, or 11:32 to 11:35.

The foregoing is merely an example of the intersection set or the union set of the sidelink DRX active time of the at least two second terminal devices, provided that the intersection set or the union set overlaps with sidelink DRX active time of any second terminal device. A manner of determining the intersection set or the union set is not specifically limited in this embodiment of this application.

The sidelink DRX active time of the second terminal device or the first time period determined by the first terminal device may also include an intersection set or a union set of sidelink DRX active time of at least two second terminal devices having to-be-transmitted data, for example, any one or a combination of the following: an earliest start moment of the sidelink DRX active time of each second terminal device having to-be-transmitted data to an earliest end moment of the sidelink DRX active time of each second terminal device having to-be-transmitted data; an earliest start moment of the sidelink DRX active time of each second terminal device having to-be-transmitted data to a latest end moment of the sidelink DRX active time of each second terminal device having to-be-transmitted data; a latest start moment of the sidelink DRX active time of each second terminal device having to-be-transmitted data to an earliest end moment of the sidelink DRX active time of each second terminal device having to-be-transmitted data; a latest start moment of the sidelink DRX active time of each second terminal device having to-be-transmitted data to a latest end moment of the sidelink DRX active time of each second terminal device having to-be-transmitted data; and a start moment or an end moment of sidelink DRX active time of any second terminal device having to-be-transmitted data to a start moment or an end moment of sidelink DRX active time of any second terminal device having to-be-transmitted data. This is not specifically limited in this embodiment of this application.

It should be noted that, in this embodiment of this application, the sidelink DRX active time of the second terminal device or the first time period determined by the first terminal device may be understood as sidelink DRX active time of a destination having to-be-transmitted data, and sidelink DRX active time of any destination does not change in the time period.

Optionally, when a status of the to-be-transmitted data of the second terminal device changes, for example, when the first terminal device sends the to-be-transmitted data to the second terminal device corresponding to a sidelink grant by using a resource indicated by the sidelink grant sent by the network device, or a second terminal device that previously has no to-be-transmitted data has to-be-transmitted data, the first time period determined by the first terminal device or the sidelink DRX active time that is of the second terminal device and that is determined by the first terminal device may change, and the first terminal device needs to redetermine the first time period or redetermine the sidelink DRX active time of the second terminal device.

For example, the first terminal device may send the indication information to the network device by using any one of the following methods. The indication information may indicate the start, the end, or the start and the end of the first time period, or indicate the end or the start and the end of the sidelink DRX active time of the second terminal device, or indicate that the second terminal device is in the sidelink DRX active time, or indicate that the second terminal device is in the sidelink DRX non-active time, or indicate the sidelink DRX state of the second terminal device, for example, indicate whether the second terminal device is in the sidelink DRX active state or sidelink DRX non-active state.

Figure 5A:
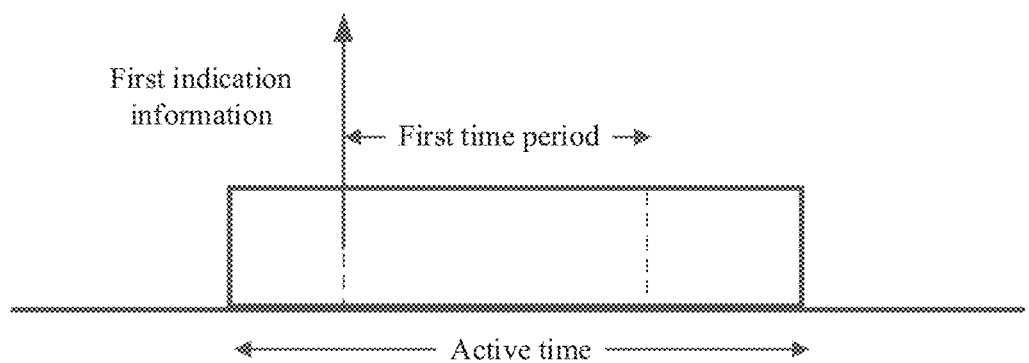
FIG. 5a is a schematic diagram of sending indication information according to an embodiment of this application.

(1) As shown in FIG. 5a, the first terminal device sends first indication information to the network device, and correspondingly, the network device receives the first indication information from the first terminal device. The first indication information indicates an end moment of the first time period. It should be noted that in this embodiment of this application, the first time period belongs to the sidelink DRX active time of the second terminal device, and the first time period and the sidelink DRX active time of the second terminal device may completely overlap, or may not completely overlap. FIG. 5a shows only a case in which the first time period and the sidelink DRX active time of the second terminal device do not completely overlap.

It should be noted that, in this embodiment of this application, the first terminal device may send the first indication information to the network device at a start moment of the first time period, after a start moment of the first time period, or in the first time period. Optionally, if the end moment of the first time period changes compared with an end moment of the first time period reported last time, the first terminal device may send the first indication information to the network device at any moment in the first time period. Alternatively, if the end moment of the first time period is earlier than an end moment of the first time period reported last time, the first terminal device may send the first indication information to the network device when the first time period changes. For example, when the first terminal device has no data to be sent to the second terminal device, the first time period changes. Alternatively, if the end moment of the first time period is later than or equal to an end moment of the first time period reported last time, the first terminal device may send the first indication information to the network device at the end moment of the first time period reported last time or at a moment preceding the end moment of the first time period reported last time by a gap.

It should be noted that in this embodiment of this application, a moment preceding the end moment by a gap may be determined based on DCI sent by the network device to the first 20 terminal device. Specifically, the DCI sent by the network device to the first terminal device includes a "Time gap" field. A value m of the field indicates an index m+1 in a slot offset table. The slot offset table is a parameter configured by the network device, for example, timeGap-FirstSidelinkTransmission or sl-DCI-ToSL-Trans. The table is used to indicate a slot offset between receiving the DCI and the first sidelink transmission scheduled by the DCI, that is, a slot offset between receiving the DCI and the first sidelink transmission indicated by a sidelink grant included in the DCI. A specific form of the table may be that the table includes one or more slot offsets. A sequence of the one or more slot offsets implicitly indicates an index. For example, the first slot offset corresponds to an index 1, and the second slot offset corresponds to an index 2. The table may further explicitly indicate an index corresponding to each slot offset. It is assumed that a slot offset corresponding to an index m+1 is represented by $K_{SL}$. A slot for the first sidelink transmission scheduled by the DCI is not earlier than the first sidelink slot in a resource pool $$T_{DL} - \frac{T_{TA}}{2} + K_{SL} \times T_{slot},$$

where $T_{DL}$ is a start moment of a downlink slot in which the DCI is located, $T_{TA}$ is a timing advance (timing advance, TA) value, and $T_{slot}$ is duration of a sidelink slot. The moment preceding the end moment by a gap may be determined based on the slot offset table. For example, a gap before the end moment may be a smallest value or a largest value in the slot offset table, or the moment preceding the end moment by a gap is an end moment of a first slot. When the slot for the first sidelink transmission scheduled by the DCI in the first slot is not earlier than the first sidelink slot in the resource pool $$T_{DL,first\ slot} - \frac{T_{TA}}{2} + K_{SL,min/max} \times T_{slot},$$

the slot for the first sidelink transmission scheduled by the DCI in the first slot is the last slot before the end moment. The slot for the first sidelink transmission scheduled by the DCI in the first slot may be partially before the end moment, partially after the end moment, or all before the end moment. Alternatively, a start moment of the first slot is not earlier than the first sidelink slot in the resource pool $$T_{DL,first\ slot} - \frac{T_{TA}}{2} + K_{SL,min/max} \times T_{slot}$$

and is the last slot before the end moment, where $T_{DL,first\ slot}$ is the start moment of the first slot, and $K_{SL,min/max}$ is the smallest value or the largest value in the slot offset table.

Figure 5B:
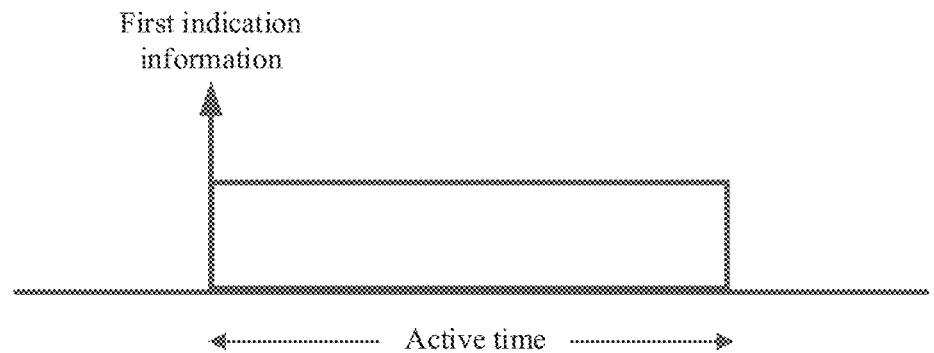
FIG. 5b is another schematic diagram of sending indication information according to an embodiment of this application.

Alternatively, as shown in FIG. 5b, the first terminal device sends first indication information to the network device, and correspondingly, the network device receives the first indication information from the first terminal device. The first indication information indicates an end moment of the sidelink DRX active time of the second terminal device.

It should be noted that, in this embodiment of this application, the first terminal device may send the first indication information to the network device at or after a start moment of the sidelink DRX active time of the second terminal device or in sidelink DRX active time of the second terminal device. Optionally, if the end moment of the sidelink DRX active time changes compared with an end moment of the sidelink DRX active time reported last time, the first terminal device may send the first indication information to the network device at any moment in the sidelink DRX active time. Alternatively, if the end moment of the sidelink DRX active time is earlier than an end moment of the sidelink DRX active time reported last time, the first terminal device may send the first indication information to the network device when the sidelink DRX active time changes. Alternatively, if the end moment of the sidelink DRX active time is later than or equal to an end moment of the sidelink DRX active time reported last time, the first terminal device may send the first indication information to the network device at the end moment of the sidelink DRX active time reported last time or at a moment preceding the end moment by a gap.

Figure 5C:
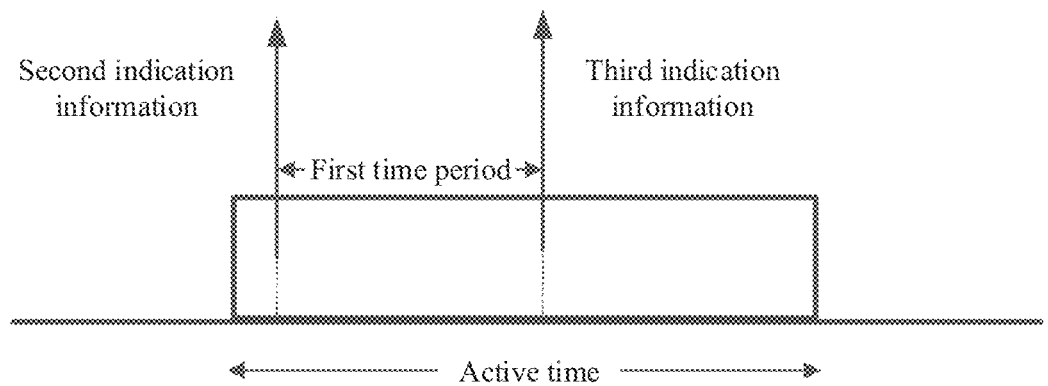
FIG. 5c is another schematic diagram of sending indication information according to an embodiment of this application.

(2) As shown in FIG. 5c, the first terminal device sends second indication information to the network device at or after a start moment of the first time period or in the first time period, and sends third indication information to the network device at an end moment of the first time period or at a moment preceding the end moment by a gap. Correspondingly, the network device receives the second indication information and the third indication information from the first terminal device. The second indication information indicates that the first time period starts or has started or the first time period exists. The third indication information indicates that the first time period has ended or is to end.

It should be noted that in this embodiment of this application, the first time period belongs to the sidelink DRX active time of the second terminal device, and the first time period and the sidelink DRX active time of the second terminal device may completely overlap, or may not completely overlap. FIG. 5c shows only a case in which the first time period and the sidelink DRX active time of the second terminal device do not completely overlap.

Figure 5D:
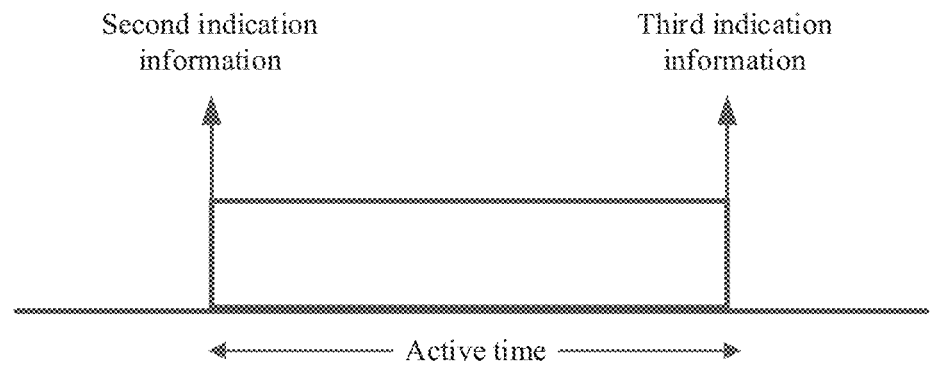
FIG. 5d is another schematic diagram of sending indication information according to an embodiment of this application.

Alternatively, as shown in FIG. 5d, the first terminal device sends second indication information to the network device at or after a start moment of the sidelink DRX active time of the second terminal device or in the sidelink DRX active time of the second terminal device, and sends third indication information to the network device at an end moment of the sidelink DRX active time of the second terminal device or at a moment preceding the end moment by a gap. Correspondingly, the network device receives the second indication information and the third indication information from the first terminal device. The second indication information indicates that the sidelink DRX active time of the second terminal device has started, and the third indication information indicates that the sidelink DRX active time of the second terminal device ends or is to end.

For example, the first terminal device may send indication information to the network device. The indication information may indicate the start and a time length of the first time period or the sidelink DRX active time, or indicate the start moment and the end moment of the first time period or the sidelink DRX active time, or indicate a time length and the end moment of the first time period or the sidelink DRX active time, or indicate a time length of the first time period or the sidelink DRX active time.

It should be noted that, in this embodiment of this application, the first terminal device may send the indication information to the network device when triggering a sidelink buffer status report (buffer status report, BSR). Alternatively, if the end moment of the first time period or the sidelink DRX active time changes compared with an end moment of the first time period or the sidelink DRX active time reported last time, the first terminal device may send the indication information to the network device at any moment in the first time period or the sidelink DRX active time. Alternatively, the end moment of the first time period or the sidelink DRX active time is earlier than an end moment of the first time period or the sidelink DRX active time reported last time, the first terminal device may send the indication information to the network device in the first time period or the sidelink DRX active time. Alternatively, if the end moment of the first time period or the sidelink DRX active time is later than or equal to an end moment of the first time period or the sidelink DRX active time reported last time, the first terminal device may send the indication information to the network device at the end moment of the first time period or the sidelink DRX active time reported last time or at a moment preceding the end moment by a gap, or the first terminal device sends the indication information to the network device at or after the start moment of the first time period or the sidelink DRX active time.

It should be noted that, in this embodiment of this application, the indication information sent by the first terminal device to the network device may alternatively be a BSR used to provide the sidelink data amount information to the network device. The sidelink BSR may indicate buffer data of a logical channel group (Logical Channel Group, LCG) of each destination corresponding to the first terminal device. If a buffer size of at least one destination corresponding to the first terminal device changes from non-0 to 0, the sidelink BSR is triggered, and a buffer of the destination includes buffers of all LCGs of the destination.

Optionally, if the sidelink BSR is a truncated (truncated) sidelink BSR, the truncated sidelink BSR is not sent or the truncated sidelink BSR is canceled. If a destination is not in sidelink DRX active time, the sidelink BSR does not include related information of the destination, such as a destination index, an LCG ID, and a buffer size. If a destination is not in sidelink DRX active time, sidelink data of the destination does not trigger the sidelink BSR. In other words, the destination corresponding to the sidelink data that triggers the sidelink BSR needs to be in the sidelink DRX active time. If a sidelink BSR is triggered, a destination corresponding to an LCG included in the sidelink BSR needs to be in sidelink DRX active time. If a destination is not in sidelink DRX active time, the sidelink BSR does not include an LCG of the destination. If a sidelink BSR is triggered, and a destination corresponding to an LCG included in the sidelink BSR is not in sidelink DRX active time, a buffer size of the LCG of the destination is 0.

It should be noted that, in this embodiment of this application, the indication information sent by the first terminal device to the network device may alternatively be information used to indicate that a buffer size of at least one destination changes from non-0 to 0, and a buffer of the destination includes buffers of all LCGs of the destination. The network device may estimate, based on the indication information, a destination whose data is transmitted by the first terminal device by using a resource indicated by a sidelink grant, to estimate sidelink DRX active time or a sidelink DRX active state of the destination.

It should be noted that, in this embodiment of this application, step 401 is an optional step. The first terminal device may send the sidelink DRX parameter of the second terminal device or the indication information to the network device. The network device may determine the first time period or the sidelink DRX active time based on the sidelink DRX parameter or the indication information. Alternatively, the first terminal device may not send the sidelink DRX parameter of the second terminal device or the indication information to the network device. The network device may determine the first time period or the sidelink DRX active time based on a sidelink DRX parameter of the second terminal device configured by the network device, or the network device may determine the first time period or the sidelink DRX active time based on a sidelink DRX parameter of the second terminal device sent by any second terminal device.

It should be noted that, in this embodiment of this application, the first terminal device, the second terminal device, or the network device may determine the end moment of the sidelink DRX active time of the second terminal device based on drx-InactivityTimerPC5. For example, the end moment of the sidelink DRX active time is an expiration moment of the drx-InactivityTimerPC5. Alternatively, the first terminal device, the second terminal device, or the network device may determine, based on a status of the drx-InactivityTimerPC5, whether a moment is in the sidelink DRX active time of the second terminal device. For example, if the drx-InactivityTimerPC5 is running at a moment, the moment is in the sidelink DRX active time of the second terminal device. Alternatively, the first terminal device, the second terminal device, or the network device may directly determine the sidelink DRX active time of the second terminal device, without starting or restarting the drx-InactivityTimerPC5. For example, a start or restart moment of the drx-InactivityTimerPC5 plus a time length of the drx-InactivityTimerPC5 is the end moment of the sidelink DRX active time of the second terminal device.

S402: The network device sends a sidelink grant to the first terminal device. Correspondingly, the first terminal device receives the sidelink grant from the network device. The sidelink grant is used to indicate, schedule, or allocate a resource for sending a PSCCH, a PSSCH, or SCI by the first terminal device.

In some embodiments, the sidelink grant is used to indicate, schedule, or allocate a resource for sending the PSCCH, the PSSCH, or the SCI by the first terminal device. Subsequently, an example in which the sidelink grant is used to indicate the resource for sending the PSCCH, the PSSCH, or the SCI by the first terminal device is used. A time domain position of the resource may be in the first time period or the sidelink DRX active time of the second terminal device, or a time domain position of the resource may not be in the first time period or the sidelink DRX active time of the second terminal device. This is not specifically limited in this embodiment of this application.

It should be noted that in this embodiment of this application, the sidelink grant may be included in downlink control information (downlink control information, DCI), a MAC CE, or an RRC message.

It should be noted that, in this embodiment of this application, the network device may further send device identification information to the first terminal device. The device identification information is used to indicate a second terminal device corresponding to the sidelink grant, that is, indicate that the first terminal device can send, on a resource indicated by the sidelink grant, the PSCCH, the PSSCH, or the SCI to the second terminal device indicated by the device identification information. Correspondingly, the first terminal device receives the device identification information from the network device, and determines the second terminal device corresponding to the sidelink grant based on the device identification information. The first terminal device sends the PSCCH, the PSSCH, or the SCI to the second terminal device by using the resource indicated by the sidelink grant. The device identification information may be a destination ID, for example, sl-destinationIdentity, and is used to identify a destination of sidelink communication. The sl-destinationIdentity may be a destination layer-2 ID. Alternatively, the device identification information may be a destination index. For example, the destination index is used to indicate a destination corresponding to any information element (information element, IE) in a destination information list or a sending resource request list sent by the first terminal device to the network device, and the destination index corresponds to a sequence of an information element IE or an entry (entry) corresponding to the destination in the list. For example, destination index=0 corresponds to a destination corresponding to the first IE or entry in the list, and destination index=1 corresponds to a destination corresponding to the second IE or entry in the list.

It should be noted that, in this embodiment of this application, the device identification information may be included in the DCI, the MAC CE, or the RRC message for sending the sidelink grant.

It should be noted that, in this embodiment of this application, if some of the one or more second terminal devices communicating with the first terminal device use sidelink DRX, and some second terminal devices do not use sidelink DRX. Optionally, the network device may indicate, to both a second terminal device that uses sidelink DRX and a second terminal device that does not use sidelink DRX, the device identification information corresponding to the sidelink grant. The first terminal device may send, by using the resource indicated by the sidelink grant, the PSCCH, the PSSCH, or the SCI to the second terminal device that uses sidelink DRX and that corresponds to the sidelink grant indicated by the network device. Alternatively, the network device may indicate, to a second terminal device that uses sidelink DRX, the device identification information corresponding to the sidelink grant, and do not indicate, to a second terminal device that does not use sidelink DRX, the device identification information corresponding to the sidelink grant. The first terminal device may send, by using the resource indicated by the sidelink grant, the PSCCH, the PSSCH, or the SCI to the second terminal device that uses sidelink DRX and that corresponds to the sidelink grant indicated by the network device. The first terminal device may determine the second terminal device that does not use the sidelink DRX and that corresponds to the sidelink grant, and send, by using the resource indicated by the sidelink grant, the PSCCH, the PSSCH, or the SCI to the second terminal device that uses the sidelink DRX and that corresponds to the sidelink grant.

It should be noted that, in this embodiment of this application, the device identification information may be included in the DCI for sending the sidelink grant by using any one of the following methods:

(1) The DCI includes the $X^{th}$ indication information. The $X^{th}$ indication information indicates whether the $Y^{th}$ field exists or whether the $Y^{th}$ field is valid, and the $Y^{th}$ field indicates device identification information of a second terminal device corresponding to the sidelink grant. If the $X^{th}$ indication information indicates that the $Y^{th}$ field exists or the $Y^{th}$ field is valid, the first terminal device may send, by using the resource indicated by the sidelink grant, the PSCCH, the PSSCH, or the SCI to a second terminal device that corresponds to the sidelink grant, that uses sidelink DRX, and that is indicated by the $Y^{th}$ field. If the $X^{th}$ indication information indicates that the $Y^th$ field does not exist, or the $Y^{th}$ field is invalid, or the Y field can be ignored, the first terminal device determines a second terminal device that does not use the sidelink DRX and that corresponds to the sidelink grant, and sends, by using the resource indicated by the sidelink grant, the PSCCH, the PSSCH, or the SCI to a second terminal device that uses the sidelink DRX and that corresponds to the sidelink grant.

(2) The DCI includes the $Y^{th}$ field, and the $Y^{th}$ field indicates device identification information of a second terminal device corresponding to the sidelink grant. If the second terminal device indicated by the $Y^{th}$ field is a second terminal device that uses sidelink DRX, the first terminal device may send, by using the resource indicated by the sidelink grant, the PSCCH, the PSSCH, or the SCI to the second terminal device that uses sidelink DRX, that corresponds to the sidelink grant, and that is indicated by the $Y^{th}$ field. If the second terminal device indicated by the $Y^{th}$ field is a second terminal device that does not use sidelink DRX, the first terminal device determines a second terminal device that does not use sidelink DRX and that corresponds to the sidelink grant, and sends, by using the resource indicated by the sidelink grant, the PSCCH, the PSSCH, or the SCI to a second terminal device that uses sidelink DRX and that corresponds to the sidelink grant.

It should be noted that, in this embodiment of this application, the DCI including the $X^{th}$ field or the $Y^{th}$ field may use a first DCI format, and the DCI not including the $X^{th}$ field or the $Y^{th}$ field may use a second DCI format, for example, a DCI format 3_0. When there is a terminal device that uses sidelink DRX in the second terminal devices that perform sidelink communication with the first terminal device, the first terminal device monitors or receives the first DCI format. When there is no terminal device that uses sidelink DRX in the second terminal devices that perform sidelink communication with the first terminal device, the first terminal device monitors or receives the second DCI format. The first terminal device may send, to the network device, indication information indicating that a second terminal device uses sidelink DRX, so that the network device determines a second terminal device that uses sidelink DRX and that communicates with the first terminal device.

S403: The first terminal device sends the PSCCH, the PSSCH, or the SCI based on the sidelink grant.

In some embodiments, if the first terminal device receives the device identification information from the network device, where the device identification information is used to indicate the second terminal device corresponding to the sidelink grant, the first terminal device may determine the second terminal device corresponding to the sidelink grant based on the device identification information, and send, by using the resource indicated by the sidelink grant, the PSCCH, the PSSCH, or the SCI to the second terminal device corresponding to the sidelink grant. A time domain position of the resource indicated by the sidelink grant is in the first time period, and the first time period belongs to the sidelink DRX active time of the second terminal device. Alternatively, a time domain position of the resource indicated by the sidelink grant is in the sidelink DRX active time of the second terminal device. In this way, the second terminal device can receive the PSCCH, the PSSCH, or the SCI in the sidelink DRX active time, to avoid a problem that a DRX mechanism between the first terminal device and the second terminal device cannot work or a sidelink resource is wasted because the time domain position of the resource indicated by the sidelink grant is not in the sidelink DRX active time of the second terminal device.

In some other embodiments, if the first terminal device does not receive the device identification information from the network device, where the device identification information is used to indicate the second terminal device corresponding to the sidelink grant, the first terminal device may determine the second terminal device corresponding to the sidelink grant, and send, by using the resource indicated by the sidelink grant, the PSCCH, the PSSCH, or the SCI to the second terminal device corresponding to the sidelink grant. A time domain position of the resource indicated by the sidelink grant is in the first time period, and the first time period includes the sidelink DRX active time of the second terminal device. Alternatively, a time domain position of the resource indicated by the sidelink grant includes the sidelink DRX active time of the second terminal device. In this way, the second terminal device can receive the PSCCH, the PSSCH, or the SCI in the sidelink DRX active time, to avoid a problem that a DRX mechanism between the first terminal device and the second terminal device cannot work or a sidelink resource is wasted because the time domain position of the resource indicated by the sidelink grant is not in the sidelink DRX active time of the second terminal device.

To properly control the sidelink DRX active time, that is, to maintain or align the sidelink DRX active time of the network device, the transmitting terminal device, and the receiving terminal device, embodiments of this application provide solutions in Embodiment 2 and Embodiment 3. Embodiment 2 and Embodiment 3 may be implemented with reference to Embodiment 1. The following provides specific descriptions.

Embodiment 2

In Embodiment 2, the sidelink DRX active time of the second terminal device may include running time of drx-onDurationTimerPC5 and drx-InactivityTimerPC5. For example, at a start moment of a sidelink DRX cycle, the second terminal device starts the drx-onDurationTimerPC5, that is, enters "On Duration", and the drx-onDurationTimerPC5 starts to run, that is, enters the sidelink DRX active time. During running of the drx-onDurationTimerPC5, the second terminal device starts or restarts the drx-InactivityTimerPC5, to prolong the sidelink DRX active time. Because the drx-InactivityTimerPC5 maintained by the second terminal device needs to be consistent with drx-InactivityTimerPC5 maintained by the first terminal device and the network device, the first terminal device and the network device also need to start or restart the drx-InactivityTimerPC5 during running of the drx-onDurationTimerPC5. The first terminal device, the second terminal device, and the network device may implicitly start or restart the drx-InactivityTimerPC5.

For example, the implicitly starting or restarting the drx-InactivityTimerPC5 may include at least one of the following cases:

The first terminal device may start or restart the drx-InactivityTimerPC5 after sending the PSCCH, the PSSCH, the SCI, or the MAC PDU. The first terminal device may determine, based on a time domain position of a PSCCH, PSSCH, SCI, or MAC PDU transmission, a moment at which the drx-InactivityTimerPC5 is started or restarted. For example, the drx-InactivityTimerPC5 is started in the first slot or symbol after the PSCCH, PSSCH, SCI, or MAC PDU transmission ends. The SCI includes second-level SCI.

Alternatively, the first terminal device may start or restart the drx-InactivityTimerPC5 after receiving HARQ feedback information that is sent by the second terminal device and that corresponds to PSCCH, PSSCH, SCI, or MAC PDU transmission. The HARQ feedback information includes positive acknowledgment (positive acknowledgement, ACK) information or negative acknowledgment (negative acknowledgement, NACK) information. The first terminal device may determine, based on a time domain position of HARQ feedback transmission, a moment at which the drx-InactivityTimerPC5 is started or restarted. For example, the drx-InactivityTimerPC5 is started in the first slot or symbol after the HARQ feedback transmission ends. The SCI includes second-level SCI.

The second terminal device may start or restart the drx-InactivityTimerPC5 after receiving the PSCCH, the PSSCH, the SCI, or the MAC PDU sent by the first terminal device. The second terminal device may determine, based on a time domain position of PSCCH, PSSCH, SCI, or MAC PDU transmission, a moment at which the drx-InactivityTimerPC5 is started or restarted. For example, the drx-InactivityTimerPC5 is started in the first slot or symbol after PSCCH, PSSCH, SCI, or MAC PDU reception ends.

Alternatively, the second terminal device may start or restart the drx-InactivityTimerPC5 after sending HARQ feedback information corresponding to PSCCH, PSSCH, SCI, or MAC PDU transmission. The HARQ feedback information includes ACK information or NACK information. The second terminal device may determine, based on a time domain position of HARQ feedback transmission, a moment at which the drx-InactivityTimerPC5 is started or restarted. For example, the drx-InactivityTimerPC5 is started in the first slot or symbol after the HARQ feedback transmission ends. The SCI includes second-level SCI.

The network device may start or restart the drx-InactivityTimerPC5 after sending the sidelink grant to the first terminal device. The sidelink grant is used to indicate a resource for sending PSCCH, PSSCH, or SCI transmission by the first terminal device. The resource indicated by the sidelink grant may include at least one sidelink transmission resource. The network device may determine, based on a time domain position of PSCCH, PSSCH, SCI, or MAC PDU transmission indicated by the sidelink grant, a moment at which the drx-InactivityTimerPC5 is started or restarted. For example, the drx-InactivityTimerPC5 is started in the first slot or symbol after the time domain position of the PSCCH. PSSCH. SCI, or MAC PDU transmission resource indicated by the sidelink grant ends.

Alternatively, after the network device receives HARQ feedback information of PSCCH, PSSCH, SCI, or MAC PDU transmission indicated by a sidelink grant corresponding to the first terminal device, the network device starts or restarts the drx-InactivityTimerPC5. The HARQ feedback information includes ACK information or NACK information. The network device may determine, based on a time domain position of SL HARQ feedback transmission corresponding to the PSCCH, PSSCH, SCI, or MAC PDU transmission, a moment at which the drx-InactivityTimerPC5 is started or restarted. For example, the drx-InactivityTimerPC5 is started in the first slot or symbol after SL HARQ feedback transmission corresponding to the PSCCH, PSSCH, SCI, or MAC PDU transmission ends. The SCI includes second-level SCI.

Embodiment 3

In Embodiment 3, the sidelink DRX active time of the second terminal device may include running time of drx-onDurationTimerPC5 and drx-InactivityTimerPC5. For example, at a start moment of a sidelink DRX cycle, the second terminal device starts the drx-onDurationTimerPC5, that is, enters "On Duration", and the drx-onDurationTimerPC5 starts to run, that is, enters the sidelink DRX active time. During running of the drx-onDurationTimerPC5, the second terminal device starts or restarts the drx-InactivityTimerPC5, to prolong the sidelink DRX active time. Because the drx-InactivityTimerPC5 maintained by the second terminal device needs to be consistent with drx-InactivityTimerPC5 maintained by the first terminal device and the network device, the first terminal device and the network device also need to start or restart the drx-InactivityTimerPC5 during running of the drx-onDurationTimerPC5. The first terminal device, the second terminal device, and the network device may explicitly start or restart the drx-InactivityTimerPC5.

For example, the explicitly starting or restarting the drx-InactivityTimerPC5 may include at least one of the following cases:

The first terminal device may send fourth indication information to the network device and the second terminal device, and the first terminal device starts or restarts the drx-InactivityTimerPC5 after sending the fourth indication information. The fourth indication information indicates to start or restart the drx-InactivityTimerPC5.

After receiving the fourth indication information sent by the first terminal device, the network device and the second terminal device start or restart the drx-InactivityTimerPC5. The fourth indication information indicates to start or restart the drx-InactivityTimerPC5.

It should be noted that, in this embodiment of this application, when the first terminal device sends the fourth indication information to the second terminal device, the fourth indication information may be included in the SCI. For example, a field (1-bit field) in the SCI is used to indicate to start or restart the drx-InactivityTimerPC5. A value 1 of the field indicates to start or restart drx-InactivityTimerPC5, and a value 0 of the field indicates to not start the drx-InactivityTimerPC5. Alternatively, the fourth indication information is transmitted by using the PSSCH. That is, the PSSCH carries the fourth indication information.

It should be noted that, in this embodiment of this application, when the first terminal device sends the fourth indication information to the network device and the second terminal device, the fourth indication information may further have any one of the following functions:

(1) indicating to start or restart the drx-InactivityTimerPC5;

(2) indicating a start or restart moment of the drx-InactivityTimerPC5, for example, indicating a slot or a symbol of the start or restart moment of the drx-InactivityTimerPC5, where when the slot of the start or restart moment of the drx-InactivityTimerPC5 is indicated, an SFN or a DFN in which the slot is located and an index in a system frame number (system frame number, SFN) or a direct frame number (direct frame number, DFN) in which the slot is located may be indicated, or a subframe in which the slot is located and an index of the slot in the subframe may be indicated, or an index of the slot may be indicated, for example, an index of the slot in a sidelink or an index of the slot in a sidelink resource pool; when the symbol of the start or restart moment of the drx-inactivityTimerPC5 is indicated, an index of the symbol in a subframe or a slot and the subframe or the slot may be indicated; and when the subframe is indicated, an SFN or a DFN in which the subframe is located and an index in the SFN or the DFN in which the subframe is located may be indicated, or an index of the subframe may be indicated, for example, an index of the subframe on a sidelink or an index of the subframe in a sidelink resource pool;

(3) indicating an expiration moment of the drx-InactivityTimerPC5, for example, indicating a slot or a symbol of the expiration moment of the drx-InactivityTimerPC5, where when the slot of the expiration moment of the drx-InactivityTimerPC5 is indicated, an SFN or a DFN in which the slot is located and an index in an SFN or a DFN in which the slot is located may be indicated, or a subframe in which the slot is located and an index of the slot in the subframe may be indicated, or an index of the slot may be indicated, for example, an index of the slot in a sidelink or an index of the slot in a sidelink resource pool; when the symbol of the expiration moment of the drx-InactivityTimerPC5 is indicated, an index of the symbol in a subframe or a slot and the subframe or the slot may be indicated; and when the subframe is indicated, an SFN or a DFN in which the subframe is located and an index in the SFN or the DFN in which the subframe is located may be indicated, or an index of the subframe may be indicated, for example, an index of the subframe on a sidelink or an index of the subframe in a sidelink resource pool; and (4) indicating an end moment of the sidelink DRX active time, for example, indicating a slot or a symbol of the end moment of the sidelink DRX active time.

When the slot of the end moment of the sidelink DRX active time is indicated, an SFN or a DFN in which the slot is located and an index in an SFN or a DFN in which the slot is located may be indicated, or a subframe in which the slot is located and an index of the slot in the subframe may be indicated, or an index of the slot may be indicated, for example, an index of the slot in a sidelink or an index of the slot in a sidelink resource pool; when the symbol of the end moment of the sidelink DRX active time is indicated, an index of the symbol in a subframe or a slot and the subframe or the slot may be indicated; and when the subframe is indicated, an SFN or a DFN in which the subframe is located and an index in the SFN or the DFN in which the subframe is located may be indicated, or an index of the subframe may be indicated, for example, an index of the subframe on a sidelink or an index of the subframe in a sidelink resource pool.

It should be noted that, in this embodiment of this application, when the first terminal device sends the fourth indication information to the network device, the fourth indication information may further have any one of the following functions:

(1) indicating a time domain position of a resource indicated by a sidelink grant, where the sidelink grant is a sidelink grant corresponding to the start or restart moment of the drx-InactivityTimerPC5; and (2) indicating a time domain position of downlink control information (downlink control information, DCI), where the DCI is used to schedule or include the sidelink grant corresponding to the start or restart moment of the drx-InactivityTimerPC5.

Optionally, when the drx-InactivityTimerPC5 is started or restarted, or after the drx-InactivityTimerPC5 is started or restarted, or at the expiration moment of the drx-InactivityTimerPC5, or at the end moment of the sidelink DRX active time of the second terminal device, the first terminal device triggers sending of the fourth indication information to the network device and the second terminal device.

Optionally, when the first terminal device sends the fourth indication information to the network device, the fourth indication information may further indicate the second terminal device or the destination corresponding to the drx-InactivityTimerPC5, or the second terminal device or the destination corresponding to the sidelink DRX active time.

In Embodiment 1, Embodiment 2, and Embodiment 3, the second terminal device may start or restart drx-InactivityTimerPC5, drx-HARQ-RTT-TimerPC5, or drx-RetransmissionTimerPC5 corresponding to sidelink DRX of the second terminal device based on information included in the received SCI.

For example, information included in the SCI may be a source layer-1 ID and a destination layer-1 ID. If the second terminal device receives new SCI (including a second-level SCI) transmitted on a scheduling sidelink, a source layer-1 ID included in the SCI is the same as a layer-1 ID of the first terminal device, and a destination layer-1 ID included in the SCI is the same as a layer-1 ID of the second terminal device, the second terminal device starts or restarts drx-InactivityTimerPC5, drx-HARQ-RTT-TimerPC5, or drx-RetransmissionTimerPC5 corresponding to sidelink DRX between the first terminal device and the second terminal device. That the source layer-1 ID included in the SCI is the same as the layer-1 ID of the first terminal device may also be understood as: The source layer-1 ID included in the SCI is the same as 8 LSB of a layer-2 ID of the first terminal device. That the destination layer-1 ID included in the SCI is the same as the layer-1 ID of the second terminal device may also be understood as: The destination layer-1 ID included in the SCI is the same as 8 LSB of a layer-2 ID of the second terminal device.

Alternatively, information included in the SCI may be a source layer-1 ID, a destination layer-1 ID, and a cast type (cast type). The cast type is used to indicate whether the sidelink communication is unicast communication, groupcast communication, or broadcast communication. If the second terminal device receives new SCI (including a second-level SCI) transmitted on a scheduling sidelink, a cast type included in the SCI indicates that the sidelink communication is unicast communication, a source layer-1 ID included in the SCI is the same as a layer-1 ID of the first terminal device, and a destination layer-1 ID included in the SCI is the same as a layer-1 ID of the second terminal device, the second terminal device starts or restarts drx-InactivityTimerPC5, drx-HARQ-RTT-TimerPC5, or drx-RetransmissionTimerPC5 corresponding to sidelink DRX between the first terminal device and the second terminal device.

Alternatively, information included in the SCI may be a destination layer-1 ID and a cast type. If the second terminal device receives new SCI (including a second-level SCI) transmitted on a scheduling sidelink, a cast type included in the SCI indicates that the sidelink communication is groupcast communication, and a destination layer-1 ID included in the SCI is the same as a destination layer-1 ID corresponding to the sidelink groupcast communication, the second terminal device starts or restarts drx-InactivityTimerPC5, drx-HARQ-RTT-TimerPC5, or drx-RetransmissionTimerPC5 corresponding to sidelink DRX of the groupcast communication.

It should be noted that, in this embodiment of this application, a layer-1 ID of a terminal device may be a source layer-1 ID used when the terminal device serves as a transmitting end, or a destination layer-1 ID used when the terminal device serves as a receiving end, and a layer-2 ID of the terminal device may be a source layer-2 ID used when the terminal device serves as a transmitting end, or a destination layer-2 ID used when the terminal device serves as a receiving end.

It should be noted that, in this embodiment of this application, the second terminal device may determine, based on information included in the received SCI, that the SCI is sent by the first terminal device to the second terminal device, or determine that the PSCCH, PSSCH, or MAC PDU corresponding to the SCI is sent by the first terminal device to the second terminal device.

It should be noted that, in this embodiment of this application, when the second terminal device performs sidelink communication with a plurality of first terminal devices, the plurality of first terminal devices correspond to a same layer-1 ID, and the second terminal device uses a same layer-1 ID during sidelink communication with each of the plurality of first terminal devices, if the source layer-1 ID included in the SCI received by the second terminal device is the same as the layer-1 ID of the plurality of first terminal devices, and the destination layer-1 ID included in the SCI is the same as the layer-1 ID of the second terminal device, the second terminal device starts or restarts drx-InactivityTimerPC5, drx-HARQ-RTT-TimerPC5, or drx-RetransmissionTimerPC5 corresponding to sidelink DRX between the second terminal device and a first terminal device, and the second terminal device cannot determine which first terminal device in the plurality of first terminal devices that perform sidelink communication with the second terminal device is the first terminal device.

In this embodiment of this application, the foregoing problem may be resolved in two manners. The following separately describes in detail specific implementations of the two manners with reference to specific examples.

Manner 1: The second terminal device may start or restart drx-InactivityTimerPC5, drx-HARQ-RTT-TimerPC5, or drx-RetransmissionTimerPC5 corresponding to sidelink DRX between the second terminal device and each of the plurality of first terminal devices.

Optionally, if the second terminal device receives new SCI (including second-level SCI) transmitted on a scheduling sidelink, the second terminal device does not stop the drx-RetransmissionTimerPC5, and restarts the drx-RetransmissionTimerPC5 when the drx-HARQ-RTT-TimerPC5 expires and the drx-RetransmissionTimerPC5 is running.

Manner 2: The second terminal device may start or restart drx-InactivityTimerPC5 corresponding to sidelink DRX between the second terminal device and one of the plurality of first terminal devices. Duration of the drx-InactivityTimerPC5 is a maximum value of drx-InactivityTimerPC5 corresponding to the sidelink DRX between the second terminal device and the plurality of first terminal devices.

Alternatively, the second terminal device may start or restart drx-HARQ-RTT-TimerPC5 corresponding to sidelink DRX between the second terminal device and one of the plurality of first terminal devices, where duration of the drx-HARQ-RTT-TimerPC5 is a minimum value of drx-InactivityTimerPC5 corresponding to sidelink DRX between the second terminal device and the plurality of first terminal devices.

Alternatively, the second terminal device may start or restart drx-RetransmissionTimerPC5 corresponding to sidelink DRX between the second terminal device and one of the plurality of first terminal devices. Duration of the drx-RetransmissionTimerPC5 is a maximum value of drx-InactivityTimerPC5 corresponding to the sidelink DRX between the second terminal device and the plurality of first terminal devices.

It should be noted that, in this embodiment of this application, when a plurality of sidelink unicast communications correspond to a same source layer-1 ID and a same destination layer-1 ID, SCI transmitted between a transmitting terminal device (for example, the first terminal device) and a receiving terminal device (for example, the second terminal device) in any sidelink unicast communication enables a receiving terminal device in another sidelink unicast communication to mistakenly start or restart drx-InactivityTimerPC5, drx-HARQ-RTT-TimerPC5, or drx-RetransmissionTimerPC5 corresponding to sidelink DRX between the receiving terminal device and a corresponding transmitting terminal device. Consequently, sidelink DRX active time of the receiving terminal device maintained by the transmitting terminal device in the another sidelink unicast communication is different from sidelink DRX active time of the receiving terminal device maintained by the receiving terminal device. Consequently, power consumption of the receiving terminal device is wasted, or the receiving terminal device cannot receive sidelink transmission from the transmitting terminal device.

In this embodiment of this application, the foregoing problem may be resolved in four manners. The following separately describes in detail specific implementations of the four manners with reference to specific examples.

Manner 1: If the second terminal device receives new SCI (including second-level SCI) transmitted on a scheduling sidelink, a destination layer-1 ID included in the SCI is the same as a layer-1 ID of the second terminal device in one sidelink unicast communication, and a source layer-1 ID included in the SCI is the same as a layer-1 ID of a first terminal device corresponding to the second terminal device in the sidelink unicast communication, the second terminal device may decode a MAC PDU corresponding to the SCI, and determine whether a source layer-2 ID of the MAC PDU is the same as a layer-2 ID of the first terminal device corresponding to the second terminal device in the sidelink unicast communication, or whether a destination layer-2 ID of the MAC PDU is the same as a layer-2 ID of the second terminal device in the sidelink unicast communication. If the source layer-2 ID of the MAC PDU is different from the layer-2 ID of the first terminal device, or the source layer-2 ID of the MAC PDU is different from the layer-2 ID of the second terminal device, the second terminal device may cancel starting or restarting drx-InactivityTimerPC5, drx-HARQ-RTT-TimerPC5, or drx-RetransmissionTimerPC5 corresponding to the sidelink unicast communication before (that is, the drx-InactivityTimerPC5, the drx-HARQ-RTT-TimerPC5, or the drx-RetransmissionTimerPC5 corresponding to the sidelink unicast communication is not started or restarted when it is determined that the source layer-2 ID of the MAC PDU is different from the layer-2 ID of the first terminal device, or the source layer-2 ID of the MAC PDU is different from the layer-2 ID of the second terminal device) or after (that is, the drx-InactivityTimerPC5, the drx-HARQ-RTT-TimerPC5, or the drx-RetransmissionTimerPC5 corresponding to the sidelink unicast communication is started or restarted when it is determined that the source layer-2 ID of the MAC PDU is different from the layer-2 ID of the first terminal device, or the source layer-2 ID of the MAC PDU is different from the layer-2 ID of the second terminal device) starting or restarting, based on the SCI, the drx-InactivityTimerPC5, the drx-HARQ-RTT-TimerPC5, or the drx-RetransmissionTimerPC5 corresponding to the sidelink unicast communication. In other words, the second terminal device does not start or restart the drx-InactivityTimerPC5, the drx-HARQ-RTT-TimerPC5, or the drx-RetransmissionTimerPC5 corresponding to the sidelink unicast communication due to the SCI.

Manner 2: If the second terminal device uses, is configured with, or activates sidelink DRX, layer-2 IDs used or allocated by the second terminal device in different sidelink unicast communications between the second terminal device and a plurality of first terminal devices corresponding to different layer-1 IDs.

For example, the second terminal device may use or allocate a layer-2 ID in a process of establishing a PC5 unicast link with the first terminal device. For example, the second terminal device may use or allocate the layer-2 ID when or before sending a PC5 unicast link establishment request message, or the second terminal device may use or allocate the layer-2 ID after receiving a PC5 unicast link establishment request message sent by the first terminal device. In addition, a layer-1 ID corresponding to the layer-2 ID is different from a layer-1 ID corresponding to a layer-2 ID used or allocated by the second terminal device in another sidelink unicast communication.

It should be understood that, in this embodiment of this application, after the second terminal device establishes the PC5 unicast link to the first terminal device, the second terminal device may further update the layer-2 ID, and send the updated layer-2 ID to the first terminal device in a process of updating a PC5 unicast link identifier, so that a layer-1 ID corresponding to the updated layer-2 ID is different from a layer-1 ID corresponding to a layer-2 ID used or allocated by the second terminal device in another sidelink unicast communication.

Manner 3: If the second terminal device uses, is configured with, or activates sidelink DRX, a layer-1 ID corresponding to a layer-2 ID used or allocated by the second terminal device in any sidelink unicast communication is different from a layer-1 ID corresponding to a layer-2 ID in another sidelink unicast communication. The second terminal device is not a terminal device in the another sidelink unicast communication.

It should be noted that, in this embodiment of this application, the second terminal device may obtain a source layer-1 ID and a destination layer-1 ID in the another sidelink unicast communication based on SCI transmitted in the another sidelink unicast communication, and decode a MAC PDU corresponding to the SCI, to obtain a source layer-2 ID and a destination layer-2 ID in the another sidelink unicast communication. In addition, it may be determined, based on the source layer-2 ID and the destination layer-2 ID in the another sidelink unicast communication, that the second terminal device is not a terminal device in the another sidelink uncast communication.

For example, the second terminal device may use or allocate a layer-2 ID in a process of establishing a PC5 unicast link with the first terminal device. For example, the second terminal device uses or allocates the layer-2 ID when or before sending a PC5 unicast link establishment request message, or the second terminal device uses or allocates the layer-2 ID after receiving a PC5 unicast link establishment request message sent by the first terminal device. In addition, a layer-1 ID corresponding to the layer-2 ID is different from a layer-1 ID corresponding to a layer-2 ID in another sidelink unicast communication.

It should be understood that, in this embodiment of this application, after the second terminal device establishes the PC5 unicast link to the first terminal device, the second terminal device may further update the layer-2 ID, and send the updated layer-2 ID to the first terminal device in a process of updating a PC5 unicast link identifier, so that a layer-1 ID corresponding to the layer-2 ID is different from a layer-1 ID corresponding to a layer-2 ID in another sidelink unicast communication.

Manner 4: The second terminal device may start or restart, based on a received destination layer-2 ID and source layer-2 ID corresponding to a sidelink transmission, drx-InactivityTimerPC5, drx-HARQ-RTT-TimerPC5, or drx-RetransmissionTimerPC5 corresponding to sidelink DRX of the second terminal device.

For example, if the second terminal device receives one sidelink transmission, a source layer-2 ID corresponding to the sidelink transmission is the same as a layer-2 ID of a first terminal device, and a destination layer-2 ID corresponding to the SL transmission is the same as a layer-2 ID of the second terminal device, the second terminal device starts or restarts drx-InactivityTimerPC5, drx-HARQ-RTT-TimerPC5, or drx-RetransmissionTimerPC5 corresponding to sidelink DRX between the second terminal device and the first terminal device.

It should be understood that, in this embodiment of this application, if the sidelink transmission is new transmission, the second terminal device starts or restarts only the drx-InactivityTimerPC5 corresponding to the sidelink DRX between the second terminal device and the first terminal device; or if the sidelink transmission is retransmission, the second terminal device starts or restarts only the drx-InactivityTimerPC5, the drx-HARQ-RTT-TimerPC5, or the drx-RetransmissionTimerPC5 corresponding to the sidelink DRX between the second terminal device and the first terminal device.

If the second terminal device receives new SCI (including a second-level SCI) transmitted on a scheduling sidelink, a source layer-1 ID included in the SCI is the same as a source layer-1 ID of the first terminal device, and a destination layer-1 ID included in the SCI is the same as a layer-1 ID of the second terminal device, the second terminal device starts or restarts drx-InactivityTimerPC5, drx-HARQ-RTT-TimerPC5, or drx-RetransmissionTimerPC5 corresponding to sidelink DRX between the first terminal device and the second terminal device when failing to decode a MAC PDU corresponding to the SCI.

If the first terminal device sends SCI to the second terminal device, and receives a negative acknowledgment (negative acknowledgement) for the SCI from the second terminal device, the first terminal device does not start or restart, due to the SCI, the drx-InactivityTimerPC5, the drx-HARQ-RTT-TimerPC5, or the drx-RetransmissionTimerPC5 corresponding to sidelink DRX between the first terminal device and the second terminal device.

It should be noted that, in this embodiment of this application, if the second terminal device receives SCI indicating new sidelink transmission or fourth indication information from the first terminal device, the second terminal device starts or restarts the drx-InactivityTimerPC5. However, if a MAC PDU corresponding to the SCI or the fourth indication information includes only non-data information, for example, includes only non-data information such as SL-CSI reporting or sidelink resource information in inter-terminal device coordination, if data information such as data of an STCH or data of an SCCH is not included, the second terminal device increases the sidelink active time unnecessarily, and consequently power consumption of the second terminal device increases.

In this embodiment of this application, the foregoing problem may be resolved in two manners. The following separately describes in detail specific implementations of the two manners with reference to specific examples.

Manner 1: If the first terminal device sends, to the second terminal device, SCI indicating new sidelink transmission, and a MAC PDU corresponding to the SCI includes first information but does not include second information, the second terminal device does not start or restart the drx-InactivityTimerPC5.

For example, after receiving the SCI that is sent by the first terminal device and that indicates new sidelink transmission, the second terminal device starts or restarts the drx-InactivityTimerPC5. If the second terminal device determines, through decoding, that the MAC PDU corresponding to the SCI includes the first information but does not include the second information, the second terminal device cancels starting or restarting the drx-InactivityTimerPC5 before (that is, the drx-InactivityTimerPC5 is not started or restarted when it is determined, through decoding, that the MAC PDU corresponding to the SC includes the first information but does not include the second information) or after (that is, the drx-InactivityTimerPC5 is started or restarted when it is determined, through decoding, that the MAC PDU corresponding to the SCI includes the first information but does not include the second information) starting or restarting the drx-InactivityTimerPC5 based on the SCI. That is, a state of the drx-InactivityTimerPC5 existing before the SCI is received is maintained, or the SCI does not cause a state change of the drx-InactivityTimerPC5.

For example, the first terminal device may include, in the SCI that is sent to the second terminal device and that indicates new sidelink transmission, information used to indicate that the MAC PDU corresponding to the SCI includes the first information but does not include the second information, or information used to indicate that the MAC PDU corresponding to the SCI includes the second information. After the second terminal device receives the SCI that is sent by the first terminal device and that indicates new sidelink transmission, if the second terminal device determines, based on the SCI, that the MAC PDU corresponding to the SCI includes the first information but does not include the second information, the second terminal device does not start or does not restart the drx-InactivityTimerPC5 after receiving the SCI; or if the second terminal device determines, based on the SCI, that the MAC PDU corresponding to the SCI includes the second information, the second terminal device starts or restarts the drx-InactivityTimerPC5 after receiving the SCI.

For example, the first terminal device may send the fourth indication information to the second terminal device, or the first terminal device may send, to the second terminal device, information used to indicate not to start or restart the drx-InactivityTimerPC5. The fourth indication information and the information used to indicate not to start or restart the drx-InactivityTimerPC5 may be included in SCI or a MAC CE. If the second terminal device determines that the SCI or the MAC CE includes the information used to indicate not to start or restart the drx-InactivityTimerPC5, the second terminal device determines that a MAC PDU corresponding to the SC or the MAC CE includes the first information but does not include the second information, and the second terminal device does not start or restart the drx-InactivityTimerPC5 after receiving the SCI or the MAC CE. If the second terminal device determines that the SCI or the MAC CE includes the fourth indication information, the second terminal device determines that the MAC PDU corresponding to the SCI or the MAC CE includes the second information, and the second terminal device starts or restarts the drx-InactivityTimerPC5 after receiving the SCI or the MAC CE.

Manner 2: If the first terminal device sends, to the second terminal device, SCI indicating new sidelink transmission, and a MAC PDU corresponding to the SCI includes first information but does not include second information, the second terminal device starts a first tinier, and the second terminal device monitors a PSCCH, a PSSCH, or SCI during running of the first timer. Duration of the first timer is shorter than duration of the drx-InactivityTimerPC5.

It should be noted that, in this embodiment of this application, the first information may be one or more of the following: SL-CSI reporting, sidelink resource information in inter-terminal device coordination, and the second information includes one or more of the following: data of an SCCH, data of an STCH, and a MAC CE other than the first information. Alternatively, the first information may be one or more of the following: SL-CSI reporting, sidelink resource information in inter-terminal device coordination, data on an SCCH, and information other than data of an STCH, and the second information may be the data of the STCH.

It should be noted that, in this embodiment of this application, the foregoing two manners may be extended to DRX transmitted over a Uu interface between the second terminal device and a base station. For example, the first terminal device is replaced with the base station, the SCI is replaced with DCI, and the SCI indicating new sidelink transmission is replaced with DCI indicating new transmission. In this case, the first information may be one or more of the following: data of a broadcast control channel (broadcast control channel, BCCH), data of a paging control channel (paging control channel, PCCH), data of a common control channel (common control channel, CCCH), and data of a dedicated control channel (dedicated control channel, DCCH), and the second information may be data of a dedicated traffic channel (dedicated traffic channel, DTCH).

In Embodiment 1, Embodiment 2, and Embodiment 3, the first terminal device may discard the sidelink grant sent by the network device when a conflict occurs between sidelink transmission and uplink transmission. The sidelink grant may be a sidelink grant of the time domain position of the indicated resource in the first time period, or may not be a sidelink grant of the time domain position of the indicated resource in the first time period. This is not specifically limited in this embodiment of this application.

It should be noted that, in this embodiment of this application, the discarded sidelink grant may also be understood as an unused sidelink grant, and the first terminal device does not send the PSCCH, the PSSCH, or the SCI on a resource indicated by the sidelink grant.

It should be noted that, in this embodiment of this application, if the first terminal device discards or determines to discard a sidelink grant sent by the network device, the network device starts or restarts the drx-InactivityTimerPC5, but the first terminal device and the second terminal device do not start or restart the drx-InactivityTimerPC5. As a result, a state of the drx-InactivityTimerPC5 maintained by the first terminal device and the second terminal device is inconsistent with a state of the drx-InactivityTimerPC5 maintained by the network device, and a time domain position of a resource indicated by a sidelink grant subsequently sent by the network device to the first terminal device may not be in the sidelink DRX active time of the second terminal device. If the first terminal device sends a PSCCH, a PSSCH, or SCI by using a resource indicated by the sidelink grant, because the second terminal device does not receive the PSCCH, the PSSCH, or the SC in the sidelink DRX non-active time, the second terminal device cannot receive the PSCCH, the PSSCH, or the SCI. To enable the second terminal device to receive the PSCCH, the PSSCH, or the SCI, the second terminal device also needs to receive the PSCCH, the PSSCH, or the SCI in the sidelink DRX non-active time, and consequently, the DRX mechanism cannot work. If the first terminal device does not send the PSCCH, the PSSCH, or the SCI by using the resource indicated by the sidelink grant, the resource indicated by the sidelink grant is wasted. In view of this, the state of the drx-InactivityTimerPC5 maintained by the first terminal device and the second terminal device may be consistent with the state of the drx-InactivityTimerPC5 maintained by the network device by using any one of the following methods.

Figure 5E:
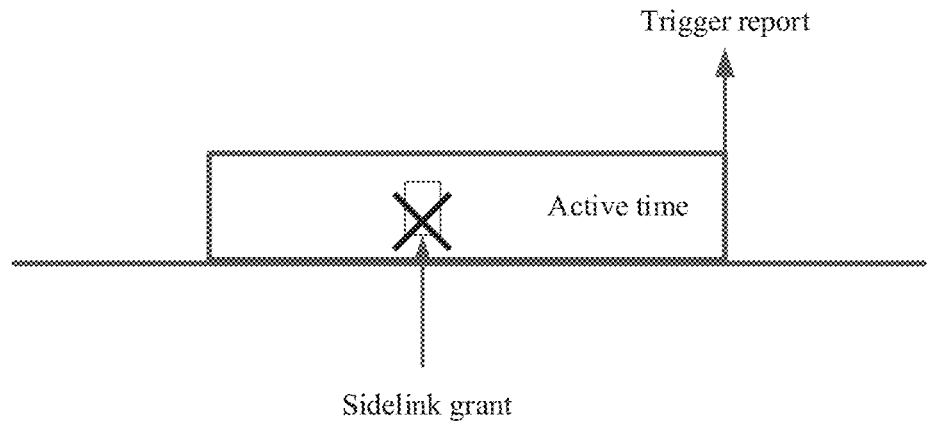
FIG. 5e is a schematic diagram of a state maintaining method of a DRX inactivity timer according to an embodiment of this application.

As shown in FIG. 5e, if the first terminal device discards or determines to discard a sidelink grant sent by the network device, the first terminal device triggers sending of fifth indication information to the network device. The fifth indication information indicates that sidelink DRX active time of a second terminal device corresponding to the sidelink grant has ended or is to end. It may be understood that the fifth indication information may further indicate that the first terminal device discards or determines to discard the sidelink grant. The sidelink DRX active time may be sidelink DRX active time between the first terminal device and the second terminal device corresponding to the sidelink grant, and may be determined by the first terminal device, the second terminal device corresponding to the sidelink grant, or the first terminal device and the second terminal device corresponding to the sidelink grant. The discarding of the sidelink grant does not cause a change of the sidelink DRX active time or starting or restarting of the drx-InactivityTimerPC5.

It should be understood that, in this embodiment of this application, that the first terminal device triggers sending of indication information to the network device may be understood as: The first terminal device triggers sending of the indication information, or the first terminal device triggers indication information reporting, or the first terminal device triggers reporting of the indication information. This is not specifically limited in this embodiment of this application.

After triggering sending of the indication information to the network device, the first terminal device sends the indication information to the network device when the first terminal device has an uplink transmission resource. For example, that the first terminal device triggers sending of the fifth indication information to the network device may be understood as: The first terminal device triggers sending of the fifth indication information, or the first terminal device triggers the fifth indication information reporting, or the first terminal device triggers reporting of the fifth indication information. After triggering sending of the fifth indication information to the network device, the first terminal device sends the fifth indication information to the network device when the first terminal device has an uplink transmission resource.

Optionally, in this embodiment of this application, the first terminal device may trigger sending of the fifth indication information to the network device, or send the fifth indication information to the network device after determining to discard the sidelink grant, or after discarding the sidelink grant, or after a time domain position of a resource indicated by the sidelink grant, or at an end moment of a time domain position of the first sidelink transmission indicated by the sidelink grant, or in the first slot or symbol after a time domain position of the first sidelink transmission included by the sidelink grant ends, after determining to discard the sidelink grant, or after discarding the sidelink grant, at a moment of an interval after a time domain position of the first sidelink transmission included by the sidelink grant ends, at an end moment of the sidelink DRX active time, or at a moment preceding an end moment of the sidelink DRX active time by a gap.

Optionally, in this embodiment of this application, the first terminal device may determine the sidelink DRX active time based on a time domain position of the sent PSCCH, PSSCH, or SCI, or the drx-onDurationTimerPC5. For example, after the first terminal device sends the PSCCH, the PSSCH, the SCI, or the MAC PDU to the second terminal device before or after discarding the sidelink grant, the first terminal device starts or restarts the drx-InactivityTimerPC5, and determines that the sidelink DRX active time includes running time of the drx-InactivityTimerPC5, and an end moment of the sidelink DRX active time is later than or equal to an expiration moment of the drx-InactivityTimerPC5. If the first terminal device does not send the PSCCH, the PSSCH, or the SCI to the second terminal device during running of the drx-onDurationTimerPC5, the end moment of the sidelink DRX active time is an expiration moment of the drx-onDurationTimerPC5. The sidelink DRX active time is a continuous time period.

Figure 5F:
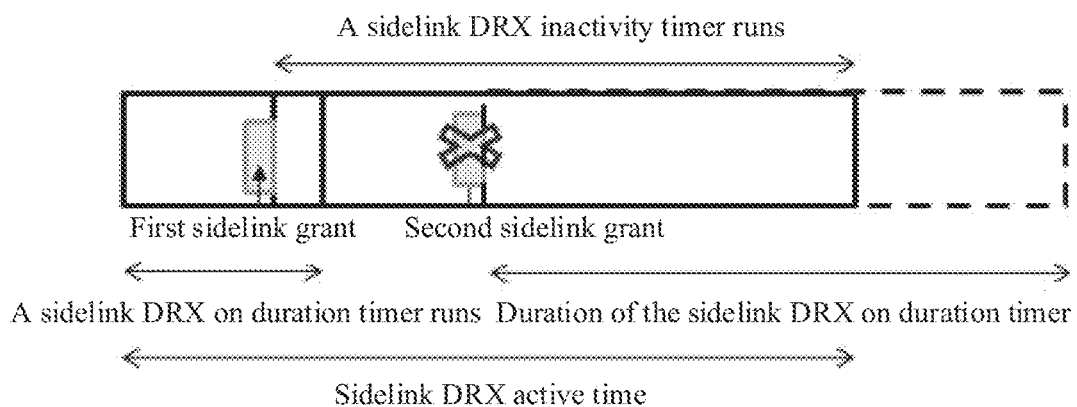
FIG. 5f is a schematic diagram of sidelink DRX active time according to an embodiment of this application.

For example, as shown in FIG. 5f, if the first terminal device sends the PSCCH, the PSSCH, the SCI, or the MAC PDU to the second terminal device by using a resource on a first sidelink grant before discarding a second sidelink grant, the first terminal device starts or restarts the drx-InactivityTimerPC5, and determines that the sidelink DRX active time includes the running time of the drx-InactivityTimerPC5, and the end moment of the sidelink DRX active time is equal to the expiration moment of the drx-InactivityTimerPC5.

Figure 5G:
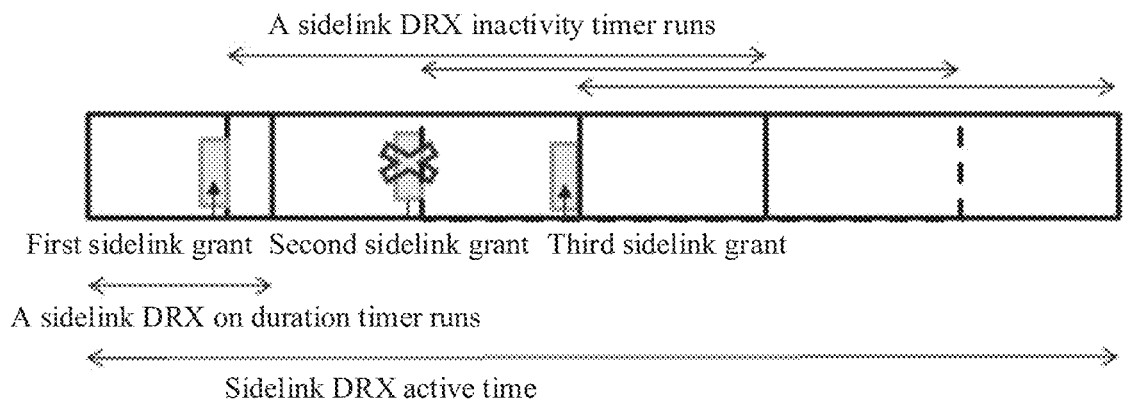
FIG. 5g is another schematic diagram of sidelink DRX active time according to an embodiment of this application.

Alternatively, as shown in FIG. 5g, if the first terminal device sends the PSCCH, the PSSCH, the SCI, or the MAC PDU to the second terminal device by using a resource on a first sidelink grant before discarding a second sidelink grant, and the first terminal device sends the PSCCH, the PSSCH, the SCI, or the MAC PDU to the second terminal device by using a resource on a third sidelink grant after discarding the second sidelink grant, the first terminal device starts or restarts the drx-InactivityTimerPC5, and determines that the sidelink DRX active time includes the running time of the drx-InactivityTimerPC5 and the end moment of the sidelink DRX active time is later than the expiration moment of the drx-InactivityTimerPC5.

Figure 5H:
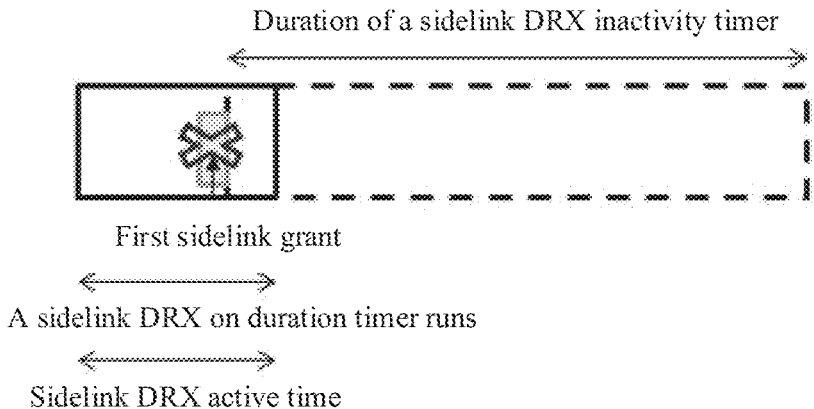
FIG. 5h is another schematic diagram of sidelink DRX active time according to an embodiment of this application.

Alternatively, as shown in FIG. 5h, if the first terminal device does not use the resource on the first sidelink grant to send the PSCCH, the PSSCH, or the SCI to the second terminal device during running of the drx-onDurationTimerPC5, it is determined that the end moment of the sidelink DRX active time is the expiration moment of the drx-onDurationTimerPC5. Optionally, in this embodiment of this application, when triggering sending of the fifth indication information to the network device, the first terminal device may further trigger sending of device identification information of the second terminal device corresponding to the to-be-discarded sidelink grant to the network device, that is, device identification information of the second terminal device whose sidelink DRX active time ends. The device identification information may be a destination ID, for example, sl-destinationIdentity, and is used to identify a destination of sidelink communication, and the sl-destinationIdentity may be a destination layer-2 ID. Alternatively, the device identification information may be a destination index, for example, a destination index, and is used to indicate a destination corresponding to any IE or entry in a destination information list sent by the first terminal device to the network device or a sending resource request list. The destination index corresponds to a sequence of an information element IE or entry corresponding to a destination in the list. For example, destination index=0 corresponds to a destination corresponding to the first IE or entry in the list, and destination index=1 corresponds to a destination corresponding to the second IE in the list. Optionally, in this embodiment of this application, if the first terminal device uses or determines to use a resource indicated by another sidelink grant to send the PSCCH, the PSSCH, or the SCI after the time domain position of the resource indicated by the discarded sidelink grant and before the end moment of the sidelink DRX active time or a moment preceding the end moment of the sidelink DRX active time by a gap, the first terminal device may cancel triggered sending of the fifth indication information to the network device. In other words, if the discarded sidelink grant is followed by the last sidelink grant that is used to send the PSCCH, the PSSCH, or the SCI to the second terminal device in the sidelink DRX active time, the first terminal device triggers sending of the fifth indication information to the network device. The first terminal device may further cancel triggered sending of the device identification information of the second terminal device whose sidelink DRX active time ends to the network device.

It should be understood that, in this embodiment of this application, that the first terminal device cancels triggered sending of indication information to the network device may be understood as: The first terminal device cancels triggered sending of the indication information, or the first terminal device cancels triggered indication information reporting, or the first terminal device cancels triggered reporting of the indication information. This is not specifically limited in this embodiment of this application. For example, that the first terminal device cancels triggered sending of the fifth indication information to the network device may be understood as: The first terminal device cancels triggered sending of the fifth indication information, or the first terminal device cancels triggered fifth indication information reporting, or the first terminal device cancels triggered reporting of the fifth indication information.

Optionally, in this embodiment of this application, if the first terminal device sends the PSCCH, the PSSCH, or the SCI by using a resource indicated by another sidelink grant or the first terminal device determines to send the PSCCH, the PSSCH, or the SCI by using a resource indicated by another sidelink grant before triggering sending of the fifth indication information to the network device, the first terminal device may cancel triggered sending of the fifth indication information to the network device. The first terminal device may further cancel triggered sending of the device identification information of the second terminal device whose sidelink DRX active time ends to the network device.

Optionally, in this embodiment of this application, if the drx-onDurationTimerPC5 of the second terminal device starts or runs before sending of the fifth indication information to the network device is triggered, that is, sidelink DRX active time of a next cycle starts, the first terminal device may cancel triggered sending of the fifth indication information to the network device. The first terminal device may further cancel triggered sending of the device identification information of the second terminal device whose sidelink DRX active time ends to the network device.

Figure 5I:
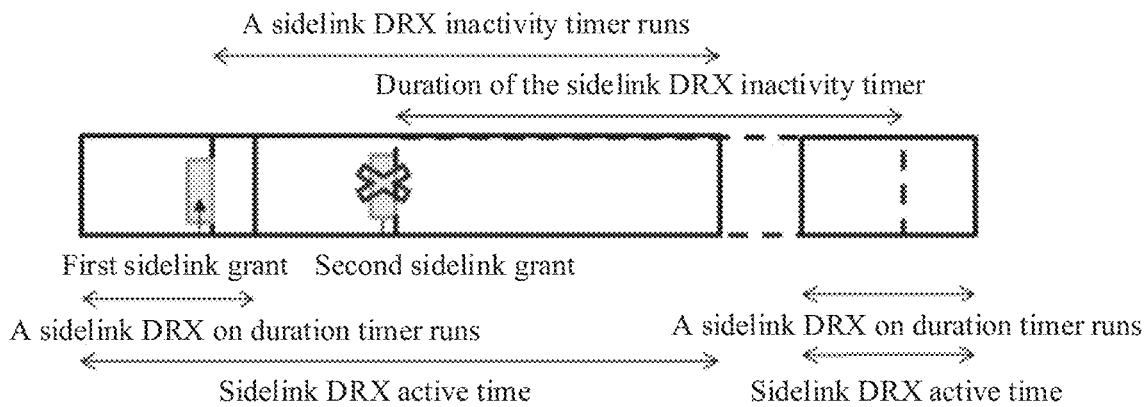
FIG. 5i is a schematic diagram of sending fifth indication information according to an embodiment of this application.

For example, as shown in FIG. 5i, if the first terminal device has no uplink resource when sending the fifth indication information to the network device, the first terminal device does not send the fifth indication information during running of the second drx-onDurationTimerPC5, and cancels sending the fifth indication information when the drx-onDurationTimerPC5 is started or runs. Optionally, in this embodiment of this application, the sidelink DRX active time does not change even if the first terminal device sends the PSCCH, the PSSCH, or the SCI to the second terminal by using the discarded sidelink grant. In other words, if the sidelink DRX active time determined by the network device is consistent with the sidelink DRX active time determined by the first terminal device, the first terminal device does not trigger sending of the fifth indication information to the network device. The sidelink DRX active time changes if the first terminal device sends the PSCCH, the PSSCH, or the SCI to the second terminal by using the discarded sidelink grant. In other words, after the sidelink grant is discarded, if the sidelink DRX active time determined by the network device is inconsistent with the sidelink DRX active time determined by the first terminal device, the first terminal device sends the fifth indication information to the network device. For example, before the discarded sidelink grant, after sending the PSCCH, the PSSCH, the SCI, or the MAC PDU to the second terminal device on a resource indicated by a first sidelink grant, the first terminal device determines an end moment of first sidelink DRX active time based on transmission of the PSCCH, the PSSCH, the SCI, or the MAC PDU. If the first terminal device sends the PSCCH, the PSSCH, the SCI, or the MAC PDU to the second terminal device on the resource indicated by the discarded sidelink grant, an end moment of second sidelink DRX active time is determined based on transmission of the PSCCH, the PSSCH, the SCI, or the MAC PDU. If the end moment of the second sidelink DRX active time is equal to the end moment of the first sidelink DRX active time, the first terminal device does not trigger sending of the fifth indication information to the network device, and sending of the device identification information of the second terminal device corresponding to the determined discarded sidelink grant to the network device. If the end moment of the second sidelink DRX active time is not equal to the end moment of the first sidelink DRX active time, the first terminal device sends the fifth indication information to the network device.

Figure 5J:
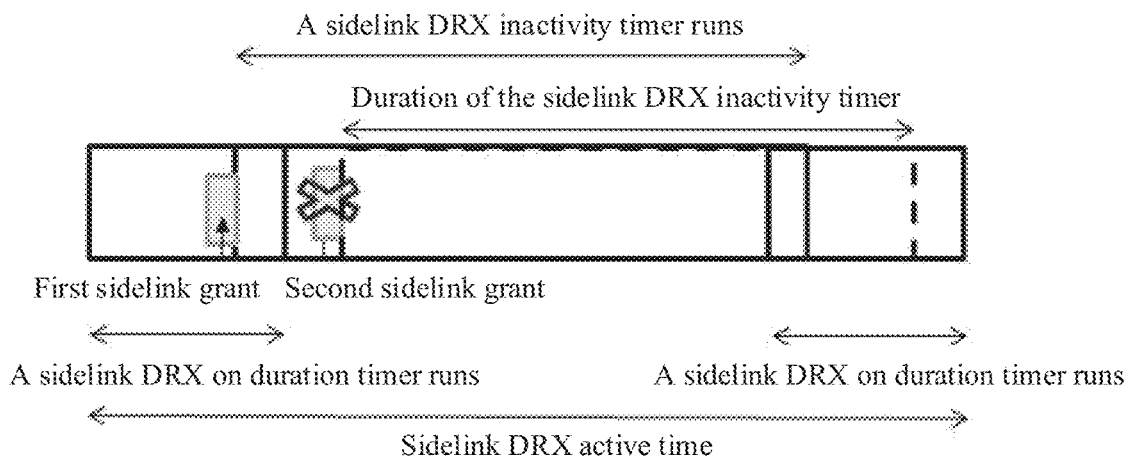
FIG. 5j is another schematic diagram of sending fifth indication information according to an embodiment of this application.

For example, as shown in FIG. 5j, if a moment of the time domain position of the resource indicated by the first sidelink grant plus a time length of the drx-InactivityTimerPC5 falls within a running period of the drx-onDurationTimerPC5, an end moment of the sidelink DRX active time corresponding to the time domain position of the resource indicated by the first sidelink grant is the expiration moment of the drx-onDurationTimerPC5. If a moment of the time domain position of the resource indicated by the discarded second sidelink grant plus the time length of the drx-InactivityTimerPC5 falls within the running period of the drx-onDurationTimerPC5, an end moment of the sidelink DRX active time corresponding to the time domain position of the resource indicated by the discarded second sidelink grant is the expiration moment of the drx-onDurationTimerPC5. In this case, the first terminal device does not trigger sending of the fifth indication information to the network device, and does not trigger sending of the device identification information of the second terminal device corresponding to the determined discarded second sidelink grant to the network device.

Optionally, in this embodiment of this application, the fifth indication information may be included in UCI, a MAC CE, or an RRC message. It may be understood that the device identification information of the second terminal device corresponding to the discarded sidelink grant may also be included in the UCI, the MAC CE, or the RRC message. For example, one field in the MAC CE is used to indicate that the first terminal device determines to discard the sidelink grant and indicate the end of the sidelink DRX active time or the device identification information. Alternatively, one or more bits in the MAC CE are used to indicate that the first terminal device determines to discard the sidelink grant and indicate the end of the sidelink DRX active time or the device identification information. Alternatively, a PUCCH, a physical uplink shared channel (physical uplink shared channel, PUSCH), or a physical random access channel (physical random access channel, PRACH) is used to indicate that the first terminal device determines to discard the sidelink grant and indicate the end of the sidelink DRX active time or the device identification information. In a manner of indicating by using the PRACH, a PRACH resource may be defined, and the PRACH resource is used to indicate that the first terminal device determines to discard the sidelink grant and indicate the end of the sidelink DRX active time or the device identification information.

(2) If the first terminal device discards or determines to discard a sidelink grant sent by the network device, the first terminal device may trigger sending of sixth indication information to the network device. The sixth indication information indicates that drx-InactivityTimerPC5 corresponding to the sidelink grant expires or is to expire. It may be understood that the sixth indication information may also indicate that the first terminal device has discarded or discards the sidelink grant.

Optionally, in this embodiment of this application, the first terminal device may trigger sending of the sixth indication information to the network device, or send the sixth indication information to the network device after determining to discard the sidelink grant, or after discarding the sidelink grant, or after a time domain position of a resource indicated by the sidelink grant, or at an end moment of a time domain position of the first sidelink transmission indicated by the sidelink grant, or in the first slot or symbol after a time domain position of the first sidelink transmission included by the sidelink grant ends, after determining to discard the sidelink grant, or after discarding the sidelink grant, at a moment of an interval after a time domain position of the first sidelink transmission included by the sidelink grant ends, at an expiration moment of the drx-InactivityTimerPC5 of the second terminal device, or at a moment preceding an expiration moment of the drx-InactivityTimerPC5 by a gap.

Optionally, in this embodiment of this application, the first terminal device may determine running time or the expiration moment of the drx-InactivityTimerPC5 based on a time domain position of the sent PSCCH, PSSCH, or SCI. For example, after the first terminal device sends a PSCCH, a PSSCH, SCI, or a MAC PDU to a second terminal device before the discarded sidelink grant, the first terminal device starts or restarts the drx-InactivityTimerPC5, and may determine the running time or the expiration moment of the drx-InactivityTimerPC5 based on duration of the drx-InactivityTimerPC5.

Optionally, in this embodiment of this application, when sending the sixth indication information to the network device, the first terminal device may further send device identification information of a second terminal device corresponding to the determined discarded sidelink grant to the network device, that is, device identification information of the second terminal device whose sidelink DRX active time ends. The device identification information may be a destination ID, for example, sl-destinationIdentity, and is used to identify a destination of sidelink communication, and the sl-destinationIdentity may be a destination layer-2 ID. Alternatively, the device identification information may be a destination index, for example, a destination index, and is used to indicate a destination corresponding to any IE or entry in a destination information list sent by the first terminal device to the network device or a sending resource request list. The destination index corresponds to a sequence of an information element IE or entry corresponding to a destination in the list. For example, destination index=0 corresponds to a destination corresponding to the first IE or entry in the list, and destination index=1 corresponds to a destination corresponding to the second IE or entry in the list.

Optionally, in this embodiment of this application, if the first terminal device uses or determines to use a resource indicated by another sidelink grant to send the PSCCH, the PSSCH, or the SCI after a time domain position of a resource indicated by the discarded sidelink grant and before the expiration moment of the drx-InactivityTimerPC5 or a moment preceding the expiration moment by a gap, the first terminal device cancels sending the sixth indication information to the network device, and sending, to the network device, the device identification information of the second terminal device whose sidelink DRX active time ends. In other words, if the discarded sidelink grant is followed by the last sidelink grant that is used to send the PSCCH, the PSSCH, or the SCI to the second terminal device during running of the drx-InactivityTimerPC5, the first terminal device sends the sixth indication information to the network device, or triggers sending of the sixth indication information to the network device.

Optionally, in this embodiment of this application, if drx-onDurationTimerPC5 of the second terminal device starts or runs before the sixth indication information is sent to the network device, that is, sidelink DRX active time in a next cycle starts, the first terminal device cancels sending the sixth indication information to the network device, and sending, to the network device, the device identification information of the second terminal device corresponding to the determined discarded sidelink grant.

Optionally, in this embodiment of this application, the sidelink DRX active time does not change even if the first terminal device sends the PSCCH, the PSSCH, or the SCI to the second terminal by using the discarded sidelink grant. In other words, if the sidelink DRX active time determined by the network device is consistent with the sidelink DRX active time determined by the first terminal device, the first terminal device does not send the sixth indication information to the network device. For example, before the discarded sidelink grant, after sending the PSCCH, the PSSCH, the SCI, or the MAC PDU to the second terminal device on a resource indicated by a first sidelink grant, the first terminal device determines an end moment of first sidelink DRX active time based on transmission of the PSCCH, the PSSCH, the SCI, or the MAC PDU. If the first terminal device sends the PSCCH, the PSSCH, the SCI, or the MAC PDU to the second terminal device on the resource indicated by the discarded sidelink grant, an end moment of second sidelink DRX active time is determined based on transmission of the PSCCH, the PSSCH, the SCI, or the MAC PDU. If the end moment of the second sidelink DRX active time is equal to the end moment of the first sidelink DRX active time, the first terminal device does not send the sixth indication information to the network device or send the device identification information of the second terminal device corresponding to the discarded sidelink grant to the network device. For example, if a moment of a time domain position of a resource indicated by the first sidelink grant plus a time length of the drx-InactivityTimerPC5 falls within a running period of the drx-onDurationTimerPC5, an end moment of the sidelink DRX active time corresponding to the time domain position of the resource indicated by the first sidelink grant is the expiration moment of the drx-onDurationTimerPC5. If a moment of a time domain position of a resource indicated by the discarded sidelink grant plus the time length of the drx-InactivityTimerPC5 falls within the running period of the drx-onDurationTimerPC5, an end moment of the sidelink DRX active time corresponding to the time domain position of the resource indicated by the discarded sidelink grant is the expiration moment of the drx-onDurationTimerPC5. In this case, the first terminal device does not send the sixth indication information to the network device, or send the device identification information of the second terminal device corresponding to the determined discarded sidelink grant to the network device.

Figure 5K:
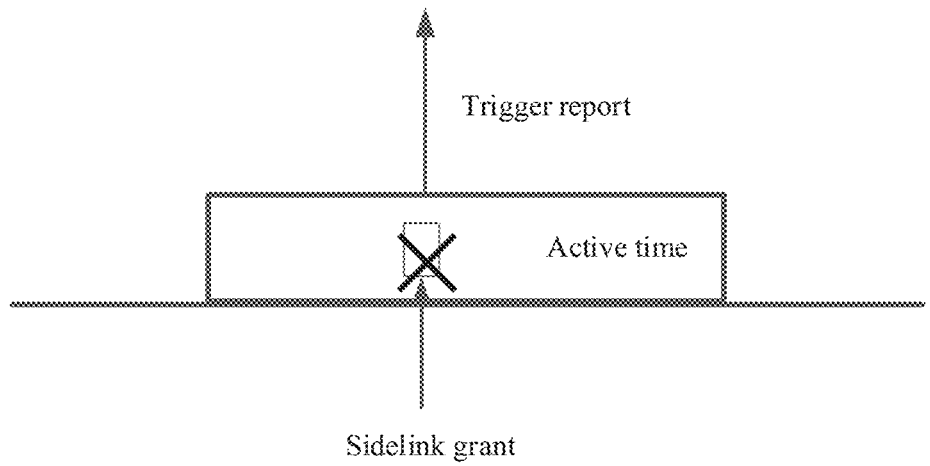
FIG. 5k is a schematic diagram of another state maintaining method of a DRX inactivity timer according to an embodiment of this application.

(3) As shown in FIG. 5*k*, if the first terminal device discards or determines to discard a sidelink grant sent by the network device, the first terminal device triggers sending of seventh indication information to the network device. The seventh indication information indicates an end moment of a sidelink DRX active time of a second terminal device. It may be understood that the seventh indication information may also indicate that the first terminal device has discarded or discards the sidelink grant. The sidelink DRX active time may be sidelink DRX active time between the first terminal device and the second terminal device corresponding to the sidelink grant, and may be determined by the first terminal device, the second terminal device corresponding to the sidelink grant, or the first terminal device and the second terminal device corresponding to the sidelink grant. The discarding of the sidelink grant does not cause a change of the sidelink DRX active time or starting or restarting of drx-InactivityTimerPC5.

Optionally, in this embodiment of this application, when triggering sending of the seventh indication information to the network device, the first terminal device may further trigger sending of device identification information of the second terminal device corresponding to the discarded sidelink grant to the network device, that is, the device identification information of the second terminal device whose sidelink DRX active time ends.

Optionally, in this embodiment of this application, the first terminal device may trigger sending of the seventh indication information to the network device, or send the seventh indication information to the network device after determining to discard the sidelink grant, or after discarding the sidelink grant, or after a time domain position of a resource indicated by the sidelink grant, or at an end moment of a time domain position of the first sidelink transmission indicated by the sidelink grant, or in the first slot or symbol after a time domain position of the first sidelink transmission included by the sidelink grant ends, after determining to discard the sidelink grant, or after discarding the sidelink grant, at a moment of an interval after a time domain position of the first sidelink transmission included by the sidelink grant ends, or at a moment preceding an end of the sidelink DRX active time by a gap.

Optionally, in this embodiment of this application, after the first terminal device determines to discard the sidelink grant or discards the sidelink grant, when triggering sending of a BSR to the network device, the first terminal device may also trigger sending of the seventh indication information and the device identification information of the second terminal device corresponding to the determined discarded sidelink grant to the network device.

Optionally, in this embodiment of this application, after the first terminal device determines to discard the sidelink grant or discards the sidelink grant, when triggering sending of a BSR to the network device, the first terminal device may also trigger sending of the seventh indication information and the device identification information of the second terminal device corresponding to the determined discarded sidelink grant to the network device.

In this embodiment of this application, the first terminal device may determine the sidelink DRX active time based on a time domain position of the sent PSCCH, PSSCH, or SCI, or drx-onDurationTimerPC5. For example, before or after the discarded sidelink grant, after the first terminal device sends the PSCCH, the PSSCH, the SCI, or the MAC PDU to the second terminal device, the first terminal device starts or restarts drx-InactivityTimerPC5. The sidelink DRX active time includes running time of the drx-InactivityTimerPC5, and an end moment of the sidelink DRX active time is later than or equal to an expiration moment of the drx-InactivityTimerPC5. If the first terminal device does not send the PSCCH, the PSSCH, or the SCI to the second terminal device during running of the drx-onDurationTimerPC5, the end moment of the sidelink DRX active time is an expiration moment of the drx-onDurationTimerPC5. The sidelink DRX active time herein is a continuous time period.

Optionally, in this embodiment of this application, if the first terminal device uses or determines to use a resource indicated by another sidelink grant to send the PSCCH, the PSSCH, or the SCI after a time domain position of a resource indicated by the discarded sidelink grant and before the end moment of the sidelink DRX active time or a moment preceding the expiration moment by a gap, the first terminal device cancels sending the seventh indication information to the network device, and sending, to the network device, the device identification information of the second terminal device whose sidelink DRX active time ends. In other words, if the discarded sidelink grant is followed by the last sidelink grant that is used to send the PSCCH, the PSSCH, or the SCI to the second terminal device in the sidelink DRX active time, the first terminal device sends the seventh indication information to the network device, or triggers sending of the seventh indication information to the network device.

Optionally, after the time domain position of the resource indicated by the discarded sidelink grant and before the first terminal device triggers sending of the seventh indication information and the device identification information of the second terminal device corresponding to the determined discarded sidelink grant to the network device, the first terminal device sends the PSCCH, the PSSCH, or the SCI by using the resource indicated by the another sidelink grant, the first terminal device may cancel triggered sending of the seventh indication information to the network device. The first terminal device may further cancel triggered sending of the device identification information of the second terminal device corresponding to the discarded sidelink grant to the network device.

Optionally, if the first terminal device sends the PSCCH, the PSSCH, or the SCI by using the resource indicated by the another sidelink grant or the first terminal device determines to send the PSCCH, the PSSCH, or the SCI by using the resource indicated by the another sidelink grant before triggering sending of the seventh indication information and the device identification information of the second terminal device corresponding to the determined discarded sidelink grant to the network device, the first terminal device may cancel triggered sending of the seventh indication information to the network device. The first terminal device may further cancel triggered sending of the device identification information of the second terminal device corresponding to the discarded sidelink grant to the network device.

Optionally, in this embodiment of this application, if the drx-onDurationTimerPC5 of the second terminal device starts or runs before sending of the seventh indication information to the network device is triggered, that is, sidelink DRX active time of a next cycle starts, the first terminal device may cancel triggered sending of the seventh indication information to the network device. The first terminal device may further cancel triggered sending of the device identification information of the second terminal device corresponding to the discarded sidelink grant to the network device.

Optionally, in this embodiment of this application, the sidelink DRX active time does not change even if the first terminal device sends the PSCCH, the PSSCH, or the SCI to the second terminal by using the discarded sidelink grant. In other words, if the sidelink DRX active time determined by the network device is consistent with the sidelink DRX active time determined by the first terminal device, the first terminal device does not send the seventh indication information to the network device. The sidelink DRX active time changes if the first terminal device sends the PSCCH, the PSSCH, or the SCI to the second terminal by using the discarded sidelink grant. In other words, after the sidelink grant is discarded, if the sidelink DRX active time determined by the network device is inconsistent with the sidelink DRX active time determined by the first terminal device, the first terminal device sends the seventh indication information to the network device. For example, before the discarded sidelink grant, after sending the PSCCH, the PSSCH, the SCI, or the MAC PDU to the second terminal device on a resource indicated by a first sidelink grant, the first terminal device determines an end moment of first sidelink DRX active time based on transmission of the PSCCH, the PSSCH, the SCI, or the MAC PDU. If the first terminal device sends the PSCCH, the PSSCH, the SCI, or the MAC PDU to the second terminal device on the resource indicated by the discarded sidelink grant, an end moment of second sidelink DRX active time is determined based on transmission of the PSCCH, the PSSCH, the SCI, or the MAC PDU. If the end moment of the second sidelink DRX active time is equal to the end moment of the first sidelink DRX active time, the first terminal device does not trigger sending of the seventh indication information to the network device, and does not trigger sending of the device identification information of the second terminal device corresponding to the determined discarded sidelink grant to the network device.

Optionally, in this embodiment of this application, when the first terminal device indicates the end moment of the sidelink DRX active time to the network device, the first terminal device may indicate the last slot or symbol before the end moment of the sidelink DRX active time, or may indicate the first slot or symbol after the end moment of the sidelink DRX active time. When the first slot or symbol after the end moment of the sidelink DRX active time is indicated, an SFN or a DFN in which the slot is located and an index of the slot in the SFN or the DFN may be indicated, or a subframe in which the slot is located and an index of the slot in the subframe may be indicated, or an index of the slot may be indicated, for example, an index of the slot on a sidelink or an index of the slot in a sidelink resource pool may be indicated. When the first symbol after the end moment of the sidelink DRX active time is indicated, an index of the symbol in a subframe or a slot may be indicated, and the subframe or the slot may be indicated. When a subframe is indicated, an SFN or a DFN in which the subframe is located and an index of the subframe in the SFN or the DFN may be indicated, or an index of the subframe may be indicated, for example, an index of the subframe on a sidelink or an index of the subframe in a sidelink resource pool may be indicated.

Optionally, in this embodiment of this application, the seventh indication information may be included in UCI, a MAC CE, or an RRC message. It may be understood that the device identification information of the second terminal device corresponding to the discarded sidelink grant may also be included in the UCI, the MAC CE, or the RRC message. For example, one field in the MAC CE is used to indicate that the first terminal device determines to discard the sidelink grant and indicate the end moment of the sidelink DRX active time or the device identification information. Alternatively, one or more bits in the MAC CE are used to indicate that the first terminal device determines to discard the sidelink grant and indicate the end moment of the sidelink DRX active time or the device identification information. Alternatively, a PUCCH, a PUSCH, or a PRACH is used to indicate that the first terminal device determines to discard the sidelink grant and indicate the end moment of the sidelink DRX active time or the device identification information. In a manner of indicating by using the PRACH, a PRACH resource may be defined, and the PRACH resource is used to indicate that the first terminal device determines to discard the sidelink grant and indicate the end moment of the sidelink DRX active time or the device identification information. (4) If the first terminal device discards or determines to discard a sidelink grant sent by the network device, the first terminal device may trigger sending of eighth indication information to the network device. The eighth indication information indicates an expiration moment of drx-InactivityTimerPC5 corresponding to the sidelink grant.

Optionally, in this embodiment of this application, the eighth indication information may also indicate that the first terminal device has discarded or discards the sidelink grant.

Optionally, in this embodiment of this application, when sending the eighth indication information to the network device, the first terminal device may further send device identification information of the second terminal device corresponding to the discarded sidelink grant to the network device, that is, the device identification information of the second terminal device whose sidelink DRX active time ends.

Optionally, in this embodiment of this application, the first terminal device may trigger sending of the eighth indication information to the network device, or send the eighth indication information to the network device after determining to discard the sidelink grant, or after discarding the sidelink grant, or after a time domain position of a resource indicated by the sidelink grant, or at an end moment of a time domain position of the first sidelink transmission indicated by the sidelink grant, or in the first slot or symbol after a time domain position of the first sidelink transmission included by the sidelink grant ends, after determining to discard the sidelink grant, or after discarding the sidelink grant, at a moment of an interval after a time domain position of the first sidelink transmission included by the sidelink grant ends, or at a moment preceding an end of the sidelink DRX active time by a gap.

Optionally, in this embodiment of this application, after the first terminal device determines to discard the sidelink grant or discards the sidelink grant, when triggering sending of a BSR to the network device, the first terminal device may also trigger sending of the eighth indication information and the device identification information of the second terminal device corresponding to the determined discarded sidelink grant to the network device.

Optionally, in this embodiment of this application, the first terminal device may determine the expiration moment of the drx-InactivityTimerPC5 based on a time domain position of the sent PSCCH, PSSCH, or SCI. For example, after the first terminal device sends the PSCCH, the PSSCH, the SCI, or the MAC PDU to the second terminal device before or after the discarded sidelink grant, the first terminal device starts or restarts the drx-InactivityTimerPC5, and the drx-InactivityTimerPC5 runs for duration and then expires.

Optionally, in this embodiment of this application, if the first terminal device uses or determines to use a resource indicated by another sidelink grant to send the PSCCH, the PSSCH, or the SCI after a time domain position of a resource indicated by the discarded sidelink grant and before the expiration moment of the drx-InactivityTimerPC5 or a moment preceding the expiration moment by a gap, the first terminal device cancels sending the eighth indication information to the network device. In other words, if the discarded sidelink grant is followed by the last sidelink grant that is used to send the PSCCH, the PSSCH, or the SCI to the second terminal device during running of the drx-InactivityTimerPC5, the first terminal device sends the eighth indication information to the network device, or triggers sending of the eighth indication information to the network device.

Optionally, after the time domain position of the resource indicated by the discarded sidelink grant and before the first terminal device sends the eighth indication information and the device identification information of the second terminal device corresponding to the determined discarded sidelink grant to the network device, the first terminal device sends the PSCCH, the PSSCH, or the SCI by using the resource indicated by the another sidelink grant, the first terminal device cancels sending the seventh indication information and the device identification information of the second terminal device corresponding to the determined discarded sidelink grant to the network device.

Optionally, if the first terminal device sends the PSCCH, the PSSCH, or the SCI by using the resource indicated by the another sidelink grant or the first terminal device determines to send the PSCCH, the PSSCH, or the SCI by using the resource indicated by the another sidelink grant before sending the eighth indication information and the device identification information of the second terminal device corresponding to the determined discarded sidelink grant to the network device, the first terminal device cancels sending the eighth indication information and the device identification information of the second terminal device corresponding to the determined discarded sidelink grant to the network device.

Optionally, in this embodiment of this application, if drx-onDurationTimerPC5 of the second terminal device starts or runs before the eighth indication information is sent to the network device, that is, sidelink DRX active time in a next cycle starts, the first terminal device cancels sending the eighth indication information and the device identification information of the second terminal device corresponding to the determined discarded sidelink grant to the network device.

Optionally, in this embodiment of this application, the sidelink DRX active time does not change even if the first terminal device sends the PSCCH, the PSSCH, or the SCI to the second terminal by using the discarded sidelink grant. In other words, if the sidelink DRX active time determined by the network device is consistent with the sidelink DRX active time determined by the first terminal device, the first terminal device does not send the eighth indication information to the network device. The sidelink DRX active time changes if the first terminal device sends the PSCCH, the PSSCH, or the SCI to the second terminal by using the discarded sidelink grant. In other words, after the sidelink grant is discarded, if the sidelink DRX active time determined by the network device is inconsistent with the sidelink DRX active time determined by the first terminal device, the first terminal device sends the eighth indication information to the network device. For example, before the discarded sidelink grant, after sending the PSCCH, the PSSCH, the SCI, or the MAC PDU to the second terminal device on a resource indicated by a first sidelink grant, the first terminal device determines an end moment of first sidelink DRX active time based on transmission of the PSCCH, the PSSCH, the SCI, or the MAC PDU. If the first terminal device sends the PSCCH, the PSSCH, the SCI, or the MAC PDU to the second terminal device on the resource indicated by the discarded sidelink grant, an end moment of second sidelink DRX active time is determined based on transmission of the PSCCH, the PSSCH, the SCI, or the MAC PDU. If the end moment of the second sidelink DRX active time is equal to the end moment of the first sidelink DRX active time, the first terminal device does not send the eighth indication information or the device identification information of the second terminal device corresponding to the determined discarded sidelink grant to the network device. If the end moment of the second sidelink DRX active time is not equal to the end moment of the first sidelink DRX active time, the first terminal device sends the eighth indication information to the network device.

Optionally, in this embodiment of this application, when the first terminal device indicates the expiration moment of the drx-InactivityTimerPC5 to the network device, the first terminal device may indicate the last slot or symbol before the expiration moment of the drx-InactivityTimerPC5, or may indicate the first slot or symbol after the expiration moment of the drx-InactivityTimerPC5. When the first slot or symbol after the expiration moment of the drx-InactivityTimerPC5 is indicated, an SFN or a DFN in which the slot is located and an index of the slot in the SFN or the DFN may be indicated, or a subframe in which the slot is located and an index of the slot in the subframe may be indicated, or an index of the slot may be indicated, for example, an index of the slot on a sidelink or an index of the slot in a sidelink resource pool may be indicated. When the first symbol after the expiration moment of the drx-InactivityTimerPC5 is indicated, an index of the symbol in a subframe or a slot may be indicated, and the subframe or the slot may be indicated. When a subframe is indicated, an SFN or a DFN in which the subframe is located and an index of the subframe in the SFN or the DFN may be indicated, or an index of the subframe may be indicated, for example, an index of the subframe on a sidelink or an index of the subframe in a sidelink resource pool may be indicated.

Optionally, in this embodiment of this application, the eighth indication information may be included in UCI, a MAC CE, or an RRC message. It may be understood that the device identification information of the second terminal device corresponding to the discarded sidelink grant may also be included in the UCI, the MAC CE, or the RRC message. For example, one field in the MAC CE is used to indicate that the first terminal device determines to discard the sidelink grant and indicate the expiration moment of the drx-InactivityTimerPC5 or the device identification information. Alternatively, one or more bits in the MAC CE are used to indicate that the first terminal device determines to discard the sidelink grant and indicate the expiration moment of the drx-InactivityTimerPC5 or the device identification information. Alternatively, a PUCCH, a PUSCH, or a PRACH is used to indicate that the first terminal device determines to discard the sidelink grant and indicate the expiration moment of the drx-InactivityTimerPC5 or the device identification information. In a manner of indicating by using the PRACH, a PRACH resource may be defined, and the PRACH resource is used to indicate that the first terminal device determines to discard the sidelink grant and indicate the expiration moment of the drx-InactivityTimerPC5 or the device identification information.

(5) If the first terminal device discards or determines to discard a sidelink grant sent by the network device, the first terminal device sends ninth indication information to the network device. The ninth indication information indicates a time domain position of a resource indicated by the sidelink grant. It may be understood that the ninth indication information may also indicate that the first terminal device has discarded or determines to discard the sidelink grant.

Optionally, in this embodiment of this application, when indicating, to the network device, the time domain position of the resource indicated by the sidelink grant, the first terminal device may indicate a slot in which a resource of the first sidelink transmission included in the sidelink grant is located. An SFN or a DFN in which the slot is located and an index of the slot in the SFN or the DFN may be indicated, or a subframe in which the slot is located and an index of the slot in the subframe may be indicated, or an index of the slot may be indicated, for example, an index of the slot on a sidelink or an index of the slot in a sidelink resource pool, and a subframe or a slot is indicated. When a subframe is indicated, an SFN or a DFN in which the subframe is located and an index of the subframe in the SFN or the DFN may be indicated, or an index of the subframe may be indicated, for example, an index of the subframe on a sidelink or an index of the subframe in a sidelink resource pool may be indicated.

Optionally, in this embodiment of this application, when sending the ninth indication information to the network device, the first terminal device may further send device identification information of a second terminal device corresponding to the determined discarded sidelink grant to the network device.

Optionally, in this embodiment of this application, when the first terminal device sends the ninth indication information to the network device, the first terminal device may further send, to the network device, a frequency domain position of the discarded sidelink grant, for example, a lowest sub-channel index or a lowest physical resource block (physical resource block, PRB) index of a resource of the first sidelink transmission included in the sidelink grant.

Optionally, in this embodiment of this application, when sending the ninth indication information to the network device, the first terminal device may further send configuration index information of the discarded sidelink grant to the network device.

Optionally, in this embodiment of this application, if there is only one sidelink grant in the time domain position of the discarded sidelink grant, when the first terminal device sends the ninth indication information to the network device, the first terminal device does not send the frequency domain position or the configuration index information of the discarded sidelink grant to the network device.

Optionally, in this embodiment of this application, the first terminal device may determine sidelink DRX active time based on a time domain position of the sent PSCCH, PSSCH, or SCI, or drx-onDurationTimerPC5. For example, before or after the discarded sidelink grant, after the first terminal device sends the PSCCH, the PSSCH, the SCI, or the MAC PDU to the second terminal device, the first terminal device starts or restarts drx-InactivityTimerPC5. The sidelink DRX active time includes running time of the drx-InactivityTimerPC5, and an end moment of the sidelink DRX active time is later than or equal to an expiration moment of the drx-InactivityTimerPC5. If the first terminal device does not send the PSCCH, the PSSCH, or the SCI to the second terminal device during running of the drx-onDurationTimerPC5, the end moment of the sidelink DRX active time is an expiration moment of the drx-onDuration-TimerPC5. The sidelink DRX active time herein is a continuous time period.

Optionally, in this embodiment of this application, the first terminal device may trigger sending of the ninth indication information to the network device, or send the ninth indication information to the network device after determining to discard the sidelink grant, or after discarding the sidelink grant, or after the time domain position of the resource indicated by the sidelink grant, or at an end moment of the time domain position of the first sidelink transmission included by the sidelink grant, or in the first slot or symbol after a time domain position of the first sidelink transmission included by the sidelink grant ends, after determining to discard the sidelink grant, or after discarding the sidelink grant, at a moment of an interval after a time domain position of the first sidelink transmission included by the sidelink grant ends, at an end moment of the sidelink DRX active time, or at a moment preceding an end of the sidelink DRX active time by a gap.

Optionally, in this embodiment of this application, after the first terminal device determines to discard the sidelink grant or discards the sidelink grant, when triggering sending of a buffer status report BSR to the network device, the first terminal device may also trigger sending of the ninth indication information and the device identification information of the second terminal device corresponding to the determined discarded sidelink grant to the network device.

Optionally, in this embodiment of this application, after the first terminal device determines to discard the sidelink grant or discards the sidelink grant, when triggering sending of a BSR to the network device, the first terminal device may also trigger sending of the ninth indication information and the device identification information of the second terminal device corresponding to the determined discarded sidelink grant to the network device.

Optionally, after the time domain position of the resource indicated by the determined discarded sidelink grant and before the first terminal device triggers sending of the ninth indication information and the device identification information of the second terminal device corresponding to the determined discarded sidelink grant to the network device, the first terminal device sends the PSCCH, the PSSCH, or the SCI by using the resource indicated by the another sidelink grant, the first terminal device cancels triggered sending of the ninth indication information and the device identification information of the second terminal device corresponding to the determined discarded sidelink grant to the network device.

Optionally, if the first terminal device sends the PSCCH, the PSSCH, or the SCI by using the resource indicated by the another sidelink grant or the first terminal device determines to send the PSCCH, the PSSCH, or the SCI by using the resource indicated by the another sidelink grant before triggering sending of the ninth indication information and the device identification information of the second terminal device corresponding to the determined discarded sidelink grant to the network device, the first terminal device cancels sending the ninth indication information and the device identification information of the second terminal device corresponding to the determined discarded sidelink grant to the network device.

Optionally, in this embodiment of this application, if drx-onDurationTimerPC5 of the second terminal device in a next cycle starts or runs before the ninth indication information is sent to the network device, that is, sidelink DRX active time starts, the first terminal device cancels sending the ninth indication information and the device identification information of the second terminal device corresponding to the determined discarded sidelink grant to the network device.

Optionally, in this embodiment of this application, the sidelink DRX active time does not change even if the first terminal device sends the PSCCH, the PSSCH, or the SCI to the second terminal by using the discarded sidelink grant. In other words, if the sidelink DRX active time determined by the network device is consistent with the sidelink DRX active time determined by the first terminal device, the first terminal device does not send the ninth indication information to the network device. The sidelink DRX active time changes if the first terminal device sends the PSCCH, the PSSCH, or the SCI to the second terminal by using the discarded sidelink grant. In other words, after the sidelink grant is discarded, if the sidelink DRX active time determined by the network device is inconsistent with the sidelink DRX active time determined by the first terminal device, the first terminal device sends the ninth indication information to the network device. For example, before the discarded sidelink grant, after sending the PSCCH, the PSSCH, the SCI, or the MAC PDU to the second terminal device on a resource indicated by a first sidelink grant, the first terminal device determines an end moment of first sidelink DRX active time based on transmission of the PSCCH, the PSSCH, the SCI, or the MAC PDU. If the first terminal device sends the PSCCH, the PSSCH, the SCI, or the MAC PDU to the second terminal device on the resource indicated by the discarded sidelink grant, an end moment of second sidelink DRX active time is determined based on transmission of the PSCCH, the PSSCH, the SCI, or the MAC PDU. If the end moment of the second sidelink DRX active time is equal to the end moment of the first sidelink DRX active time, the first terminal device does not trigger sending of the ninth indication information or the device identification information of the second terminal device corresponding to the determined discarded sidelink grant to the network device.

Optionally, in this embodiment of this application, the ninth indication information and the device identification information of the second terminal device corresponding to the determined discarded sidelink grant may be included in UCI, a MAC CE, or an RRC message. For example, a field in the MAC CE is used to indicate that the first terminal device determines to discard the sidelink grant and indicate the time domain position of the resource indicated by the sidelink grant and/or the device identification information. Alternatively, one or more bits in the MAC CE are used to indicate that the first terminal device determines to discard the sidelink grant and the time domain location of the resource indicated by the sidelink grant and/or indicate the device identification information. Alternatively, a PUCCH, a PUSCH, or a PRACH is used to indicate that the first terminal device determines to discard the sidelink grant and indicate the time domain position of the resource indicated by the sidelink grant and/or the device identification information. In a manner of indicating by using the PRACH, a PRACH resource may be defined, and the PRACH resource is used to indicate that the first terminal device determines to discard the sidelink grant and indicate the time domain position of the resource indicated by the sidelink grant and/or the device identification information.

(6) If the first terminal device determines to discard a sidelink grant sent by the network device, the first terminal device may trigger sending of tenth indication information to the network device. The tenth indication information indicates a slot in which DCI or a PDCCH for scheduling the sidelink grant is located. For example, the tenth indication information may indicate an SFN or a DFN in which the slot is located and an index of the slot in the SFN or the DFN, or indicate a subframe in which the slot is located and an index of the slot in the subframe, for example, an index of the slot on a sidelink or an index of the slot in a sidelink resource pool.

Optionally, in this embodiment of this application, when triggering sending of the tenth indication information to the network device, the first terminal device may further trigger sending of device identification information of a second terminal device corresponding to the determined discarded sidelink grant to the network device.

Optionally, in this embodiment of this application, when the first terminal device triggers sending of the tenth indication information to the network device, the first terminal device may further trigger sending of a frequency domain position of the DCI or PDCCH for scheduling the sidelink grant to the network device, for example, a lowest subchannel index or a lowest PRB index of a resource of the first sidelink transmission included in the sidelink grant.

Optionally, in this embodiment of this application, when the first terminal device triggers sending of the tenth indication information to the network device, the first terminal device may further trigger sending of a control channel element (control channel element, CCE) index of the DCI or the PDCCH for scheduling the sidelink grant to the network device.

Optionally, in this embodiment of this application, when the first terminal device triggers sending of the tenth indication information to the network device, the first terminal device may further trigger sending of a "Time gap" field of the DCI or the PDCCH for scheduling the sidelink grant to the network device.

Optionally, in this embodiment of this application, the first terminal device may determine sidelink DRX active time based on a time domain position of the sent PSCCH, PSSCH, or SCI, or drx-onDurationTimerPC5. For example, before or after the discarded sidelink grant, after the first terminal device sends the PSCCH, the PSSCH, the SCI, or the MAC PDU to the second terminal device, the first terminal device starts or restarts drx-InactivityTimerPC5. The sidelink DRX active time includes running time of the drx-InactivityTimerPC5, and an end moment of the sidelink DRX active time is later than or equal to an expiration moment of the drx-InactivityTimerPC5. If the first terminal device does not send the PSCCH, the PSSCH, or the SCI to the second terminal device during running of the drx-onDurationTimerPC5, the end moment of the sidelink DRX active time is an expiration moment of the drx-onDurationTimerPC5. The sidelink DRX active time herein is a continuous time period.

Optionally, in this embodiment of this application, the network device may determine, based on the DCI or the PDCCH for scheduling the discarded sidelink grant, the sidelink grant discarded by the first terminal device, to determine the sidelink DRX active time.

(7) If the first terminal device discards or determines to discard a sidelink grant sent by the network device, the first terminal device sends eleventh indication information to the network device. The eleventh indication information indicates a time domain position of a previous sidelink grant of the sidelink grant. It may be understood that the eleventh indication information may also indicate that the first terminal device has discarded or discards the sidelink grant.

Optionally, in this embodiment of this application, the network device may obtain, based on the previous sidelink grant of the determined discarded sidelink grant, an end moment of sidelink DRX active time of a second terminal device corresponding to the determined discarded sidelink grant. For example, the end moment of the sidelink DRX active time is a moment of a time domain position of a resource indicated by the previous sidelink grant plus a time length of drx-InactivityTimerPC5, or the end moment of the sidelink DRX active time is an end moment of sidelink DRX active time of a second terminal device corresponding to the previous sidelink grant.

(8) If the first terminal device determines to discard a sidelink grant sent by the network device, the first terminal device sends twelfth indication information to the network device. The twelfth indication information indicates a time domain position of DCI or a PDCCH for scheduling a previous sidelink grant of the sidelink grant.

Optionally, in this embodiment of this application, the network device may determine, based on the DCI or PDCCH for scheduling the previous sidelink grant of the discarded sidelink grant determined by the first terminal device. The network device may obtain, based on the previous sidelink grant of the determined discarded sidelink grant, an end moment of sidelink DRX active time of a second terminal device corresponding to the determined discarded sidelink grant. For example, the end moment of the sidelink DRX active time is a moment of a time domain position of a resource indicated by the previous sidelink grant plus a time length of drx-InactivityTimerPC5, or the end moment of the sidelink DRX active time is an end moment of sidelink DRX active time of a second terminal device corresponding to the previous sidelink grant.

To resolve the second problem, that is, to avoid a problem that if SCI indicates N resources, a time domain position of a resource other than the first resource may not be in sidelink DRX active time of a receiving terminal device, and therefore the terminal device cannot monitor transmission on the N resources, and the resource other than the first resource is wasted, this embodiment of this application provides a solution in Embodiment 4. Embodiment 4 may be implemented with reference to Embodiment 1, Embodiment 2, or Embodiment 3. The following provides specific descriptions.

Embodiment 4

In some embodiments, the sidelink DRX active time of the terminal device may include time domain positions of one or more resources indicated by the SCI. Each of the one or more resources may be a resource for SCI transmission, or each of the one or more resources may be a resource for PSCCH and PSSCH transmission, or each of the one or more resources may be a resource for PSCCH transmission.

Optionally, if the terminal device receives a PSCCH, a PSSCH, SCI, or a MAC PDU, and data of a corresponding sidelink process fails to be decoded, the sidelink DRX active time may include time domain positions of one or more resources indicated by SCI (corresponding to the PSCCH, the PSSCH, or the MAC PDU).

Optionally, when the SCI indicates more than one resource, the terminal device does not start drx-HARQ-RTT-TimerPC5 of a corresponding sidelink process. In other words, the terminal device starts drx-HARQ-RTT-TimerPC5 of a corresponding sidelink process only when the SCI indicates only one resource. A specific start moment is described in Embodiment 1, Embodiment 2, or Embodiment 3.

Optionally, when the SCI indicates more than one resource, the terminal device does not start drx-RetransmissionTimerPC5 of a corresponding sidelink process. In other words, the terminal device starts drx-RetransmissionTimerPC5 of a corresponding sidelink process only when the SCI indicates only one resource. A specific start moment is described in Embodiment 1, Embodiment 2, or Embodiment 3.

In some other embodiments, the terminal device needs to monitor the PSCCH, the PSSCH, or the SCI at time domain positions of the one or more resources indicated by the SCI. In other words, even if the time domain positions of the one or more resources indicated by the SCI are not in the sidelink DRX active time, the terminal device needs to monitor the PSCCH, the PSSCH, or the SCI at the time domain positions of the one or more resources indicated by the SCI.

Optionally, if the terminal device receives a PSCCH, a PSSCH, SCI, or a MAC PDU, and data of a corresponding sidelink process fails to be decoded, the terminal device needs to monitor the PSCCH, the PSSCH, or the SCI at the time domain positions of the one or more resources indicated by the SCI (corresponding to the PSCCH, the PSSCH, or the MAC PDU).

Optionally, when the SCI indicates more than one resource, the terminal device does not start drx-HARQ-RTT-TimerPC5 of a corresponding sidelink process. In other words, the terminal device starts drx-HARQ-RTT-TimerPC5 of a corresponding sidelink process when the SCI indicates only one resource. A specific start moment is described in Embodiment 1, Embodiment 2, or Embodiment 3.

Optionally, when the SCI indicates more than one resource, the terminal device does not start drx-RetransmissionTimerPC5 of a corresponding sidelink process. In other words, the terminal device starts drx-RetransmissionTimerPC5 of a corresponding sidelink process when the SCI indicates only one resource. A specific start moment is described in Embodiment 1, Embodiment 2, or Embodiment 3.

In some other embodiments, if the terminal device receives a PSCCH, a PSSCH, SCI, or a MAC PDU, and SCI (corresponding to the PSCCH, the PSSCH, or the MAC PDU) indicates more than one resource, duration of drx-HARQ-RTT-TimerPC5 of a corresponding sidelink process is first duration. The first duration is determined based on time domain positions of the resources indicated by the SCI, or the first duration is determined based on an offset of a time domain position of the resource indicated by the SCI relative to a time domain position of the SCI.

If the SCI (corresponding to the PSCCH, the PSSCH, or the MAC PDU) indicates only one resource, duration of drx-HARQ-RTT-TimerPC5 of a corresponding sidelink process is second duration. The second duration may be determined by a transmitting terminal device, or determined by a receiving terminal device, or determined by a network device.

If the SCI (corresponding to the PSCCH, the PSSCH, or the MAC PDU) indicates more than one resource, duration of drx-RetransmissionTimerPC5 of the corresponding sidelink process is one slot, or duration of drx-RetransmissionTimerPC5 is duration of one resource indicated by the SCI.

If the SCI (corresponding to the PSCCH, the PSSCH, or the MAC PDU) indicates only one resource, duration of drx-RetransmissionTimerPC of a corresponding sidelink process is third duration. The third duration may be determined by a transmitting terminal device, or determined by a receiving terminal device, or determined by a network device.

When the duration of the drx-HARQ-RTT-TimerPC5 is the first duration, the first symbol, slot, or subframe after the drx-HARQ-RTT-TimerPC5 expires is a time domain position of the second resource indicated by the SCI, a start of a time domain position of the second resource, a time domain position of the third resource, or a start of a time domain position of the third resource. Alternatively, when the duration of the drx-HARQ-RTT-TimerPC5 is the first duration, the first duration is equal to an offset of a time domain position of the second resource indicated by the SCI relative to a time domain position of starting the drx-HARQ-RTT-TimerPC5.

For example, if the terminal device receives the PSCCH, the PSSCH, the SCI, or the MAC PDU in a time domain position, a slot t0, of the first resource indicated by the SCI, and if the SCI (corresponding to the PSCCH, the PSSCH, or the MAC PDU) indicates more than one resource, the terminal device starts drx-HARQ-RTT-TimerPC5 of a corresponding sidelink process in a slot (t0+n1), and stops drx-RetransmissionTimerPC5 of a corresponding sidelink process. The duration of the drx-HARQ-RTT-TimerPC5 is the first duration, and the first duration is equal to an offset of a time domain position slot (t0+t1) of the second resource indicated by the SCI relative to a time domain position slot (t0+n1) for starting the drx-HARQ-RTT-TimerPC5. In other words, the first duration is equal to the slot (t0+t1) minus the slot (t0+n1).

It should be noted that, in this embodiment of this application, a specific start moment of the drx-HARQ-RTT-TimerPC5 is as described in Embodiment 1, Embodiment 2, or Embodiment 3. For example, the slot (t0+n1) is the first symbol, slot, subframe, or mini-slot after transmission carrying a sidelink HARQ feedback ends. The sidelink HARQ feedback herein is a feedback for PSCCH, PSSCH, SCI, or MAC PDU transmission received in a slot t0 (that is, sidelink transmission corresponding to the first resource indicated by the SCI). Alternatively, the slot (t0+n1) is the first symbol, slot, subframe, or mini-slot after received PSCCH, PSSCH, SCI, or MAC PDU transmission ends. In this case, drx-RetransmissionTimerPC5 of a corresponding sidelink process may be stopped, and drx-RetransmissionTimerPC5 of a corresponding sidelink process is started after drx-HARQ-RTT-TimerPC5 expires. Alternatively, drx-RetransmissionTimerPC5 of a corresponding sidelink process may not be stopped, but drx-RetransmissionTimerPC5 of a corresponding sidelink process is restarted after drx-HARQ-RTT-TimerPC5 expires.

It should be noted that in this embodiment of this application, before starting the drx-HARQ-RTT-TimerPC5 in the slot (t0+n1), the terminal device may first determine whether data of the corresponding sidelink process is successfully decoded. If the decoding fails, the terminal device starts the drx-HARQ-RTT-TimerPC5 in the slot (10+n1), and starts or restarts the drx-RetransmissionTimerPC5 of the corresponding sidelink process in the first symbol or slot after the drx-HARQ-RTT-TimerPC5 expires. Alternatively, the terminal device may directly start the drx-HARQ-RTT-TimerPC in the slot (t0+n1), and when the drx-HARQ-RTT-TimerPC5 expires and the data of the corresponding sidelink process fails to be decoded, start or restart the drx-RetransmissionTimerPC5 of the corresponding sidelink process is in the first symbol or slot after the drx-HARQ-RTT-TimerPC5 expires.

If the SCI (first SCI) corresponding to the PSCCH, the PSSCH, or the MAC PDU indicates more than two resources, the terminal device does not receive a PSCCH, a PSSCH, SCI (second SCI), or a MAC PDU in a time-domain position slot (t0+t1) of the second resource, and starts drx-HARQ-RTT-TimerPC5 of a corresponding sidelink process in a time-domain position slot (t0+n2) and stops drx-RetransmissionTimerPC5 of a corresponding sidelink process. The second SCI and the first SCI correspond to a same sidelink process, or the second SCI and the first SCI schedule the same data, or the second SCI and the first SCI schedule same data of a transport block (transport block, TB). Duration of the drx-HARQ-RTT-TimerPC5 is fourth duration, and the fourth duration is equal to an offset of a time-domain position slot (t0+t2) of the third resource indicated by the SCI relative to a time-domain position slot (t0+n2) for starting the drx-HARQ-RTT-TimerPC5. In other words, the first duration is equal to (t0+t2) minus (t0+n2).

It should be noted that, in this embodiment of this application, a specific start moment of the drx-HARQ-RTT-TimerPC5 is as described in Embodiment 1, Embodiment 2, or Embodiment 3. For example, a slot (t0+n2) is the first symbol, slot, subframe, or mini-slot after a sidelink HARQ feedback resource ends. The sidelink HARQ feedback resource is a resource on which a sidelink HARQ feedback for PSCCH, PSSCH, SCI, or MAC PDU transmission (that is, sidelink transmission on the second resource indicated by the foregoing SCI, second SCI transmission, or PSCCH, PSSCH, or MAC PDU transmission corresponding to the second SCI) that is originally expected to be received in the slot (t0+t1) is located. The slot (t0+n2) is the first symbol, slot, subframe, or mini-slot after PSCCH, PSSCH, SCI, or MAC PDU transmission (that is, sidelink transmission on the second resource indicated by the foregoing SCI) that is originally expected to be received in the (t0+t1) slot ends. In this case, drx-RetransmissionTimerPC5 of a corresponding sidelink process may be stopped, and drx-RetransmissionTimerPC5 of a corresponding sidelink process is started after drx-HARQ-RTT-TimerPC5 expires. Alternatively, drx-RetransmissionTimerPC5 of a corresponding sidelink process may not be stopped, but drx-RetransmissionTimerPC5 of a corresponding sidelink process is restarted after drx-HARQ-RTT-TimerPC5 expires.

It should be noted that in this embodiment of this application, before starting the drx-HARQ-RTT-TimerPC5 in the slot (t0+n2), the terminal device may first determine whether data of the corresponding sidelink process is successfully decoded. If the decoding fails, the terminal device starts the drx-HARQ-RTT-TimerPC5 in the slot (t0+n2), and starts or restarts the drx-RetransmissionTimerPC5 of the corresponding sidelink process in the first symbol or slot after the drx-HARQ-RTT-TimerPC5 expires. Alternatively, the terminal device may directly start the drx-HARQ-RTT-TimerPC in the slot (t0+n2), and when the drx-HARQ-RTT-TimerPC5 expires and the data of the corresponding sidelink process fails to be decoded, start or restart the drx-RetransmissionTimerPC5 of the corresponding sidelink process is in the first symbol or slot after the drx-HARQ-RTT-TimerPC5 expires.

In some other embodiments, if the terminal device receives a PSCCH, a PSSCH, an SCI, or a MAC PDU, and the SCI (corresponding to the PSCCH, the PSSCH, or the MAC PDU) indicates more than one resource, drx-RetransmissionTimerPC5 of a corresponding sidelink process is started or restarted in time domain positions (slots) in which one or more resources indicated by the SCI are located. Duration of the drx-RetransmissionTimerPC5 is one slot, or duration of the drx-RetransmissionTimerPC5 is a time length of one resource indicated by the SCI.

Optionally, if the SCI (corresponding to the PSCCH, the PSSCH, or the MAC PDU) indicates more than one resource, and the data of the corresponding sidelink process fails to be decoded, the drx-RetransmissionTimerPC5 is started or restarted in time domain positions (slots) in which one or more resources indicated by the SCI are located.

Optionally, if the SCI (corresponding to the PSCCH, the PSSCH, or the MAC PDU) indicates more than one resource, and the data of the corresponding sidelink process fails to be decoded before a time domain position of any resource after the first resource indicated by the SCI, the drx-RetransmissionTimerPC5 is started or restarted in the time domain position of the resource after the first resource indicated by the SCI.

Optionally, if the SCI (corresponding to the PSCCH, the PSSCH, or the MAC PDU) indicates more than one resource, the terminal device determines, before a time domain location of any resource after the first resource indicated by the SCI, that the drx-RetransmissionTimerPC5 of the corresponding sidelink process expires, and starts the drx-RetransmissionTimerPC5 of the corresponding sidelink process in the time domain position of the resource after the first resource indicated by the SCI.

Optionally, if the SCI (corresponding to the PSCCH, the PSSCH, or the MAC PDU) indicates more than one resource, the terminal device determines, before a time domain location of any resource after the first resource indicated by the SCI, that the drx-RetransmissionTimerPC5 of the corresponding sidelink process is running, and restarts the drx-RetransmissionTimerPC5 of the corresponding sidelink process in the time domain position of the resource after the first resource indicated by the SCI.

It should be noted that, in this embodiment of this application, the terminal device may use the method in Embodiment 4 when determining, based on whether SCI indicates more than one resource, whether to start the timer. For example, if one or more resources indicated by the SCI are not preempted by another terminal device, the terminal device uses the method in Embodiment 4. The method in Embodiment 1, Embodiment 2, or Embodiment 3 is used when whether the SCI indicates more than one resource is irrelevant to whether the timer is started. For example, if one or more resources indicated by the SCI may be preempted by another terminal device, the terminal device uses the method in Embodiment 1, Embodiment 2, or Embodiment 3.

For example, that one or more resources indicated by the SCI are not preempted by another terminal device may include one or more of the following cases.
  (1) Preemption (pre-emption) is disabled.
  (2) A priority indicated by the SCI is a smallest value or a largest value of a priority value range.
  (3) Preemption (pre-emption) is enabled, and a priority indicated by the SCI is a smallest value or a largest value of a priority value range.
  (4) A preemption threshold is a smallest value or a largest value of a priority value range.
  (5) Preemption (pre-emption) is disabled, and a preemption threshold is a smallest value or a largest value of a priority value range.
  (6) A terminal device that sends the SCI uses a resource allocation mode of scheduling by a base station.

Optionally, when a priority with a smaller value indicates preferential transmission, a priority indicated by the SCI is a smallest value in the priority value range, and a preemption threshold is a smallest value in the priority value range; or when a priority with a larger value indicates preferential transmission, a priority indicated by the SCI is a largest value in the priority value range, and a preemption threshold is a largest value in the priority value range.

For example, that one or more resources indicated by the SCI may be preempted by another terminal device includes one or more of the following cases.
  (1) A priority indicated by the SCI is greater than a smallest value of a priority value range.
  (2) Preemption (pre-emption) is enabled, and a priority indicated by the SCI is greater than a smallest value of a priority value range.
  (3) A preemption threshold is greater than a smallest value of a priority value range.
  (4) Preemption (pre-emption) is disabled, and a preemption threshold is greater than a smallest value of a priority value range.
  (5) Preemption is enabled.
  (6) A preemption threshold is greater than a smallest value of a priority value range, and a priority indicated by the SCI is greater than the smallest value of the priority value range.
  (7) Preemption (pre-emption) is disabled, a preemption threshold is greater than a smallest value of a priority value range, and a priority indicated by the SCI is greater than the smallest value of the priority value range. A priority with a smaller value indicates preferential transmission.
  (8) A terminal device that sends the SCI uses a resource allocation mode of autonomously selecting a resource.

Alternatively, that one or more resources indicated by the SCI may be preempted by another terminal device may include one or more of the following cases.
  (1) A priority indicated by the SCI is less than a largest value of a priority value range.
  (2) Preemption (pre-emption) is enabled, and a priority indicated by the SCI is less than a largest value of a priority value range.
  (3) A preemption threshold is less than a largest value of a priority value range.
  (4) Preemption (pre-emption) is disabled, and a preemption threshold is less than a largest value of a priority value range.
  (5) Preemption is enabled.
  (6) A preemption threshold is less than a largest value of a priority value range, and a priority indicated by the SCI is less than the largest value of the priority value range.
  (7) Preemption (pre-emption) is disabled, a preemption threshold is less than a largest value of a priority value range, and a priority indicated by the SCI is less than the largest value of the priority value range. A priority with a larger value indicates preferential transmission.
  (8) A terminal device that sends the SCI uses a resource allocation mode of autonomously selecting a resource.

The foregoing describes in detail the method provided in embodiments of this application with reference to FIG. 4 and FIG. 5a to FIG. 5k. Apparatuses provided in embodiments of this application are described below in detail with reference to FIG. 6 to FIG. 8.

Figure 6:
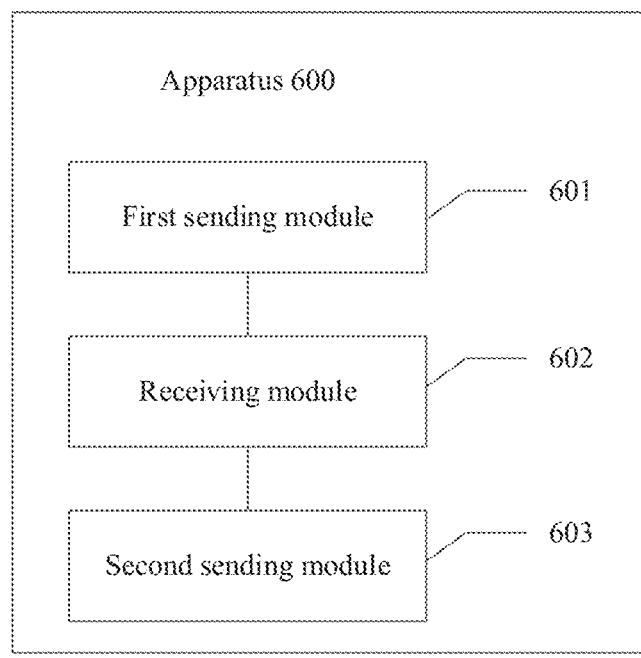
FIG. 6 is a schematic diagram of a structure of a DRX apparatus according to an embodiment of this application.

Based on a same technical concept, an embodiment of this application further provides a DRX apparatus 600. The apparatus 600 may be a first terminal device or an apparatus 600 in a first terminal device. The apparatus 600 includes modules configured to perform the methods in Embodiment 1, Embodiment 2, and Embodiment 3. For example, as shown in FIG. 6, the apparatus 600 may include:

a first sending module 601, configured to send a sidelink discontinuous reception DRX parameter of a second terminal device or indication information to a network device, so that the network device determines a first time period based on the sidelink DRX parameter or the indication information, where the indication information indicates a start and/or an end of the first time period, the first time period belongs to sidelink DRX active time of the second terminal device, and the second terminal device is a device that performs sidelink communication with the first terminal device;

a receiving module 602, configured to receive a sidelink grant sent by the network device, where the sidelink grant is used to indicate a resource for sending a physical sidelink control channel PSCCH and/or a physical sidelink shared channel PSSCH by the first terminal device, and a time domain position of the resource is in the first time period; and a second sending module 603, configured to send a PSCCH and/or a PSSCH based on the sidelink grant.

In a possible design, the indication information is included in uplink control information UCI, a media access control control element MAC CE, or a radio resource control RRC message; and the sidelink grant is included in downlink control information DCI, a MAC CE, or an RRC message.

In a possible design, when sending the indication information to the network device, the first sending module 601 is specifically configured to:

send first indication information to the network device at a start moment of the first time period, where the first indication information indicates an end moment of the first time period; or send second indication information to the network device at a start moment of the first time period, and send third indication information to the network device at an end moment of the first time period, where the second indication information indicates the start of the first time period, and the third indication information indicates the end of the first time period.

In a possible design, that the first time period belongs to the sidelink DRX active time of the second terminal device includes:

the first time period includes sidelink DRX active time of each second terminal device; or the first time period includes an intersection set or a union set of sidelink DRX active time of at least two second terminal devices.

In a possible design, that the first time period includes an intersection set or a union set of sidelink DRX active time of at least two second terminal devices includes:

the first time period includes any one or a combination of the following:

an earliest start moment to an earliest end moment of the sidelink DRX active time of each second terminal device;

an earliest start moment to a latest end moment of the sidelink DRX active time of each second terminal device;

a latest start moment to an earliest end moment of the sidelink DRX active time of each second terminal device;

a latest start moment to a latest end moment of the sidelink DRX active time of each second terminal device; and a start moment or an end moment of sidelink DRX active time of any second terminal device to a start moment or an end moment of sidelink DRX active time of any second terminal device.

In a possible design, if the first time period includes sidelink DRX active time of each second terminal device, the receiving module 602 is specifically configured to:

receive the sidelink grant and device identification information that are sent by the network device, and determine the second terminal device corresponding to the sidelink grant based on the device identification information.

In a possible design, the sidelink DRX active time includes running time of a DRX on duration timer and running time of a DRX inactivity timer, and the DRX inactivity timer is started or restarted when the first terminal device sends the PSCCH and/or the PSSCH; or the DRX inactivity timer is started or restarted when the first terminal device receives, from the second terminal device, HARQ feedback information that is based on the PSCCH and/or the PSSCH; or the DRX inactivity timer is started or restarted when the first terminal device sends fourth indication information to the network device and the second terminal device, where the fourth indication information indicates to start or restart the DRX inactivity timer.

In a possible design, the DRX inactivity timer is started or restarted when the first terminal device receives sidelink control information SCI and information included in the SCI meets a preset condition, where the SCI includes any one or more of a source address layer-1 identifier source layer-1 ID, a destination address layer-1 identifier destination layer-1 ID, or a cast type cast type, and the cast type is used to indicate broadcast communication, groupcast communication, or unicast communication.

In a possible design, the SCI includes a source layer-1 ID and a destination layer-1 ID, and when the destination layer-1 ID is the same as a layer-1 ID of the first terminal device, and the source layer-1 ID is the same as a layer-1 ID of the second terminal device, the first terminal device starts or restarts the DRX inactivity timer corresponding to sidelink DRX between the first terminal device and the second terminal device; or the SC includes a source layer-1 ID, a destination layer-1 ID, and a cast type, and when the cast type indicates unicast communication, the destination layer-1 ID is the same as a layer-1 ID of the first terminal device, and the source layer-1 ID is the same as a layer-1 ID of the second terminal device, the first terminal device starts or restarts the DRX inactivity timer corresponding to sidelink DRX between the first terminal device and the second terminal device; or the SCI includes a destination layer-1 ID and a cast type, and when the cast type indicates groupcast communication, and the destination layer-1 ID is the same as a destination layer-1 ID of the groupcast communication, the first terminal device starts or restarts the DRX inactivity timer corresponding to sidelink DRX of the groupcast communication.

In a possible design, the destination layer-1 ID included in the SCI is the same as a layer-1 ID of the first terminal device in any one sidelink unicast communication, the source layer-1 ID included in the SCI is the same as a layer-1 ID of a second terminal device corresponding to the first terminal device in the sidelink unicast communication, and the apparatus further includes a processing module. The processing module is configured to:

cancel starting or restarting the DRX inactivity timer corresponding to the sidelink DRX between the first terminal device and the second terminal device, where the first terminal device determines that a source address layer-2 identifier source layer-2 ID of a media access control protocol data unit MAC PDU corresponding to the SCI is different from a layer-2 ID of the second terminal device corresponding to the first terminal device in the sidelink unicast communication, or a destination address layer-2 identifier destination layer-2 ID of the MAC PDU corresponding to the SCI is different from a layer-2 ID of the first terminal device in the sidelink unicast communication; or configure a layer-2 ID in sidelink unicast communication between the first terminal device and the second terminal device, where a layer-1 ID corresponding to the layer-2 ID is different from a layer-1 ID corresponding to a layer-2 ID configured by the first terminal device during sidelink unicast communication with another second terminal device; or configure a layer-2 ID in sidelink unicast communication between the first terminal device and the second terminal device, where a layer-1 ID corresponding to the layer-2 ID is different from a layer-1 ID corresponding to a layer-2 ID in another sidelink unicast communication, and the another sidelink unicast communication is sidelink unicast communication of terminal devices that do not include the first terminal device.

In a possible design, the first terminal device receives the SCI or the fourth indication information, a MAC PDU corresponding to the SCI or the fourth indication information includes only non-data information, and the processing module is further configured to:

determine that the MAC PDU corresponding to the SCI includes first information but does not include second information, and cancel starting or restarting the DRX inactivity timer corresponding to the sidelink DRX between the first terminal device and the second terminal device, where the first information includes any one or a combination of the following: a sidelink channel state information report and sidelink resource information in inter-terminal device coordination; and the second information includes any one or a combination of the following: data on a sidelink control channel SCCH, data on a sidelink traffic channel STCH, and a media access control control element MAC CE other than the first information; or the first information includes any one or a combination of the following: a sidelink channel state information report, sidelink resource information in inter-terminal device coordination, data on an SCCH, and information other than data on an STCH; and the second information includes the data on the STCH.

In a possible design, the first terminal device receives a PSCCH, a PSSCH, or a MAC PDU sent by the second terminal device, and SCI corresponding to the PSCCH, the PSSCH, or the MAC PDU indicates at least two resources, or the first terminal device receives SCI sent by the second terminal device, and the SCI indicates at least two resources, and the processing module is further configured to:

start a HARQ round trip time RTT timer or a DRX retransmission timer corresponding to the sidelink DRX between the first terminal device and the second terminal device, where a priority indicated by the SCI is greater than a smallest value of a priority value range; or skip starting a HARQ RTT timer or a DRX retransmission timer corresponding to the sidelink DRX between the first terminal device and the second terminal device, where a priority indicated by the SCI is a smallest value of a priority value range.

In a possible design, the first terminal device receives a PSCCH, a PSSCH, or a MAC PDU sent by the second terminal device, and SCI corresponding to the PSCCH, the PSSCH, or the MAC PDU indicates at least two resources, or the first terminal device receives SCI sent by the second terminal device, and the SCI indicates at least two resources, and the processing module is further configured to:

determine, based on each of the at least two resources indicated by the SCI, start time of the HARQ RTT timer or the DRX retransmission timer corresponding to the sidelink DRX between the first terminal device and the second terminal device, where the resource includes or indicates an SCI transmission occasion.

In a possible design, the second sending module 603 is further configured to:

if it is determined to discard the sidelink grant, send fifth indication information to the network device at an end moment of the first time period or a moment preceding the end moment by a gap, where the fifth indication information indicates that the first terminal device determines to discard the sidelink grant and indicates the end of the first time period; or if it is determined to discard the sidelink grant, send sixth indication information to the network device, where the sixth indication information indicates that the first terminal device determines to discard the sidelink grant, and indicates an end moment of the first time period, a time domain position of the determined discarded sidelink grant, or a time domain position of a previous sidelink grant of the determined discarded sidelink grant.

Figure 7:
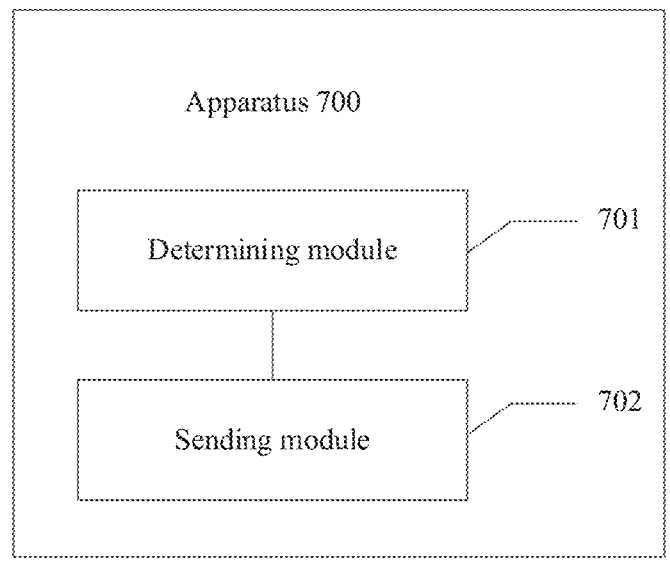
FIG. 7 is a schematic diagram of a structure of another DRX apparatus according to an embodiment of this application.

Based on a same technical concept, an embodiment of this application further provides a DRX apparatus 700. The apparatus 700 may be a network device or an apparatus 700 in a network device. The apparatus 700 includes modules configured to perform the methods in Embodiment 1, Embodiment 2, and Embodiment 3. For example, as shown in FIG. 7, the apparatus 700 may include:

a determining module 701, configured to determine a first time period, where the first time period belongs to sidelink DRX active time of a second terminal device, and the second terminal device is a device that performs sidelink communication with a first terminal device; and a sending module 702, configured to send a sidelink grant to the first terminal device, so that the first terminal device sends a physical sidelink control channel PSCCH and/or a physical sidelink shared channel PSSCH based on the sidelink grant, where the sidelink grant is used to indicate a resource for sending the PSCCH and/or the PSSCH by the first terminal device, and a time domain position of the resource is in the first time period.

In a possible design, the determining module 701 is specifically configured to:

receive a sidelink DRX parameter of the second terminal device sent by the first terminal device or any second terminal device, and determine the first time period based on the sidelink DRX parameter; or determine the first time period based on a sidelink DRX parameter of the second terminal device configured by the network device; or receive indication information sent by the first terminal device, and determine the first time period based on the indication information, where the indication information indicates a start and/or an end of the first time period.

In a possible design, the indication information is included in uplink control information UCI, a media access control control element MAC CE, or a radio resource control RRC message; and the sidelink grant is included in downlink control information DCI, a MAC CE, or an RRC message.

In a possible design, when receiving the indication information sent by the first terminal device, the determining module 701 is specifically configured to:

receive first indication information sent by the first terminal device at a start moment of the first time period, where the first indication information indicates an end moment of the first time period; or receive second indication information sent by the first terminal device at a start moment of the first time period, and third indication information sent at an end moment of the first time period, where the second indication information indicates the start of the first time period, and the third indication information indicates the end of the first time period.

In a possible design, that the first time period belongs to the sidelink DRX active time of the second terminal device includes:

the first time period includes sidelink DRX active time of each second terminal device; or the first time period includes an intersection set or a union set of sidelink DRX active time of at least two second terminal devices.

In a possible design, that the first time period includes an intersection set or a union set of sidelink DRX active time of at least two second terminal devices includes:

the first time period includes any one or a combination of the following:

an earliest start moment to an earliest end moment of the sidelink DRX active time of each second terminal device;

an earliest start moment to a latest end moment of the sidelink DRX active time of each second terminal device;

a latest start moment to an earliest end moment of the sidelink DRX active time of each second terminal device;

a latest start moment to a latest end moment of the sidelink DRX active time of each second terminal device; and a start moment or an end moment of sidelink DRX active time of any second terminal device to a start moment or an end moment of sidelink DRX active time of any second terminal device.

In a possible design, if the first time period includes sidelink DRX active time of each second terminal device, the sending module 702 is specifically configured to:

send the sidelink grant and device identification information to the first terminal device, so that the first terminal device determines the second terminal device corresponding to the sidelink grant based on the device identification information.

In a possible design, the sidelink DRX active time includes running time of a DRX on duration timer and running time of a DRX inactivity timer, and the DRX inactivity timer is started or restarted when the network device sends the sidelink grant to the first terminal device; or the DRX inactivity timer is started or restarted when the network device receives, from the first terminal device. HARQ feedback information that is based on the sidelink grant; or the DRX inactivity timer is started or restarted when the network device receives fourth indication information sent by the first terminal device, where the fourth indication information indicates to start or restart the DRX inactivity timer.

In a possible design, the apparatus 700 may further include a receiving module.

The receiving module is configured to receive fifth indication information sent by the first terminal device at an end moment of the first time period or a moment preceding the end moment by a gap, where the fifth indication information indicates that the first terminal device determines to discard the sidelink grant and indicates the end moment of the first time period; or receive, by the network device, sixth indication information sent by the first terminal device, where the sixth indication information indicates that the first terminal device determines to discard the sidelink grant, and indicates an end moment of the first time period, a time domain position of the to-be-discarded sidelink grant, or a time domain position of a previous sidelink grant of the to-be-discarded sidelink grant.

Figure 8:
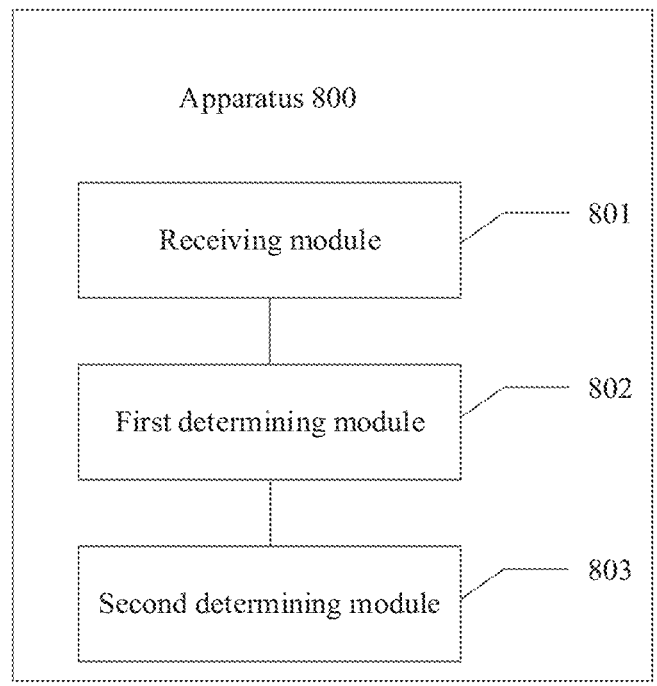
FIG. 8 is a schematic diagram of a structure of another DRX apparatus according to an embodiment of this application.

Based on a same technical concept, an embodiment of this application further provides a DRX apparatus 800. The apparatus 800 may be a terminal device or an apparatus 800 in a terminal device. The apparatus 800 includes modules configured to perform the method in Embodiment 4. For example, as shown in FIG. 8, the apparatus 800 may include:

a receiving module 801, configured to receive first sidelink control information SCI sent by a second terminal device, where the second terminal device is a device that performs sidelink communication with a first terminal device;

a first determining module 802, configured to: if the first SCI indicates at least two resources, determine, by the first terminal device, that duration of a hybrid automatic repeat request HARQ round trip time RTT timer of a sidelink process corresponding to the first SCI is first duration, where the first duration is determined based on time domain positions of the resources indicated by the first SCI; and a second determining module 803, configured to: if the first SCI indicates one resource, determine, by the first terminal device, that the duration of the HARQ RTT timer is second duration, where the second duration is configured by the second terminal device or a network device.

In a possible design, the first symbol or slot after the HARQ RTT timer is started and runs for the first duration is a time domain position of the second resource indicated by the first SCI; or the first duration is equal to an offset of a time domain position of the second resource indicated by the first SCI relative to a first time domain position, and the first time domain position is a time domain position for starting the HARQ RTT timer.

In a possible design, the first time domain position is the first symbol or slot after transmission that carries a sidelink HARQ feedback ends, and the sidelink HARQ feedback is a feedback for transmission of the first SCI or transmission of a physical sidelink control channel PSCCH, a physical sidelink shared channel PSSCH, or a media access control protocol data unit MAC PDU that corresponds to the first SCI; or the first time domain position is the first symbol or slot after transmission of the first SCI or transmission of a physical sidelink control channel PSCCH, a physical sidelink shared channel PSSCH, or a media access control protocol data unit MAC PDU that corresponds to the first SCI ends.

In a possible design, the apparatus further includes a first processing module. The first processing module is configured to: if the first SCI indicates at least three resources, start the HARQ RTT timer in a second time domain position when the first terminal device does not receive, in the time domain position of the second resource indicated by the first SCI, a second SCI sent by the second terminal device. The second SCI and the first SCI correspond to a same sidelink process or schedule same data. The second time domain position is the first symbol or slot after a sidelink HARQ feedback resource ends, and the sidelink HARQ feedback resource is a resource in which a sidelink HARQ feedback for the second resource indicated by the first SCI is located, or the second time domain position is the first symbol or slot after the time domain position of the second resource indicated by the first SCI ends.

In a possible design, before the first terminal device starts the HARQ RTT timer in the second time domain position, the apparatus further includes a third determining module. The third determining module is configured to determine, by the first terminal device, that the duration of the HARQ RTT timer is third duration, where the first symbol or slot after the HARQ RTT timer is started in the second time domain position and runs for the third duration is a time domain position of the third resource indicated by the first SCI; or the third duration is equal to an offset of a time domain position of the third resource indicated by the first SCI relative to the second time domain position.

In a possible design, the apparatus further includes a second processing module. The second processing module is configured to: if the first SCI indicates at least two resources, and the first terminal device fails to decode data of the sidelink process before a time domain position of any resource after the first resource indicated by the first SCI, start or restart, by the first terminal device, a DRX retransmission timer of the sidelink process in the time domain position of the resource after the first resource indicated by the first SCI.

In a possible design, the apparatus further includes a third processing module. The third processing module is configured to: if the first terminal device fails to decode the data of the sidelink process before the third resource indicated by the first SCI, start or restart, by the first terminal device, the DRX retransmission timer of the sidelink process in a time domain position of the third resource indicated by the first SCI.

In a possible design, the apparatus further includes a fourth processing module. The fourth processing module is configured to: if the first SCI indicates at least two resources, and the DRX retransmission timer of the sidelink process expires before the time domain position of the resource after the first resource indicated by the first SCI, start, by the first terminal device, the DRX retransmission timer in the time domain position of the resource after the first resource indicated by the first SCI.

In a possible design, the apparatus further includes a fifth processing module. The fifth processing module is configured to: if the DRX retransmission timer of the sidelink process expires before the third resource indicated by the first SCI, start, by the first terminal device, the DRX retransmission timer in a time domain position of the third resource indicated by the first SCI.

In a possible design, the apparatus further includes a sixth processing module. The sixth processing module is configured to: if the first SCI indicates at least two resources, and the DRX retransmission timer of the sidelink process is running before the time domain position of the resource after the first resource indicated by the first SCI, restart, by the first terminal device, the DRX retransmission timer in the time domain position of the resource after the first resource indicated by the first SCI.

In a possible design, the apparatus further includes a seventh processing module. The seventh processing module is configured to: if the DRX retransmission timer of the sidelink process is running before the third resource indicated by the first SCI, restart, by the first terminal device, the DRX retransmission timer in a time domain position of the third resource indicated by the first SCI.

In a possible design, the apparatus further includes an eighth processing module. The eighth processing module is configured to: if the first terminal device fails to decode the data of the sidelink process, start, by the first terminal device, the HARQ RTT timer, and start or restart the DRX retransmission timer of the sidelink process in the first symbol or slot after the HARQ RTT timer expires.

In a possible design, the apparatus further includes a ninth processing module. The ninth processing module is configured to: if the HARQ RTT timer expires and the first terminal device fails to decode the data of the sidelink process, start or restart, by the first terminal device, the DRX retransmission timer of the sidelink process in the first symbol or slot after the HARQ RTT timer expires.

In a possible design, the first determining module 802 is specifically configured to: if any resource indicated by the first SCI is not preempted by another terminal device, determine, by the first terminal device, that the duration of the HARQ RTT timer is the first duration.

Figure 9:
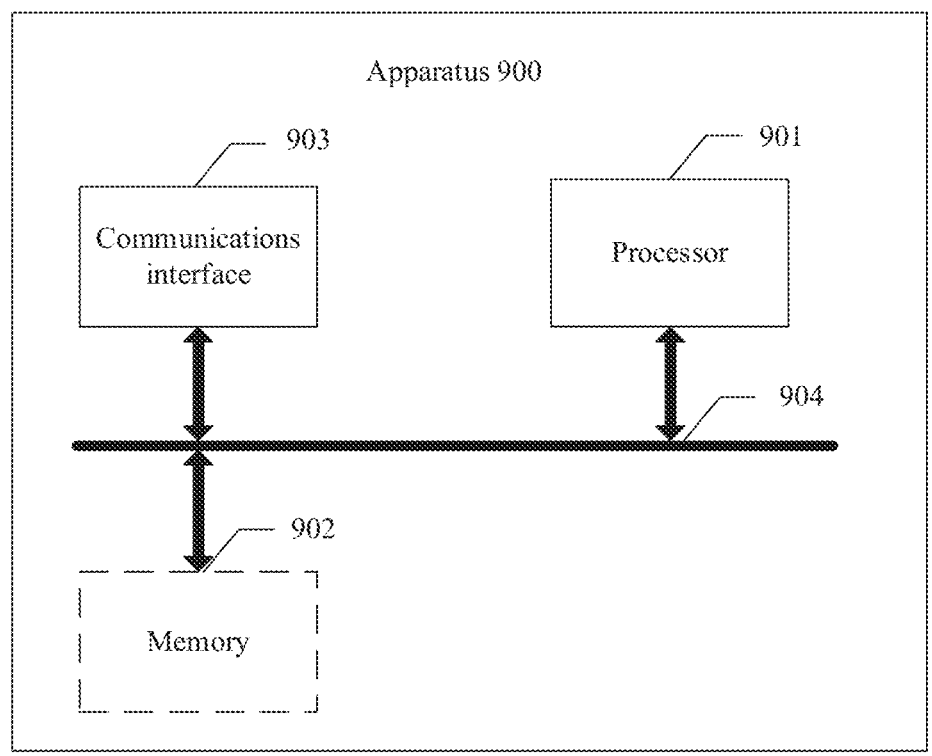
FIG. 9 is a schematic diagram of a structure of another DRX apparatus according to an embodiment of this application.

Based on the same technical concept, with reference to FIG. 9, an embodiment of this application further provides a DRX apparatus 900, including:

at least one processor 901, and a communications interface 903 communicatively connected to the at least one processor 901.

The at least one processor 901 executes instructions stored in a memory 902, so that the apparatus 900 performs the methods in Embodiment 1, Embodiment 2, Embodiment 3, and Embodiment 4.

Optionally, the memory 902 is located outside the apparatus 900.

Optionally, the apparatus 900 includes the memory 902. The memory 902 is connected to the at least one processor 901, and the memory 902 stores the instructions that can be executed by the at least one processor 901. In FIG. 9, a dashed line indicates that the memory 902 is optional for the apparatus 900.

The processor 901 and the memory 902 may be coupled through an interface circuit, or may be integrated together. This is not limited herein.

A specific connection medium between the processor 901, the memory 902, and the communications interface 903 is not limited in this embodiment of this application. In this embodiment of this application, the processor 901, the memory 902, and the communications interface 903 are connected through a bus 904 in FIG. 9, and the bus is represented by a bold line in FIG. 9. A manner of connection between other components is schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

It should be understood that the processor mentioned in embodiments of this application may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

For example, the processor may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array. FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

Based on a same technical concept, an embodiment of this application further provides a computer-readable storage medium, including a program or instructions. When the program or the instructions are run on a computer, the methods in Embodiment 1, Embodiment 2, Embodiment 3, and Embodiment 4 are performed.

Based on a same technical concept, an embodiment of this application further provides a chip. The chip is coupled to a memory, and is configured to read and execute program instructions stored in the memory, so that the methods in Embodiment 1, Embodiment 2. Embodiment 3, and Embodiment 4 are performed.

Based on a same technical concept, an embodiment of this application further provides a computer program product, including instructions. When the instructions are run on a computer, the methods in Embodiment 1, Embodiment 2, Embodiment 3, and Embodiment 4 are performed.

Based on the same technical concept, an embodiment of this application further provides a communication system, including the first terminal device and the network device in embodiments of this application.

It should be understood that all related content of the steps in the foregoing method embodiments may be cited in function descriptions of the corresponding functional modules. Details are not described herein again.

Embodiments of this application are described with reference to the flowcharts and/or block diagrams of the methods, the apparatuses, and the computer program product according to embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

What is claimed is:

1. A method implemented by a first terminal device, wherein the method comprises:
    receiving, from a second terminal device, first sidelink control information (SCI);
    determining, based on the first SCI, whether the SCI indicates at least two resources or only one resource, wherein the at least two resources comprise a first resource and a second resource;
    when the first SCI indicates the at least two resources, determining that a duration of a hybrid automatic repeat request (HARQ) round trip time (RTT) timer of a sidelink process corresponding to the first SCI is a first duration, wherein the first duration is based on time domain positions of the at least two resources indicated by the first SCI; and
    when the first SCI indicates only one resource, determining that the duration of the HARQ RTT timer is a second duration, wherein the second terminal device or a network device configures the second duration.

2. The method of claim 1, wherein a first symbol or a slot after the HARQ RTT timer is started and runs for the first duration is a first time domain position of the second resource, or wherein the first duration is equal to an offset of the first time domain position relative to a second time domain position that starts the HARQ RTT timer.

3. The method of claim 2, wherein the second time domain position comprises:
    the first symbol or the slot after transmission that carries a sidelink HARQ feedback ends, wherein the sidelink HARQ feedback is for transmission of the first SCI, a physical sidelink control channel (PSCCH), a physical sidelink shared channel (PSSCH,), or a media access control (MAC) protocol data unit (PDU) that corresponds to the first SCI; or the first symbol or the slot after transmission of the first SCI, a PSCCH, a PSSCH, or a MAC PDU that corresponds to the first SCI ends.

4. The method of claim 1, further comprising starting the HARQ RTT timer in a second time domain position when the first terminal device does not receive, in a first time domain position of the second resource indicated by the first SCI, a second SCI from the second terminal device, wherein the second SCI and the first SCI correspond to a same sidelink process or schedule same data, wherein the second time domain position is a first symbol or a slot after either a sidelink HARQ feedback resource ends or the first time domain position ends, and wherein the sidelink HARQ feedback resource comprises a sidelink HARQ feedback for the second resource.

5. The method of claim 4, wherein before staring the HARQ RTT timer, the method further comprises determining that the duration of the HARQ RTT timer is a third duration, wherein the first symbol or the slot after the HARQ RTT timer is started at the second time domain position and runs for the third duration is a third time domain position of the third resource indicated by the first SCI, or wherein the third duration is equal to an offset of the third time domain position relative to the second time domain position.

6. The method of claim 1, further comprising starting or restarting a discontinuous reception (DRX) retransmission timer of the sidelink process in a first time domain position of the first resource after the first resource indicated by the first SCI when failing to decode data of the sidelink process before a second time domain position of any resource after the first resource indicated by the first SCI.

7. The method of claim 1, further comprising starting a DRX retransmission timer in a first time domain position of the first resource after the first resource indicated by the first SCI when the DRX retransmission timer of the sidelink process expires before the time domain position.

8. The method of claim 1, further comprising restarting the DRX retransmission timer in a first time domain position of the first resource after the first resource indicated by the first SCI when the DRX retransmission timer of the sidelink process is running before the first time domain position.

9. The method of claim 1, wherein when failing to decode data of the sidelink process, the method further comprises:
   starting the HARQ RTT timer; and
   starting or restarting a DRX retransmission timer of the sidelink process in a first symbol or a slot after the HARQ RTT timer expires.

10. The method of claim 1, further comprising starting or restarting a DRX retransmission timer of the sidelink process in a first symbol or a slot after the HARQ RTT timer expires and when failing to decode data of the sidelink process.

11. The method of claim 1, wherein determining that the duration of the HARQ RTT timer is the first duration comprises determining that the duration of the HARQ RTT timer is the first duration when any resource indicated by the first SCI is not preempted by another terminal device.

12. A first terminal device, comprising:
   a memory configured to store instructions; and
   a processor coupled to the memory and configured to:
      receive, from a second terminal device, first sidelink control information (SCI) sent, wherein the second terminal device performs sidelink communication with the first terminal device;
      determine, based on the first SCI, whether the SCI indicates at least two resources or only one resource, wherein the at least two resources comprise a first resource and a second resource;
      when the first SCI indicates the at least two resources, determine that a duration of a hybrid automatic repeat request (HARQ) round trip time (RTT) timer of a sidelink process corresponding to the first SCI is a first duration, wherein the first duration is based on time domain positions of the at least two resources indicated by the first SCI; and
      when the first SCI indicates only one resource, determine that the duration of the HARQ RTT timer is a second duration, wherein the second terminal device or a network device configures the second duration.

13. The first terminal device of claim 12, wherein a first symbol or a slot after the HARQ RTT timer is started and runs for the first duration is a first time domain position of the second resource indicated by the first SCI, or wherein the first duration is equal to an offset of the first time domain position relative to a second time domain position that starts the HARQ RTT timer.

14. The first terminal device of claim 13, wherein the second time domain position comprises:
   the first symbol or the slot after transmission that carries a sidelink HARQ feedback ends, wherein the sidelink HARQ feedback is for transmission of the first SCI, a physical sidelink control channel (PSCCH), a physical sidelink shared channel (PSSCH), or a media access control (MAC) protocol data unit (PDU) that corresponds to the first SCI; or
   the first symbol or the slot after transmission of the first SCI, a PSCCH, a PSSCH, or a MAC PDU that corresponds to the first SCI ends.

15. The first terminal device of claim 12, wherein the processor is further configured to start the HARQ RTT timer in a second time domain position when the first terminal device does not receive, in a first time domain position of the second resource indicated by the first SCI, a second SCI from the second terminal device, wherein the second SCI and the first SCI correspond to a same sidelink process or schedule same data, wherein the second time domain position is a first symbol or a slot after either a sidelink HARQ feedback resource ends or the first time domain position ends, and wherein the sidelink HARQ feedback resource comprises a sidelink HARQ feedback for the second resource.

16. The first terminal device of claim 15, wherein the processor is further configured to determine that the duration of the HARQ RTT timer is a third duration, wherein the first symbol or the slot after the HARQ RTT timer is started at the second time domain position and runs for the third duration is a third time domain position of a third resource indicated by the first SCI, or wherein the third duration is equal to an offset of the third time domain position relative to the second time domain position.

17. The first terminal device of claim 12, wherein the processor is further configured to start or restart a discontinuous reception (DRX) retransmission timer of the sidelink process in a first time domain position of the first resource after the first resource indicated by the first SCI and when failing to decode data of the sidelink process before a time domain position of any resource after the first resource indicated by the first SCI.

18. The first terminal device of claim 12, wherein the processor is further configured to start a DRX retransmission timer in a first time domain position of the first resource after the first resource indicated by the first SCI and when the DRX retransmission timer of the sidelink process expires before the first time domain position.

19. The first terminal device of claim 12, wherein the processor is further configured to restart a DRX retransmission timer in a first time domain position of the first resource after the first resource indicated by the first SCI when the DRX retransmission timer of the sidelink process is running before the first time domain position.

20. The first terminal device of claim 12, wherein when failing to decode data of the sidelink process the processor is further configured to:
    start the HARQ RTT timer; and
    start or restart a DRX retransmission timer of the sidelink process in a first symbol or a slot after the HARQ RTT timer expires.

* * * * *